United States Patent
Babaali et al.

(10) Patent No.: US 11,354,463 B1
(45) Date of Patent: Jun. 7, 2022

(54) SYSTEMS AND METHODS FOR GENERATING CODE FOR COMPUTER-BASED PHYSICAL MODELS

(71) Applicant: The MathWorks, Inc., Natick, MA (US)

(72) Inventors: Mohamed Babaali, Hopkinton, MA (US); Wurigen Bo, Arlington, MA (US); Kiran K. Kintali, Needham, MA (US); Shomit Dutta, Ashland, MA (US); Ebrahim M. Mestchian, Newton, MA (US); Naman Saraf, Bangalore (IN)

(73) Assignee: The MathWorks, Inc., Natick, MA (US)

(*) Notice: Subject to any disclaimer, the term of this patent is extended or adjusted under 35 U.S.C. 154(b) by 123 days.

(21) Appl. No.: 16/580,048

(22) Filed: Sep. 24, 2019

Related U.S. Application Data

(60) Provisional application No. 62/855,178, filed on May 31, 2019, provisional application No. 62/778,688, filed on Dec. 12, 2018.

(51) Int. Cl.
*G06F 30/20* (2020.01)
*G06F 8/35* (2018.01)
*G06F 17/16* (2006.01)
*G06F 17/13* (2006.01)
*G06F 111/10* (2020.01)

(52) U.S. Cl.
CPC .............. *G06F 30/20* (2020.01); *G06F 8/35* (2013.01); *G06F 17/13* (2013.01); *G06F 17/16* (2013.01); *G06F 2111/10* (2020.01)

(58) Field of Classification Search
CPC ............ G06F 30/20; G06F 8/35; G06F 17/16; G06F 17/13; G06F 2111/10
See application file for complete search history.

(56) References Cited

U.S. PATENT DOCUMENTS

| | | |
|---|---|---|
| 7,835,889 B1 | 11/2010 | Zhang et al. |
| 7,904,280 B2 | 3/2011 | Wood |
| 8,694,947 B1 | 4/2014 | Venkataramani et al. |
| 8,863,069 B1 | 10/2014 | Venkataraman et al. |
| 8,868,381 B2 | 10/2014 | Komatsu et al. |

(Continued)

OTHER PUBLICATIONS

Abourida, Simon, et al., "Hardware-in-the-Loop Simulation of Electric Systems and Power Electronics on FPGA Using Physical Modeling," IEEE, Powereng 2013, 4th International Conference on Power Engineering, Energy and Electrical Drives, Istanbul, Turkey, May 13-17, 2013, pp. 775-780.

(Continued)

*Primary Examiner* — Bijan Mapar
(74) *Attorney, Agent, or Firm* — Cesari and McKenna, LLP; Michael R. Reinemann

(57) ABSTRACT

A solver may generate a system of equations for an acausal model. A partitioning engine may transform at least some of the equations into groups of equations whose inputs/outputs are connected directly. The partitioning engine may transform at least some of the equations into groups of linear equations and/or groups of switched linear equations that are connected through nonlinear functions. The solver may determine input-output relationships of the groups of equations. A simulation model generator that may include a library of types of model elements may construct a causal simulation model.

43 Claims, 50 Drawing Sheets

(56) References Cited

U.S. PATENT DOCUMENTS

| | | | |
|---|---|---|---|
| 8,914,262 | B2 | 12/2014 | Zhang et al. |
| 8,935,137 | B1 | 1/2015 | Han et al. |
| 9,377,998 | B2 | 6/2016 | Han et al. |
| 9,411,559 | B2 | 8/2016 | Avadhanula et al. |
| 9,436,441 | B1 | 9/2016 | Venkataraman et al. |
| 9,454,627 | B1 | 9/2016 | Venkataraman et al. |
| 10,140,099 | B2 | 11/2018 | Kintaki et al. |
| 2004/0210426 | A1* | 10/2004 | Wood ............... G06F 30/20 703/2 |
| 2013/0116988 | A1 | 5/2013 | Zhang et al. |

OTHER PUBLICATIONS

Balbis, Luisella, et al., "Tutorial Introduction to the Modelling and Control of Hybrid Systems," Inderscience Enterprises Ltd., International Journal of Modelling, Identification and Control, vol. 2, No. 4, Dec. 2007, pp. 259-272.

Edström, Krister, et al., "Aspects on Simulation of Switched Bond Graphs," Jan. 1997, pp. 1-6.

"eHS User Guide," OPAL-RT Technologies Inc., 2016, pp. 1-40.

Elmqvist, H., et al., "Methods for Tearing Systems of Equations in Object-Oriented Modeling," Nov. 2001, pp. 1-7.

Gilbert, John R., et al., "Sparse Matrices in MATLAB: Design and Implementation," Xerox Corporation, Research Institute for Advanced Computer Science, and The MathWorks Incorporated, 1991, pp. 1-24.

Kredo II, Kurtis, et al., "FPGA-Accelerated Simulink Simulations of Electrical Machines," IEEE, 2015 IEEE Electric Ship Technologies Symposium (ESTS), Alexandria, VA, USA, Jun. 21-24, 2015, pp. 1-6.

Lemire, Daniel, "Streaming Maximum-Minimum Filter Using No More Than Three Comparisons Per Element," Mar. 22, 2007, pp. 1-12.

Lin, Hai, et al., "Stability and Stabilizability of Switched Linear Systems: A Survey of Recent Results," IEEE, IEEE Transcations on Automatic Control, vol. 54, No. 2, Feb. 2009, pp. 308-322.

Miller, Steve, "Modeling Physical Systems as Physical Networks with the Simscape Language," Feb. 2009, pp. 1-8.

Miller, Steve, et al., "Real-Time Simulation of Physical Systems Using Simscape," Jan. 2010, pp. 1-13.

Mosterman, Pieter, "Executing Models in Less Time-Some Solver Insight," The MathWorks, Inc., 2011, pp. 1-38.

Paoletti, Simone, et al., "Identification of Hybrid Systems: A tutorial," European Journal of Control, Mar. 2007, pp. 1-20.

"Simscape®: User's Guide," R2018b, The MathWorks, Inc., Sep. 2018, pp. 1-666.

"Simulink®: User's Guide," R2018b, The MathWorks, Inc., Sep. 2018, pp. 1-4302.

Sou, Kin Cheong, "Fast Time-Domain Simulation for Large-Order Linear Time-Invariant State Space Systems," John Wiley & Sons, Ltd., Wiley InterScience, International Journal for Numerical Methods in Engineering, Mar. 2005, pp. 681-708.

Storey, Brian D., "Numerical Methods for Ordinary Differential Equations," Sep. 2002, pp. 1-25.

Yngve, Alexander, et al., "Accelerated Simulation of Modelica Models Using an FPGA-Based Approach," Linköping University, Master of Science Thesis in Electrical Engineering Department of Electrical Engineering, Linköping University, 2018, pp. 1-87.

* cited by examiner $$(C.\nu)^\bullet = AC.i$$
$$(Exp.C.\nu)^\bullet = AC.i + Exp.D.i$$
$$f_1(Exp.D.i, Exp.C.\nu) = 0$$
$$PWL.\nu = -(C.\nu + Exp.C.\nu)$$
$$f_2(-PWL.\nu, PWL.i) = 0$$
$$AC.i = \sin(w.t)$$

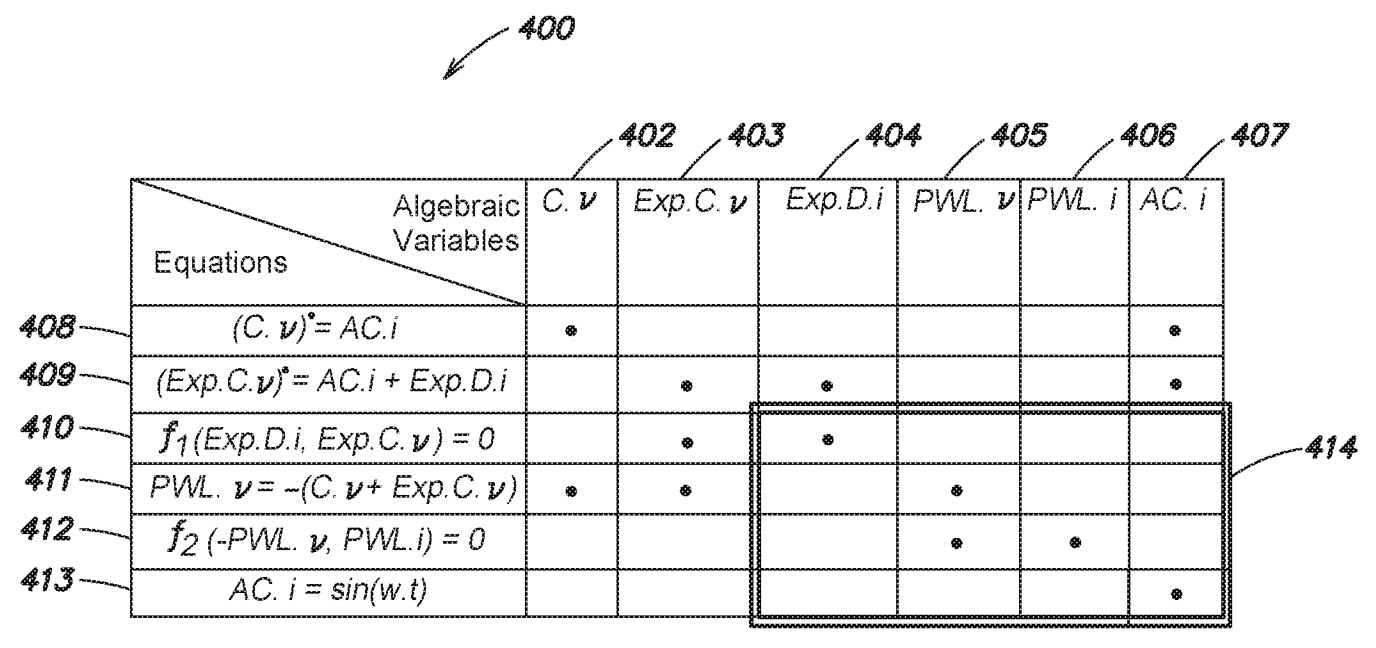

| Equations | Algebraic Variables | | | | | |
|---|---|---|---|---|---|---|
| | C.v | Exp.C.v | Exp.D.i | PWL.v | PWL.i | AC.i |
| $(C.v)' = AC.i$ | • | | | | | |
| $(Exp.C.v)' = AC.i + Exp.D.i$ | | • | • | | | • |
| $f_1(Exp.D.i, Exp.C.v) = 0$ | | • | • | | | |
| $PWL.v = -(C.v + Exp.C.v)$ | • | • | | • | | |
| $f_2(-PWL.v, PWL.i) = 0$ | | | | • | • | |
| $AC.i = \sin(w.t)$ | | | | | | • |

FIG. 4

| Equations | Algebraic Variables | C.𝜈 | Exp.C.𝜈 | Exp.D.i | PWL.i | PWL.𝜈 | AC.i |
|---|---|---|---|---|---|---|---|
| $(C.\nu)^{\bullet} = AC.i$ | | • | | | | | • |
| $(Exp.C.\nu)^{\bullet} = AC.i + Exp.D.i$ | | | • | • | | | • |
| $f_1(Exp.D.i, Exp.C.\nu) = 0$ | | | • | • | | | |
| $f_2(-PWL.\nu, PWL.i) = 0$ | | | | | • | • | |
| $PWL.\nu = -(C.\nu + Exp.C.\nu)$ | | • | • | | | • | |
| $AC.i = sin(w.t)$ | | | | | | | • |

| 700 Equations \ Algebraic Variables | $X_1$ (702) | $X_2$ (703) | $X_3$ (704) | $X_4$ (705) | $X_5$ (706) |
|---|---|---|---|---|---|
| 708: $\dot{x}_1 = f_1(X_1,X_2,X_3,X_4,X_5,)$ | • | • | • | • | • |
| 709: $\dot{x}_2 = f_2(X_1,X_2,X_3,X_4,X_5,)$ | • | • | • | • | • |
| 710: $0 = g_3(X_1,X_2,X_5)$ | • | • | | | • |
| 711: $0 = g_4(X_1,X_2,X_3,X_4)$ | • | • | • | • | |
| 712: $0 = g_5(X_1,X_2,X_3,X_4,X_5)$ | • | • | • | • | • |

FIG. 8

| 800 Equations \ Algebraic Variables | $X_3$ (802) | $X_4$ (803) | $X_5$ (804) |
|---|---|---|---|
| 806: $0 = g_3(X_1,X_2,X_5)$ | | | • |
| 807: $0 = g_4(X_1,X_2,X_3,X_4)$ | • | • | |
| 808: $0 = g_5(X_1,X_2,X_3,X_4,X_5)$ | • | • | • |

FIG. 9

| 900 Equations \ Algebraic Variables | $X_3$ (902) | $X_4$ (903) | $X_5$ (904) |
|---|---|---|---|
| 906: $0 = g_5(X_1,X_2,X_3,X_4,X_5)$ | • | • | • |
| 907: $0 = g_4(X_1,X_2,X_3,X_4)$ | • | • | |
| 908: $0 = g_3(X_1,X_2,X_5)$ | | | • |

$$1102 - \hat{A}(1) = \begin{pmatrix} 0.9901 & 4e-10 & 0 & 0 \\ -4e-13 & 0.9999 & 0 & 0 \\ -0.1098 & 9e-10 & 0 & 0 \\ -1e-11 & -9.9e-3 & 0 & 0 \end{pmatrix}$$

$$1103 - \hat{A}(2) = \begin{pmatrix} 0.9901 & 1.2e-4 & 0 & 0 \\ -9e-8 & 5.2e-4 & 0 & 0 \\ -0.1098 & 2.4e-4 & 0 & 0 \\ -2.4e-4 & -2.4e+3 & 0 & 0 \end{pmatrix}$$

$$1104 - \hat{A}(3) = \begin{pmatrix} 0.9899 & 0.4949 & 0 & 0 \\ -3.9e-3 & 0.9997 & 0 & 0 \\ -0.0201 & 0.9898 & 0 & 0 \\ -0.9897 & -0.7948 & 0 & 0 \end{pmatrix}$$

$$1105 - \hat{A}(4) = \begin{pmatrix} 0.3813 & 0.0061 & 0 & 0 \\ -4.9e-6 & 0.9999 & 0 & 0 \\ -1.237 & 0.0122 & 0 & 0 \\ -0.0122 & -9.9e-3 & 0 & 0 \end{pmatrix}$$

$$m_1^{n+1} = f(x_0^{n+1}, u^{n+1})$$
$$x_1^{n+1} = \hat{A}(m_1^{n+1}) x^n + \hat{B}(m_1^{n+1}) u^{n+1}$$

⋮

$$m_i^{n+1} = f(x_{i-1}^{n+1}, u^{n+1})$$
$$x_i^{n+1} = \hat{A}(m_i^{n+1}) x^n + \hat{B}(m_i^{n+1}) u^{n+1}$$

⋮

$$m_k^{n+1} = f(x_{k-1}^{n+1}, u^{n+1})$$
$$x_k^{n+1} = \hat{A}(m_k^{n+1}) x^n + \hat{B}(m_k^{n+1}) u^{n+1}$$

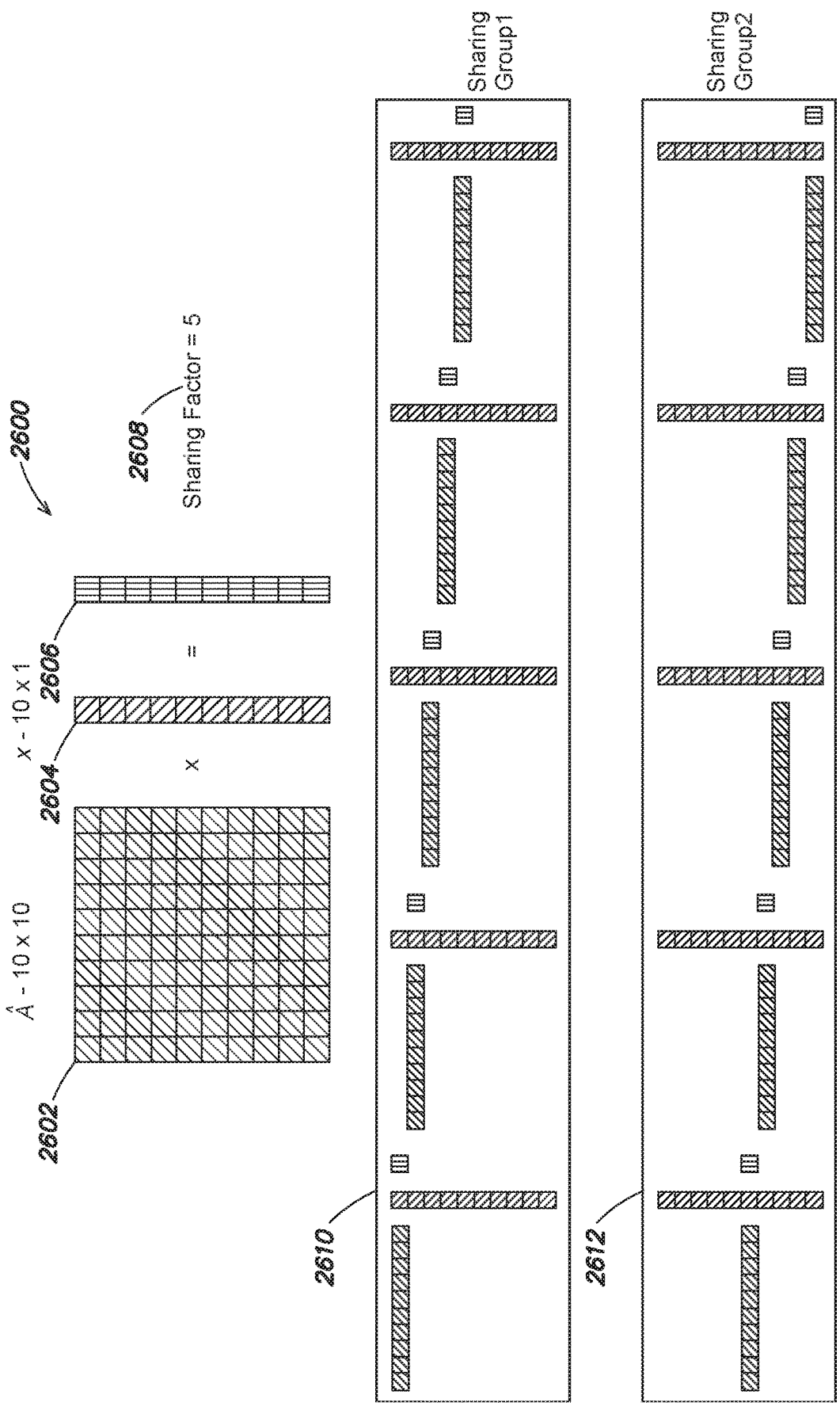

SYSTEMS AND METHODS FOR GENERATING CODE FOR COMPUTER-BASED PHYSICAL MODELS

CROSS-REFERENCE TO RELATED APPLICATIONS

The present application claims the benefit of:

U.S. Provisional Patent Application Ser. No. 62/855,178 filed May 31, 2019, by Mohamed Babaali et al. for Systems and Method for Generating Code for Computer-Based Physical Models; and U.S. Provisional Patent Application Ser. No. 62/778,688 filed Dec. 12, 2018, by Mohamed Babaali et al. for an Automatic Acceleration of Simscape Models on Hardware for HIL Applications, which applications are hereby incorporated by reference in their entireties.

BRIEF DESCRIPTION OF THE DRAWINGS

The description below refers to the accompanying drawings, of which:

FIG. 4 is a schematic illustration of an example Jacobian matrix in accordance with one or more embodiments;

FIG. 5 is a schematic illustration of an example permuted Jacobian matrix in accordance with one or more embodiments;

FIG. 7 is a schematic illustration of an example Jacobian matrix in accordance with one or more embodiments;

FIG. 8 is a schematic illustration of a submatrix generated from the matrix of FIG. 7 in accordance with one or more embodiments;

FIG. 9 is a schematic illustration of an example permuted Jacobian matrix from the submatrix of FIG. 8 in accordance with one or more embodiments;

FIG. 11 is a schematic illustration of an example of discretized state matrices in accordance with one or more embodiments;

FIG. 14 is a schematic illustration of an example iterative process in accordance with one or more embodiments;

FIG. 26 is a schematic illustration of an example resource sharing process in accordance with one or more embodiments;

DETAILED DESCRIPTION OF ILLUSTRATIVE EMBODIMENTS

Figure 1:
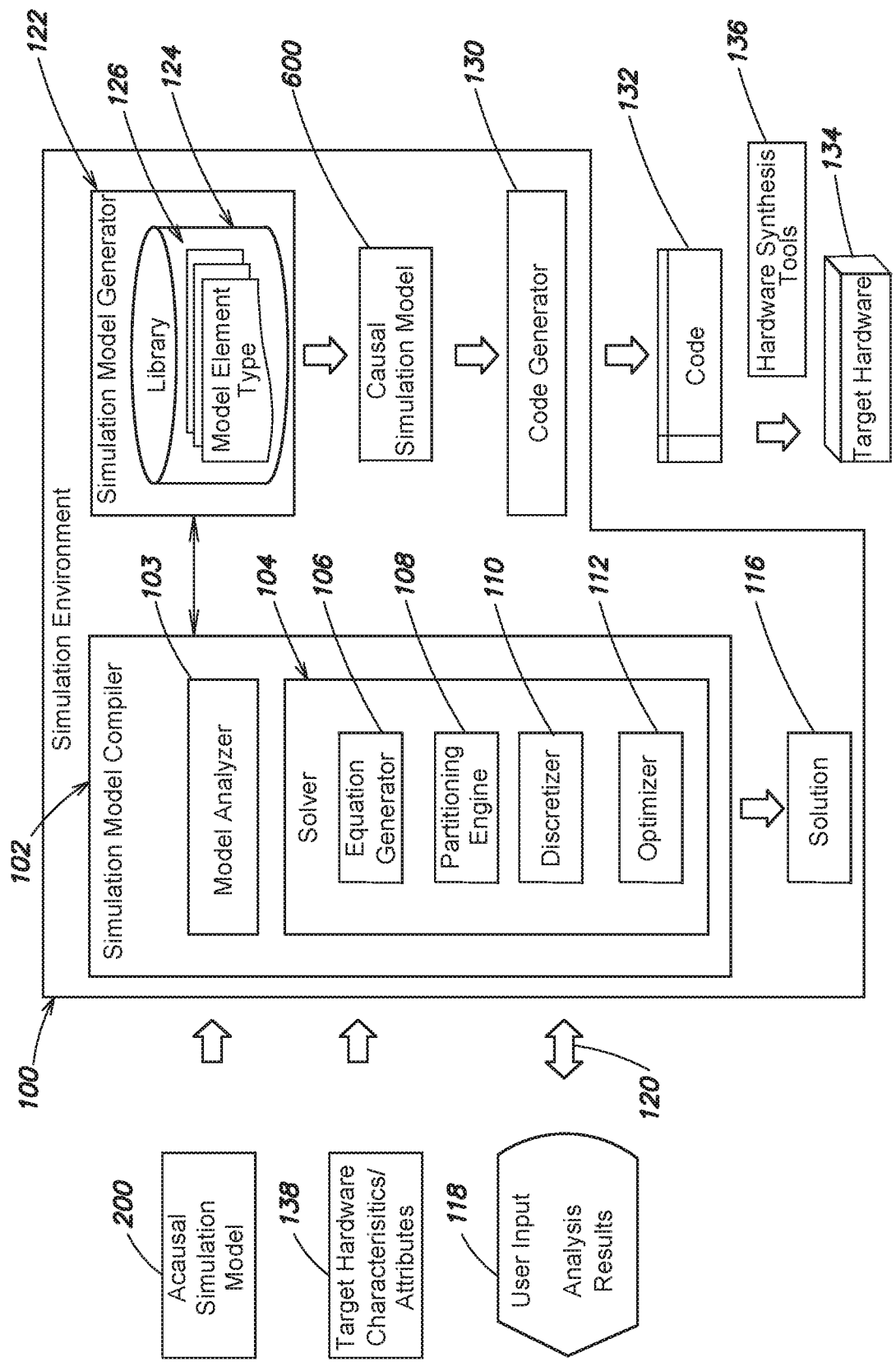
FIG. 1 is a schematic, partial illustration of an example simulation environment in accordance with one or more embodiments.

To develop a real world system, such as a control system, a user may follow a model-based design approach in which a simulation model may be created within a computer-based simulation environment. The simulation model may be an executable, and may be designed to simulate the behavior or operation of the control system being developed. During execution, sample inputs may be provided to the simulation model, and sample outputs, such as control signals, may be computed based on those inputs and other data. The outputs may be evaluated to determine whether the model behaves in the desired manner. In some embodiments, a simulation model may be a block diagram model. The blocks may perform operations or implement functionality for computing results and may be arranged, e.g., connected to establish mathematical relationships. That is, the blocks may have defined assignment and/or input-output relationships regarding the computation and exchange of computed results and the simulation model may thus be referred to as a causal model.

The simulation environment may execute a simulation model over a time span, e.g., a simulation time, which may be user specified or machine specified. Simulation time is a logical execution time, and may begin at a simulation start time and end at a simulation end time. The simulation environment may determine a series and/or sequence of simulation time steps sometimes referred to as sample times between the simulation start and end times. At each simulation time step, which may be referred to as a sample time hit, the simulation environment may compute states, inputs, and outputs of the blocks included in the model. The sizes of the simulation time steps may be fixed or may vary, and their frequency may be referred to as the sample rate. An example simulation time is 10.0 seconds. However, it should be understood that it may take the computer-based simulation environment a fraction of that in terms of physical time to simulate the model over that simulation time.

The control system being developed may be intended to control a physical system, such as a plant. The physical system may span one or more domains, such as mechanical, electrical, and/or hydraulic, among others. A computer-based model of the plant may also be created. The model of the plant may include a network of physical components or elements and the model may be referred to as a physical component model. The physical components and/or elements may represent real physical components, such as motors, pumps, drivetrains, gears, mechanical linkages, voltage sources, resistors, capacitors, diodes, etc. The physical components or elements may include non-directional connection ports through which the physical components or elements may be interconnected to construct the physical component model. The interconnections among the physical components or elements may mimic physical connections between real physical elements.

A simulation environment that may be the same or different from the one that runs the earlier described simulation model may execute the physical component model of the plant using a physical network approach. For example, the simulation environment may generate a system of equations, which may be based at least in part on conservation laws. The system of equations may include system variables that change over time. The types of system variables that may be included in the system of equations include algebraic variables and dynamic or differential variables. The equations included in the system of equations may be Differential Algebraic Equations (DAEs), and the simulation environment may solve the DAEs using one or more numerical methods to execute the physical component model. Unlike the model of the control system, the elements of the physical component model of the plant may not have defined input-output or assignment relationships. Accordingly, the physical component model of the plant may be referred to as an acausal or noncausal model. A solver included in the simulation environment may use numerical approximation methods to derive difference equations executable by a data processing device, e.g., a computer.

In some cases, the control system model may be combined with the physical component model of the plant into a single model, e.g., to model a control loop. Control signals computed by the control system model may be provided to the physical component model of the plant and at least some of the outputs computed by the physical component model of the plant may be provided to the control system model, e.g., in a feedback loop.

As part of the design and development of the physical controller, it can be beneficial to evaluate how the control system model responds to the plant's output in real time. Hardware-in-the loop (HIL) simulation may be used to perform real-time simulation. With HIL simulation, the plant model is run on target hardware operating in real time. To run the plant model on the target hardware, code may be generated for the plant model and the code may be deployed and run on the target hardware. The target hardware may be connected to a workstation running the control system model in real-time. The plant model, which is running in real-time on the target hardware may provide realistic virtual stimuli to the control system model running on the workstation.

For the plant model to execute in real time, the amount of time spent calculating a solution to the system of equations for a given simulation time step must be less than the length of physical time allocated to that simulation time step. Configuring a plant model and the solver applying the numerical approximation methods for real time execution can be difficult. If a simulation step size is too small for the target hardware to complete all of the processing to be performed in that time step an overrun occurs. Simulation may be halted in response to overruns being detected. To resolve overruns, the simulation step sizes may need to be revised, e.g., enlarged. However, this may result in the plant model no longer running in real time.

Target hardware having various types of processors may be utilized during HIL simulation. For example, the target hardware may include one or more Central Processing Units (CPUs), microprocessors, Digital Signal Processors (DSPs), Graphics Processor Units (GPUs), and/or programmable logic devices, such as Field Programmable Gate Arrays (FPGAs). FPGAs are typically made up of a finite number of predefined resources. The resources may include configurable logic blocks (CLBs), Digital Signal Processing (DSP) slices or blocks, memory blocks, such as Random Access Memory (RAM) blocks, Read Only Memory (ROM) blocks, and input/output (I/O) blocks, among others. The DSP slices often include predefined function blocks, such as multipliers, adders, and accumulators as well as input and output registers and pipeline registers. The CLBs, DSP slices, RAM blocks, and ROM blocks may be arranged at least conceptually in columns or rows on the FPGAs.

The present disclosure relates to systems and methods for transforming an acausal simulation model into a form that is suitable for real-time execution and/or for efficient execution by target hardware.

FIG. 1 is a schematic, partial illustration of an example simulation environment 100 in accordance with one or more embodiments. The simulation environment 100 may include a simulation model compiler 102, which in turn may include a model analyzer 103 and a solver 104. The solver 104 may include an equation generator 106, a partitioning engine 108, a discretizer 110, and an optimizer 112. The simulation model compiler 102 may access or receive an acausal simulation model 200, and the solver 104 may generate a solution, indicated at 116, for simulating the acausal simulation model 200. For example, the equation generator 106 may generate a system of equations for the acausal model. The partitioning engine 108 may transform at least some of the equations into groups of equations, e.g., partitions, whose inputs/outputs are connected directly. In some cases, the partitioning engine 108 may transform at least some of the equations into groups of linear equations and/or groups of switched linear equations that are connected through nonlinear functions. The solver 104 may determine an order of execution of the groups of equations. The order may be based on the equations computation and use of variables such that values for variables are computed by and passed to equations in a combination of cascading and parallel execution units. In some embodiments, the solver 104 may construct a directed acyclic graph that expresses the order of execution. Nodes of the graph may represent the equations and/or the groups of equations. The discretizer 110 may discretize the equations over a time domain producing the solution 116. The solution 116 may be machine instructions suitable for real-time execution by the simulation environment 100.

A switched linear equation may be defined as $$A(m)*x+f(x\_other)=0$$

where, x are variables computed by, e.g., owned by, a respective partition, and x_other is a vector combining other upstream variables and differential variables, where upstream is determined relative to the direction of cascade of execution units, and m is a mode vector, with binary values, that may depend on (x,x_other).

An iterative process may be required to find a solution for x to determine the mode.

For a linear equation, m is size zero or absent.

Among other advantages, the sum of computational costs for the groups of linear and switched linear equations as generated by the partitioning engine 108 may be lower than the computational costs for solving the original system of equations for the acausal model.

In some embodiments, the simulation model compiler 102 may present results of its analysis or processing of the acausal model 200, e.g., to a user, during the generation of the solution 116. The simulation model compiler 102 also may receive input and/or feedback from the user to guide its generation of the solution 116, as indicated by display device 118 and arrow 120. For example, the solver 104 may be configured to generate a family of solutions for the acausal model 200. The solver 104 may utilize the user input, which may concern desired accuracy, stability, and robustness, and the manner of eliminating or avoiding algebraic loops, to produce the specific solution 116.

The environment 100 may further include a simulation model generator 122 that may include or have access to memory, such as one or more libraries, indicated at 124. The libraries 124 may include types of model elements 126, e.g., blocks, that are supported by the simulation environment 100. Based on the solution 116 computed by the solver 104, the simulation model generator 122 may construct a causal simulation model 600. Results computed during execution of the causal simulation model 600 constructed by the simulation model generator 122 may be numerically equivalent, e.g., within a tolerance or threshold, to results computed during execution of the acausal model 200, for example within a tolerance. The causal simulation model 600 may be presented to the user, e.g., at the display device 118. In some embodiments, a family of causal simulation models, for example corresponding to the family of solutions generated by the solver 104, may be presented to the user at the display device 118. The user input and/or feedback may include selection of one or more models from the family of causal models.

In some embodiments, the simulation environment 100 may include or be accessible by a code generator 130. The code generator 130 may generate code, indicated at 132, based on the causal model 600 and/or the specific solution 116. The generated code 132 may be executable outside of the simulation environment 100. For example, the code 132 may be source code, e.g., C code, C++ code, etc., and the source code may be compiled into an executable, such as object code, and deployed at, e.g., loaded into memory of, the target hardware 134. If the target hardware 134 includes a programmable logic device, the generated code may be Hardware Description Language (HDL) code and one or more hardware synthesis tools 136 may be used to configure the programmable logic device from the HDL code 132.

In some embodiments, the simulation model compiler 102 may further receive or have access to target hardware characteristics and/or attributes 138 for the target hardware 134. Exemplary characteristics and/or attributes include processor speed, number of processing cores for a multi-core CPU, clock rate and number and type of hardware elements for an FPGA, etc. The optimizer 112 may guide the generation of the specific solution 116 so that the solution 116 will fit on and be optimized for the target hardware 134 based on the received characteristics and/or attributes.

One or more of the solver 104, the simulation model generator 122, and the code generator 130 and/or one or more of the parts thereof may be implemented through one or more software modules or libraries containing program instructions that perform the methods described herein, among other methods. The software modules may be stored in one or more memories, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In other embodiments, one or more of the solver 104, the simulation model generator 122, and the code generator 130 may themselves be implemented in hardware, such as hardware registers and combinational logic configured and arranged to produce sequential logic circuits. In alternative embodiments, various combinations of software and hardware, including firmware, may be utilized to implement the described methods.

The simulation environment 100 may be a high-level simulation application program. Suitable high-level simulation application programs include the MATLAB® language/ programming environment, the Simulink® simulation environment, and the Simscape physical modeling system from The MathWorks, Inc. of Natick, Mass., the MapleSim physical modeling and simulation tool from Waterloo Maple Inc. of Waterloo, Ontario, Canada, the SimulationX modeling system from ESI ITI GmbH of Dresden, Germany, and the Dymola modeling and simulation environment from Dassault Systemes SE (3DS) of Vélizy-Villacoublay, France. Simulation models created in the high-level modeling environment 200 may be expressed at a level of abstraction that contain less implementation detail, and thus operate at a higher level than high-level programming languages, such as the C, C++, C#, and SystemC programming languages.

The simulation environment 100 may receive and/or access the acausal simulation model 200. For example, the simulation environment 100 may receive user inputs opening, creating, and/or revising the acausal model 200. In some embodiments, the acausal simulation model 200 may be a physical component model, such as a Simscape model, among others.

Figures 2, 3:
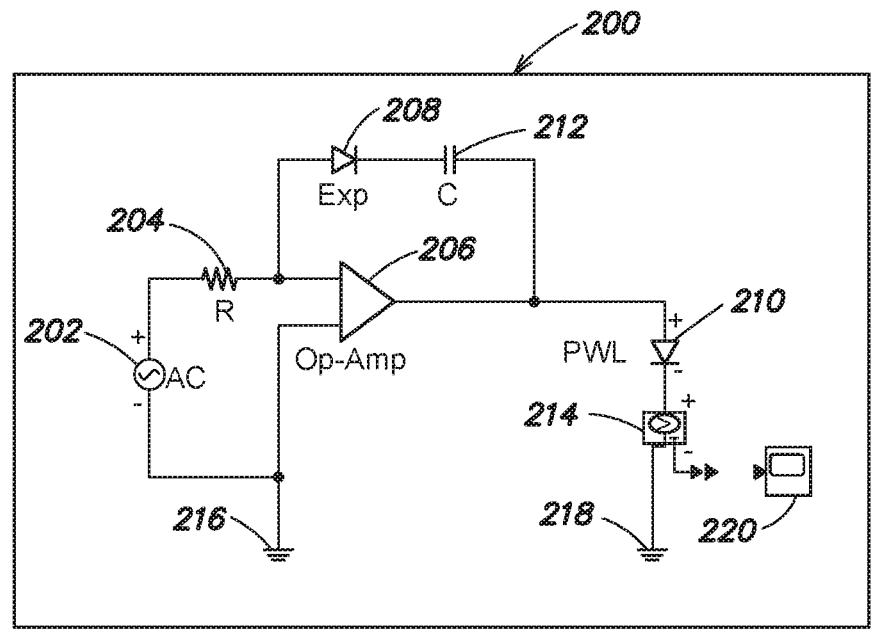
FIG. 2 is a visual depiction of an example acausal physical component model in accordance with one or more embodiments.
FIG. 3 is a partial illustration of an example system of equations generated for an acausal simulation model in accordance with one or more embodiments.

FIG. 2 is a visual depiction of an example acausal physical component model 200 in accordance with one or more embodiments. The physical component model 200 may model an electrical circuit. The physical component model 200 may include an Alternating Current (AC) voltage source element 202, a resistor element 204, an Operational Amplifier (Op-Amp) element 206, an Exponential (Exp) diode element 208, a piecewise linear (PWL) diode element 210, a capacitor element 212, a voltage sensor element 214, two ground elements 216 and 218, and a Scope block 220. The Scope block 220 may be a dynamic block rather than a physical component. One or more parameters may be associated with the elements of the model 200. For example, the parameters for the AC voltage source element 202 may include peak voltage amplitude, phase shift, and frequency. The parameters for the resistor element 204 may be its resistance. The parameters for the Op-Amp element 206 may include forward voltage, on resistance, and off conductance. The parameters for the diode elements 208 and 210 may include forward voltage, on resistance, and off conductance. The parameters for the capacitor element 212 may include capacitance, series resistance, and parallel conductance.

Exemplary simulation models include Simscape models, MapleSim models, Dymola models, and Modelica models from the Modelica Association.

Other exemplary simulation modelling environments include the SimEvent® discrete-event modeling tool and the Stateflow® state chart tool also from The MathWorks, Inc., the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y.

The equation generator 106 may construct a system of equations for the acausal physical component model 200. The equation generator 106 may construct the system of equations based on Kirchhoff's circuit laws using the param-eters associated with the elements of the model 200 and the physical network and/or layout of the model 200.

In some embodiments, the equation generator 106 may generate the system of equations as a set of semi-explicit index-1 Differential Algebraic Equations (DAEs), which may be of the form:

$$\dot{x}=f(x,z,t)$$

$$g(x,z,t)=0$$

where
x are differential variables,
z are algebraic variables, and
t is time.

Index-1 means that differentiating the function $g(x,z,t)$ once with respect to time yields an Ordinary Differential Equation (ODE).

In some embodiments, the equation generator 106 may receive and/or initially produce the system of equations in the form of State Space Equations of the form:

$$M\dot{x}(t)=A(m)x(t)+B(m)u(t)$$

$$y(t)=C(t)x(t)+D(t)u(t)$$

where
M is the mass matrix,
x is the state vector,
$\dot{x}$ (x dot notation) is the state vector differentiated with resect to time
y is the output vector,
u is the input vector,
t is simulation time,
A is the state or system matrix,
B is the input matrix,
C is the output matrix, and
D is the feedthrough or feedforward matrix.

In this case, the equation generator 106 may transform the State Space Equations to the above-described semi-explicit index-1 formulation.

FIG. 3 is a partial illustration of an example system of equations 300 generated for the acausal simulation model 200 in accordance with one or more embodiments. The set of equations 300 includes five equations 302-307. Equations 302 and 303 are differential equations in the form $\dot{x}=f(x,z,t)$, equations 304-307 are algebraic equations in the form $g(x,z,t)=0$.

As noted, the equations 302-307 include the following time varying algebraic state variables:
C. v
Exp. C. v
Exp. D. i
PLW. v
PLW. i
AC. i The partitioning engine 108 may compute the Jacobian matrix for all or at least some of the set of equations 300, e.g., the semi-explicit index-1 DAEs. In some embodiments, the Jacobian matrix may be computed with respect only to the algebraic variables, and not with respect to derivative variables.

FIG. 4 is a schematic illustration of an example Jacobian matrix 400 in accordance with one or more embodiments. The Jacobian matrix 400 may include six columns 402-407 for the two differential and four algebraic variables that appear in the equations 302-307. The matrix 400 may also include six rows 408-413 for the six equations 302-307. An element of the matrix 400 that is marked with a specific designation, such as the solid circles, indicates that the given algebraic variable for that column appears in the Jacobian computed for the equation for that row. An empty cell or record of the matrix 400 indicates that the given algebraic variable for that column does not appear in the Jacobian computed for the equation for that row. The partitioning engine 108 may utilize a predefined function, such as the 'jacobian' function of the MATLAB programming language, to compute the Jacobian matrix.

In some embodiments, the partitioning engine 108 may apply or perform one or more decomposition operations or processes on the Jacobian matrix 400 or a portion thereof, e.g., a submatrix. In some embodiments, the partitioning engine 108 may apply the Dulmage-Mendelsohn decomposition to the matrix or a submatrix thereof. The Dulmage-Mendelsohn decomposition partitions a matrix to an upper block-triangular matrix. That is, the Dulmage-Mendelsohn decomposition rearranges the elements of a matrix to produce an upper block-triangular matrix. More specifically, the partitioning engine 108 may apply the fine Dulmage-Mendelsohn decomposition.

The partitioning engine 108 may utilize a predefined function, such as the 'dmperm' function of the MATLAB programming language, to perform the Dulmage-Mendelsohn decomposition on the submatrix.

Performing the permutation on the entire system of equations 300 generated for the acausal model 200 may produce a group of arbitrary DAEs.

The partitioning engine 108 may analyze the upper block-triangular matrix 500 and group the equations into sets. If the entire system of equations 300 are subjected to the permutation, the partitions may be large. For example, in some cases, there may only be one single partition for the equations of the acausal model 200.

In some embodiments, before performing the permutation, the partitioning engine 108 may produce a submatrix of the Jacobian matrix 400. For example, the partitioning engine 108 may remove the rows of the Jacobian matrix 400 that are associated with differential equations, such as rows 408 and 409 and the columns associated with differential variables, such as columns 402 and 403, thereby producing a submatrix, as indicated at 415 marked with the double border. The resulting submatrix 414 may be a square matrix, e.g., 4×4, and may be nonsingular.

The partitioning engine 108 may apply or perform one or more decomposition operations or processes, e.g., the Dulmage-Mendelsohn decomposition, on the submatrix 414 produced from the Jacobian matrix 400. The Dulmage-Mendelsohn decomposition may rearrange the elements of the submatrix 414 to produce an upper block-triangular matrix.

FIG. 5 is a schematic illustration of an example permuted Jacobian matrix 500 in accordance with one or more embodiments. Like the original Jacobian matrix 400, the permuted Jacobian matrix 500 includes six columns 502-507 for the six algebraic variables and six rows 508-513 for the six equations. However, the order of the algebraic variables and the equations of the permuted matrix 500 are different. As a result of applying the Dulmage-Mendelsohn decomposition to the submatrix 414, the portion of the permuted matrix 500 that corresponds to the submatrix 414, indicated at 514 marked with the double border, is upper block-triangular.

As a result, of the permutation, the original system of equations 300 generated for the acausal model 200 are now represented by systems or groups of implicit algebraic equations that are connected together. For example, blocks of elements located along the diagonal of the upper block-triangular matrix 514 may represent sets of switched linear equations in the algebraic variables involved. In addition, off-diagonal elements may be explicit functions that may be nonlinear with little impact on the performance of the solution versus linear or switched-linear functions.

As a result of the permutation, the algebraic equations generated for the acausal model 200 are now represented by systems or groups of equations whose inputs/outputs are connected directly. The partitioning engine 108 may analyze the upper block-triangular matrix 514 and group the equations into sets, e.g., partitions. The partitioning engine 108 may identify four partitions. One partition may include equation 307 associated with row 513 as indicated by rectangular border 516. Another partition may include equation 305 associated with row 512 as indicated by the rectangular border 518. A further partition may include equation 306 associated with row 511 as indicated by the rectangular border 520. Another partition may include equation 304 associated with row 510 as indicated by the rectangular border 522.

The simulation model generator 122 may access and utilize the equations generated by the equation generator 106 and the input-output and/or assignment relationships determined by the partitioning engine 108 from the permuted matrix 500 to generate the causal simulation model 600. The simulation model generator 122 may analyze the equations and determine which model element types perform the same functionality as the equations. The simulation model generator 122 may include instances of these model element types in the causal simulation model 600. The simulation model generator 122 may construct the causal simulation model 600 according to the syntax and semantics of the simulation environment 100 for causal models.

Figure 6:
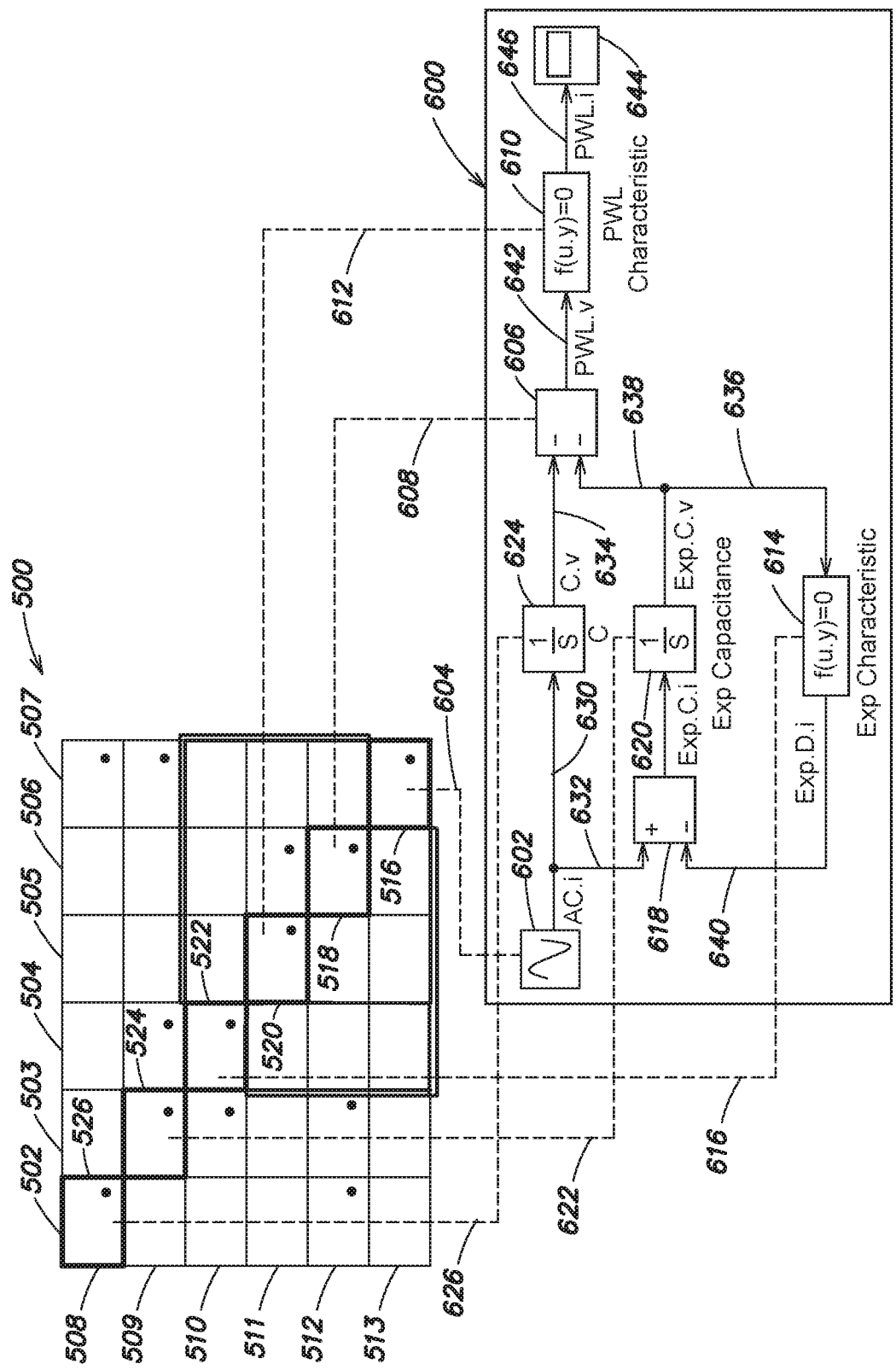
FIG. 6 is a schematic illustration of an example causal model generated for a causal simulation model in accordance with one or more embodiments.

FIG. 6 is a schematic illustration of an example causal model 600 generated from the set of equations represented by the permuted upper block-triangular matrix 500 in accordance with one or more embodiments.

The simulation model generator 122 may analyze the set of algebraic equations included in the partition 516, e.g., the equation 307. The equation 307 included in the first partition 516 computes the algebraic variable AC. i. As noted, the equation 307 associated with the first partition 516 computes the voltage generated by the AC voltage source element 202. The equation 307 uses a sin function to compute the voltage. The simulation model generator 122 may identify a Signal Generator block, which is a source block, from the library 124 as having equivalent functionality. In some embodiments, the library 124 may include metadata for the model element types 126. The metadata may describe the functionality of the model element types 126. The simulation model generator 122 may search the metadata to identify a model element type 126 that includes the same functionality as the equation being analyzed. The simulation model generator 122 may include a Signal Generator block 602 in the causal model 600. The simulation model generator 122 may configure the Signal Generator block 602 to compute a sine wave signal for the algebraic variable AC. i. The Signal Generator block 602 may include one or more parameters and the simulation model generator 122 may set the one or more parameters so that the Signal Generator block 602 has the same functionality as the equation 306, which may be mapped to the Signal Generator block 602 as indicated by dashed line 604.

The simulation model generator 122 may analyze the set of algebraic equations included in the partition 518, e.g., the equation 305. The equation 305 computes the algebraic variable PWL. v by taking the negative of the sum of the differential variables C. v and Exp. C. v. The simulation model generator 122 may identify a Subtract block as having equivalent functionality as the equation 305 of the partition 518. The partitioning engine 108 may include a Subtract block 606 in the causal simulation model 600. The simulation model generator 122 may configure the Subtract block 606 to have the same functionality as the equation 305 as indicated by dashed line 608. As described, the simulation model generator 122 may implement explicit equations, such as equation 305, using one or more explicit function blocks, e.g., the Subtract block 606.

The simulation model generator 122 may analyze the set of algebraic equations included in the partition 520, e.g., the equation 306. The equation 306 computes the algebraic variable PWL. i. Suppose the simulation model generator 122 is unable to identify one or more blocks that have equivalent functionality of the equation 306 of the partition 520. The simulation model generator 122 may include one or more custom code blocks, such as custom code block 610, in the causal simulation model 600 and may automatically generate code implemented by the custom code block 610 based on the equation 306 associated with the partition 520. The code generated for the custom code block 610 may correspond to a programming language, such as C, C++, MATLAB, etc. The simulation model generator 122 may configure the custom code block 610 to have the same functionality as the equation 306 as indicated by dashed line 612.

The simulation model generator 122 may analyze the set of algebraic equations included in the partition 522, e.g., the equation 304. The equation 304 computes the algebraic variable Exp. D. i. To compute the algebraic variable Exp. D. i, the equation may need values for the differential variable Exp. C. v. The simulation model generator 122 again may be unable to identify one or more blocks from the library 124 having equivalent functionality. Accordingly, the simulation model generator 122 may include another custom code block 614 in the causal model 600. The simulation model generator 122 may configure the custom code block 614 to have the same functionality as the equation 304 as indicated by dashed line 616.

As described, the simulation model generator 122 may utilize one or more custom code blocks to implement implicit equations, e.g., implicit algebraic equations. In some embodiments, the custom code blocks 610 and 614, which may be referred to as implicit equation model elements, may be implemented using S-function blocks of the Simulink® simulation environment. The S-function blocks may be configured to prevent user modification. For example, they may be configured as read only. The partitioning engine 108 may automatically generate the code implemented by the custom code blocks 610 and 614 based on the equations implemented by the custom code blocks 610 and 614. As noted, the code utilized by the custom code blocks 610 and 614 may correspond to a programming language, such as C, C++, MATLAB, etc.

The simulation model generator 122 may also analyze the differential equations, e.g., equations 302 and 303. In some embodiments, the simulation model generator 122 may use at least one model element or block connected to an Integrator block's input to represent a differential equation computing a differential variable, where the at least one block represents the right-hand side of the differential equation:

$$\dot{x}=f(x,z,t)$$

and the Integrator block outputs x.

For example, the simulation model generator 122 may consider the set of equations of the partition 524, e.g., equation 303 for computing the differential variable Exp. C. v. The simulation model generator 122 may utilize an Add block 618 configured to provide its output to an Integrator block 620 to implement the equation 303 for computing the differential variable Exp. C. v. The Add block 618 and the Integrator block 620 may include one or more parameters and the simulation model generator 122 may set the one or more parameters so that the Add block 618 and the Integrator block 620 have has the same functionality as the equation 303 as indicated by dashed line 622. As described, in some embodiments, the simulation model generator 122 or the solver 104 may consolidate the Add block 618 and the Integrator block 620 into a single block, e.g., an Integrator block. As illustrated in FIG. 6, the functionality has optionally been exploded into the two blocks 618 and 620.

The simulation model generator 122 may consider the set of equations of the partition 526, e.g., equation 303 for computing the differential variable C. v. The simulation model generator 122 may utilize an Integrator block 624 to implement the equation 302 for computing the differential variable C. v. The Integrator block 624 may include one or more parameters and the simulation model generator 122 may set the one or more parameters so that the Integrator block 624 has the same functionality as the equation 302 as indicated by dashed line 626. In some embodiments, the simulation model generator 122 may include a unit Gain block between the Sin block 602 and the Integrator block 624. In FIG. 6, this unit Gain block is optimized away by the optimizer 112.

As described, the simulation model generator 122 may utilize one or more integrator model elements, for example Integrator blocks 620 and 624, to implement differential equations.

The partitioning engine 108 may evaluate the matrix of equations following the permutation to determine the input-output relationships among the blocks of the causal model 600. The simulation model generator 122 may include directed connections, such as arrows, among the blocks of the causal model to represent the input-output relationships.

For example, the algebraic variable AC. i computed by Sin block 602 may be used as an input for equations 302 and 303, which are implemented through the Integrator blocks 620 and 624. Accordingly, the simulation model generator 122 may place an arrow 630 from the Sin block 602 to the Integrator block 624, which implements equation 302 associated with row 508 and an arrow 632 from the Sin block 602 to the Add block 618, which together with the Integrator block 620 implements equation 303 associated with row 509.

The differential variable C. v computed by the Integrator block 624 may be used as an input for equation 305 associated with row 512. Accordingly, the simulation model generator 122 may place an arrow 634 from the Integrator block 624 to the Subtract block 606, which implements equation 305 associated with row 512.

The differential variable Exp. C. v computed by the Integrator block 620 may also be used as an input for equations 304 and 305 associated with rows 510 and 512. Accordingly, the simulation model generator 122 may place arrow 636 from the Integrator block 620 to the custom code block 614, which implements equation 304 associated with row 510, and arrow 638 from the Integrator block 620 to the Subtract block 606.

The algebraic variable Exp. D. i computed by the custom code block 614 may be used as an input for equation 303 associated with row 509 and implemented by the Add block 618 and the Integrator block 620. Accordingly, the simulation model generator 122 may place an arrow 640 from the custom code block 614 to the Add block 618, which together with the Integrator block 620 implements equation 303 associated with row 509.

The algebraic variable PWL. v computed by the Subtract block 606 may be used as an input for equation 306 implemented by the custom block 610 and associated with the row 511. Accordingly, the simulation model generator 122 may place an arrow 642 from the Subtract block 606 to the custom code block 610.

The simulation model generator 122 may include a Scope block 644 in the causal model 600. The simulation model generator 122 may also include an arrow 646 from the custom code block 610, which computes the algebraic variable PWL. i, to the Scope block 644. The value of the algebraic variable PWL. i may thus be presented on a display element associated with the Scope block 644.

In determining the input-output relationships among the blocks of the causal model 600, the simulation model generator 122 may utilize the sequence of partitions along the diagonal of the permuted submatrix 514 in a cascading manner. For example, the algebraic variables computed by the equations associated with one partition may be used as inputs to equations included in partitions located further along the diagonal, e.g., above the current partition. At this stage, e.g., before discretization of the causal model 600, Integrator blocks, such as Integrator blocks 620 and 624, do not have direct feedthrough. Therefore, it may be guaranteed that the causal model does not include algebraic loops. Furthermore, the causal model 600 may be integrated efficiently by a global continuous solver, including explicit global solvers.

The simulation model generator 122 may configure the arrows in the model 600 according to the syntax and semantics implemented by the simulation environment 100.

In some embodiments, the simulation model generator 122 may present a visual presentation of the causal simulation model 600, e.g., on the display device 118.

The discretizer 110 may discretize the causal simulation model 600 over the time domain, which may be simulation time. As described, the causal simulation model 600 may include differential equations. The discretizer 110 may derive difference equations that approximate differential equations included in the causal simulation model 600. The discretizer 110 may implement one or more methods for deriving difference equations to approximate solutions for differential equations. The methods may be implicit or explicit. A non-exhaustive list of numerical approximation methods includes Backward Euler (implicit) Forward Euler (explicit), Trapezoidal Rule (implicit), Runge-Kutta methods (implicit and explicit), and multi-step methods.

Different approximation methods may have different accuracy, stability, and robustness.

In some embodiments, the discretizer 110 may apply an implicit solver, e.g., the Backward Euler approximation method, to improve the stability of the solution as compared to using an explicit solver. As described, however, an explicit solver may nevertheless be applied where the implicit solver introduces an algebraic loop.

In some embodiments, a user may select the approximation method used by the discretizer 110.

As noted, it may be guaranteed that the causal model before discretization does not include algebraic loops. The introduction of an algebraic loop may occur, however, following discretization of the causal model 600, for example depending on the numerical approximation technique that is used. An algebraic loop may occur when a signal loop exits in a causal simulation model with only direct feedthrough model elements in the loop. Direct feedthrough may mean that an element's output depends on the value of an input, and the value of the input directly controls the value of the output, as opposed to a non-direct-feedthrough element in which the element maintains a state variable. A direct relationship such as direct control may be in the form of an algebraic relationship (e.g., an equation). Examples of direct feedthrough blocks from the Simulink simulation environment include math function blocks, gain blocks, and product blocks, among others. Examples of non-direct-feedthrough blocks include Integrator blocks and Unit Delay blocks of the Simulink® simulation environment.

In some cases, using the Backward Euler discretization approach may introduce an algebraic loop in the causal model 600. In some embodiments, the discretizer 110 may determine if the Backward Euler approach introduces an algebraic loop in the causal model 600. For example, Backward Euler may result in an algebraic loop at the Integrator block 620. If so, the discretizer 110 may apply an explicit numerical approximation technique, such as Forward Euler, to eliminate an algebraic loop introduced into the causal simulation model 600 during discretization of the causal simulation model 600. For example, the discretizer 110 may use an explicit solver, which does not have direct feedthrough between inputs and outputs, such as Forward Euler, to solve a portion of the causal model 600, such as the Integrator block 620, while using an implicit solver, which has direct feedthrough between inputs and outputs, such as Backward Euler or Trapezoidal, to solve other portions of the causal model 600. That is, the discretizer 110 may make one or more local solver choices for one or more portions of the causal model 600, such as using an explicit solver (Forward Euler) for an Integrator block, when using implicit solver (Backward Euler or Trapezoidal) would result in an algebraic loop. As another option, the partitioning engine 108 may merge the blocks forming the algebraic loop into a single block, and the discretizer 110 may discretize the merged block using an implicit approximation technique, such as Backward Euler. For example, the discretizer 110 may merge the custom code block 614, the Add block 618, and the Integrator block 620. As a further option, the partitioning engine 108 may automatically add a non-direct-feedthrough block in the loop, such as a Delay block or a Filter block, among others. In some embodiments, the simulation environment 100 may include an algebraic loop solver that may be able to solve algebraic loops in the causal simulation model 600.

The custom code blocks 610 and 614 may implement implicit algebraic equations and may require a nonlinear solver, e.g., implementing an iterative approach, such as Newton's method.

In other embodiments, simulation model generator 122 may use one or more graphical affordances to mark the algebraic loop in a visual presentation of the causal simulation model 600. The user may then modify the discretized causal simulation model 600 to eliminate the algebraic loop. For example, the user may insert a non-direct-feedthrough block, such as a Unit Delay block in the algebraic loop.

In some embodiments, the simulation environment 100 may include an algebraic loop solver that may be able to solve algebraic loops appearing in a causal simulation model generated by the simulation model generator 122.

If the set of equations generated by the equation generator 106 for an acausal model are index-1, then the causal model generated by the solver 104 and the simulation model generator 122 may be guaranteed to include solvable blocks without having to perform merging.

Following the discretization, the causal simulation model 600 may be run by the simulation environment 100. For example, a user may direct the simulation environment 100 to execute, e.g., run, the causal model 600 using sample input data, and setting model and block parameters. In some embodiments, model execution may include a compile stage, a link stage, and a simulation loop stage. The compile and link stages may be performed by the model compiler 102 of the simulation environment 100. The compile stage may mark the start of execution of the model 600, and may involve preparing data structures and evaluating parameters, configuring and propagating block characteristics (e.g., sample times, data types, etc.), determining block connectivity, performing block reduction and block insertion, and generating a sorted order of the equations corresponding to the blocks of the model. Block reduction may include collapsing and/or reducing one or more groups of blocks. For example, blocks or signals determined to be in an unused code path, e.g., dead code, rate transition blocks whose input frequency is faster than their output frequency, and type conversion blocks determined to be unnecessary may be collapsed or removed.

The preparation of data structures and the evaluation of parameters may create and initialize one or more data structures used in the compile stage. For each block, a method may force the block to evaluate all of its parameters. During the configuration and propagation of block and port/signal characteristics, the compiled attributes (such as data dimensions, data types, complexity, sample modes, and sample time) of each block (and/or ports) may be setup on the basis of the corresponding behaviors and the attributes of blocks (and/or ports) that are connected to the given block through connections, e.g., arrows. Attributes may also be setup based on the context of a block or a component in a model. For example, a subsystem that has a given sample time may have this sample time be set to the sample time of blocks included in the subsystem.

The attribute setup may be performed through a process during which block behaviors "ripple through" the model 600 from one block to the next following signal or other connectivity, as well as through the hierarchical structure of the model 600, and may for example follow connectivity in a forward or backward manner. This process is referred to as "propagation." In the case of a block that has explicitly specified its block behaviors or the behaviors of its ports, propagation may help ensure that the attributes of the block are compatible with the attributes of the blocks connected to it or contained by it. If not, an error may be issued. At least some blocks may be implemented to be compatible with a wide range of attributes. Such blocks may adapt their behavior in accordance with the attributes of the blocks connected to them. The exact implementation of the block may be chosen on the basis of the model in which the block is located. Included within this step are other aspects such as validating that all rate-transitions yield deterministic results, and that the appropriate rate transition blocks are being used.

The compilation step also may determine block connectivity. For example, a model may include one or more virtual blocks that may play no semantic role in the execution of the model. In this step, the virtual blocks may be optimized away, e.g., removed, and the remaining non-virtual blocks may be reconnected to each other appropriately. This compiled version of the model with actual block connections may be used from this point forward in the execution process, e.g., stored in memory as an internal representation or intermediate representation.

One or more in memory representations, such as intermediate representations (IRs), may be generated by the model compiler 102. At least one of the IRs may be in the form of a directed graph, such as a hierarchical, Data Flow Graph (DFG) having a plurality of nodes interconnected by edges. The nodes of the IR may represent blocks from the executable graphical model, the edges of the IR may represent connections among the model's blocks. Special nodes of the IR may be used to provide hierarchy in the IR, for example, by abstractly representing subsystems or other components of the model. In some implementations, blocks of the model may map to one or more nodes of the IR, and lines or arrows of the model may map to one or more edges of the IR.

It should be understood that an IR may take other forms, such as a Control Flow Graph (CFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as the main memory or a persistent memory of a data processing device.

Following the compilation stage, code may or may not be generated for the model 600. If code is generated, the model may be executed through an accelerated execution mode in which the model, or portions of it, is translated into either software modules or hardware descriptions, which is broadly referred to herein as code. If this stage is performed, then the stages that follow may use the generated code during the execution of the model. If code is not generated, the model may execute in an interpretive mode in which the compiled and linked version of the model may be directly utilized to execute the model over the desired time-span. When users generate code for a model, they may choose to not proceed further with the model's execution. For example, they may choose to take the generated code and deploy it outside of the confines of the modeling environment.

The link stage may involve memory allocation, and generation of a block method execution list, e.g., from the sorted order. During the simulation loop stage, the compiled and linked version of the model may be directly utilized by a simulation engine to execute the model in an interpreted mode. The way in which the input and output of blocks are interconnected in the model does not necessarily define the order in which the equations (methods) corresponding to the individual blocks will be solved (executed). The actual order may be determined during the sorting step in compilation.

Alternatively or additionally to model execution, the code generator 130 may generate code for at least a portion of the causal model 600. In some embodiments, the generated code may be utilized in Hardware-in-the-Loop (HIL) testing. Alternatively or additionally to model execution and/or HIL testing, code generated for the model may be deployed, for example as embedded software on an embedded system or other target hardware platform, such as the target hardware 134.

An exemplary sorted order that may be determined for the causal model 600 is: 602, 624 (Backward Euler), 620 (Forward Euler), 614, 618, 606, 610.

As noted, the simulation model generator 122 may present one or more visual depictions of the causal simulation model 600 generated for the acausal model 200, e.g., on a display of a workstation. The one or more presentations may be complete and/or partial representations of the causal simulation model 600. For a partial representation, one or more blocks and/or one or more connections among the blocks, e.g., arrows, may be omitted.

The simulation model generator 122 may present other information in addition to or instead of the visual depiction of the causal simulation model. For example, the simulation environment 100 may present the sorted order of blocks for the causal simulation model as determined by the solver 104, e.g., together with a partial representation of the causal simulation model.

In some embodiments, the simulation model generator 122 may include pointers in the causal simulation model, for example at the blocks and/or connections. The pointers may point to the equations and/or variables of the set of equations associated with the respective blocks and/or connections. The pointers may be hyperlinks. In response to a selection of a hyperlink, e.g., by a user, the simulation model generator 122 may present a graphical affordance, such as a popup window, a window pane, the causal model, etc. that presents the associated equations and/or variable. The simulation model generator 122 may include information about the equations and/or variables being presented in the graphical affordance, such as whether the equations are switched linear, linear, or nonlinear, and for switched linear equations the number of modes and their configurations.

In some embodiments, the simulation environment 100 may support an acausal programming language. A user may author code such as source code to create a custom block of an acausal model. The source code may be compiled by the simulation model compiler 102 and executed. An exemplary programming language is the Simscape language from The MathWorks, Inc. Pointers including hyperlinks to source files written in the acausal programming language, to other user-authored artifacts, and/or to blocks of the acausal model may also be presented in a causal simulation model by the simulation model generator.

As described, the partitioning engine 108 may produce a submatrix of a Jacobian matrix by removing the rows associated with differential equations and may apply or perform one or more decomposition operations or processes on that submatrix.

Suppose the equation generator 106 generates the following set of equations for an acausal model:

$$\dot{x}_1 = f_1(x_1, x_2, x_3, x_4, x_5)$$

$$\dot{x}_2 = f_2(x_1, x_2, x_3, x_4, x_5)$$

$$0 = g_3(x_1, x_2, x_5)$$

$$0 = g_4(x_1, x_2, x_3, x_4)$$

$$0 = g_5(x_1, x_2, x_3, x_4, x_5)$$

These five equations may be semi-explicit index-1 DAEs. For example, the first two equations are differential equations and the last three equations are algebraic equations. Suppose further that variables $x_1$ and $x_2$ are differential variables and that variables $x_3$, $x_4$, and $x_5$ are algebraic variables. The partitioning engine 108 may compute the Jacobian matrix for all or at least some of the above set of equations.

FIG. 7 is a schematic illustration of an example Jacobian matrix 700 in accordance with one or more embodiments. The Jacobian matrix 700 may include five columns 702-706 for the five algebraic variables that appear in the above equations. The matrix 700 may also include five rows 708-712 for the five equations. An element of the matrix 700 that is marked with a specific designation, such as the solid circles, indicates that the given algebraic variable for that column appears in the Jacobian computed for the equation for that row. An empty cell or record of the matrix 700 indicates that the given algebraic variable for that column does not appear in the Jacobian computed for the equation for that row.

The partitioning engine 108 may generate a submatrix from the matrix 700 that includes only the algebraic equations and the algebraic variables. For example, the partitioning engine 108 may generate the submatrix by removing rows 708 and 709 that correspond to the differential equations $f_1$ and $f_2$ and columns 702 and 703 that correspond to the differential variables $x_1$ and $x_2$.

FIG. 8 is a schematic illustration of a submatrix 800 generated from the matrix 700 in accordance with one or more embodiments. The submatrix 800 includes three columns 802-804 for the three algebraic variables and three rows 806-808 for the three algebraic equations. The submatrix 800 may be a square matrix and may be nonsingular.

The partitioning engine 108 may apply or perform one or more decomposition operations or processes on the submatrix 800, such as the Dulmage-Mendelsohn decomposition FIG. 9 is a schematic illustration of an example permuted Jacobian matrix 900 from the submatrix 800 in accordance with one or more embodiments. Like the submatrix 800, the permuted Jacobian matrix 900 includes three columns 902-904 for the three algebraic variables and three rows 906-908 for the three equations. However, the order of the algebraic equations of the permuted matrix 900 are different. As a result of applying the Dulmage-Mendelsohn decomposition, the permuted matrix 900 is upper block-triangular.

As a result of the permutation, the algebraic equations generated for the acausal model are now represented by systems or groups of equations whose inputs/outputs are connected directly. The partitioning engine 108 may analyze the upper block-triangular matrix 900 and group the equations into sets, e.g., partitions. The partitioning engine 108 may identify two partitions. One partition may include the equation of row 908 as indicated by rectangular border 910. Another partition may include the equations of rows 906 and 907 as indicated by the rectangular border 912.

The simulation model generator 122 may generate a causal model based on the partitioning of the set of equations into groups of equations whose inputs/outputs are connected directly. As many of the variables appear in many of the equations, the causal model will likely include algebraic loops. Because of the presence of algebraic loops, the discretizer 110 may use an explicit numeric approximation technique, such as Forward Euler. Based upon the discretization of the causal model, the solution may be as follows:

1. Solve for $x_1$ using:

$$x_1 = x_1\sim + h * f_1(x_1\sim, x_2\sim, x_3\sim, x_4\sim, x_5\sim)$$

where h is step size, and (variable)~ denotes the variable from the previous time step.

2. Solve for $x_2$ using:

$$x_2 = x_2\sim + h * f_2(x_1\sim, x_2\sim, x_3\sim, x_4\sim, x_5\sim)$$

3. Solve for $x_5$ using:

$$0 = g_3(x_1, x_2, x_5)$$

using the values for $x_1$ and $x_2$ computed at steps 1 and 2 above.

4. Solve for $x_3$ and $x_4$ using:

$$0 = g_4(x_1, x_2, x_3, x_4)$$

$$0 = g_5(x_1, x_2, x_3, x_4, x_5)$$

using the values for $x_1$ and $x_2$ computed at steps 1 and 2 and the value for $x_5$ computed at step 3 above.

If the system of equations for an acausal model are index-2, the one or more of the partitions as generated during the permutation may be singular or unsolvable. In some embodiments, merging the singularities and making larger partitions may result in solvable/nonsingular partitions.

In some embodiments, the system of equations for an acausal model may be of the form:

$$M\dot{x} = f(x, z, t)$$

$$g(x, z, t) = 0$$

where M can be referred to as a mass matrix.

In some embodiments, a permutation, for example based on a connected component analysis of the bipartite graph corresponding to the mass matrix M, may be applied to the mass matrix M to produce block diagonal matrix. In this case, every differential equation as delimited by a diagonal block may generate three blocks instead of two, e.g., a block that implements the right hand side of the differential equation, a block that implements the diagonal block's inverse, and an Integrator block.

Figure 19A:
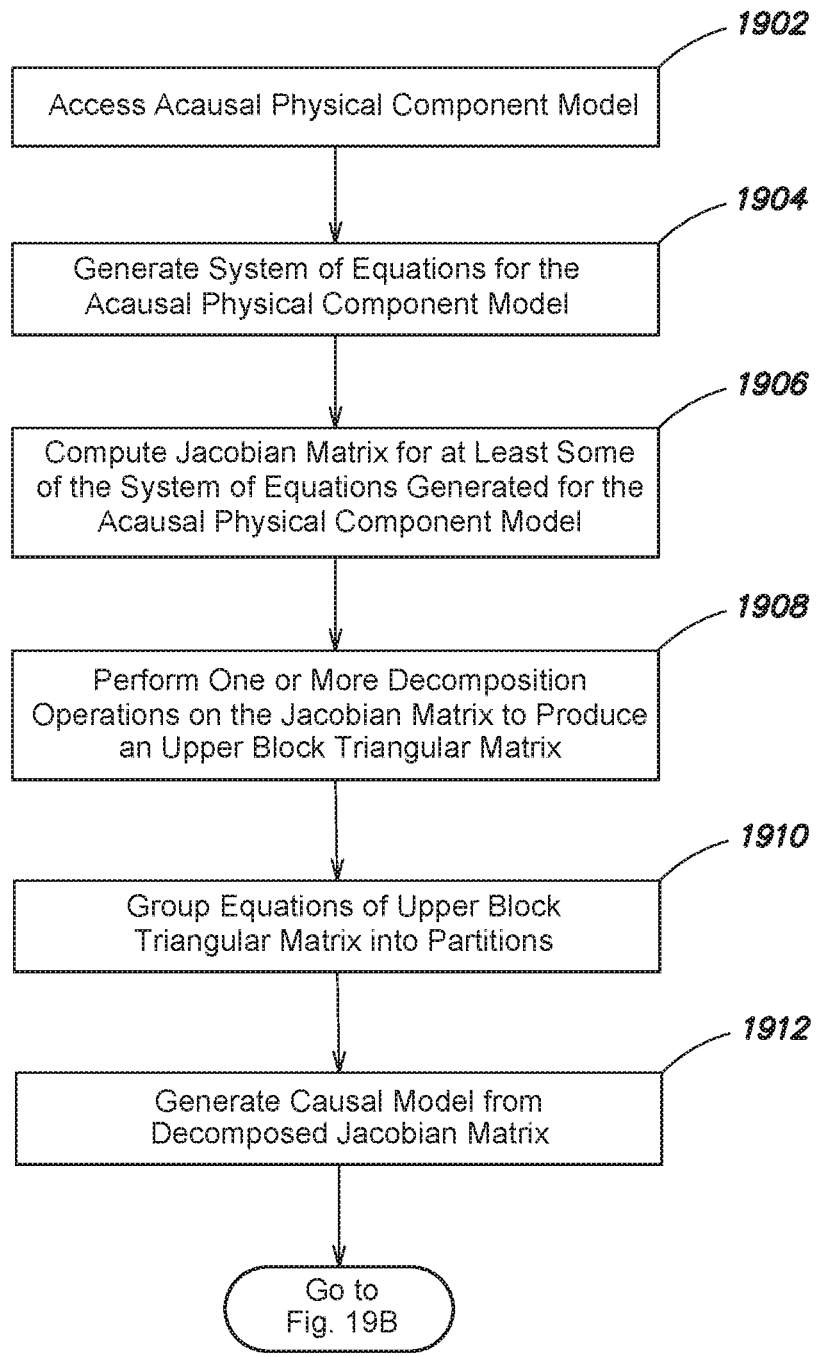
FIGS. 19A and 19B are partial views of a flow diagram of an example method in accordance with one or more embodiments.
Figure 19B:
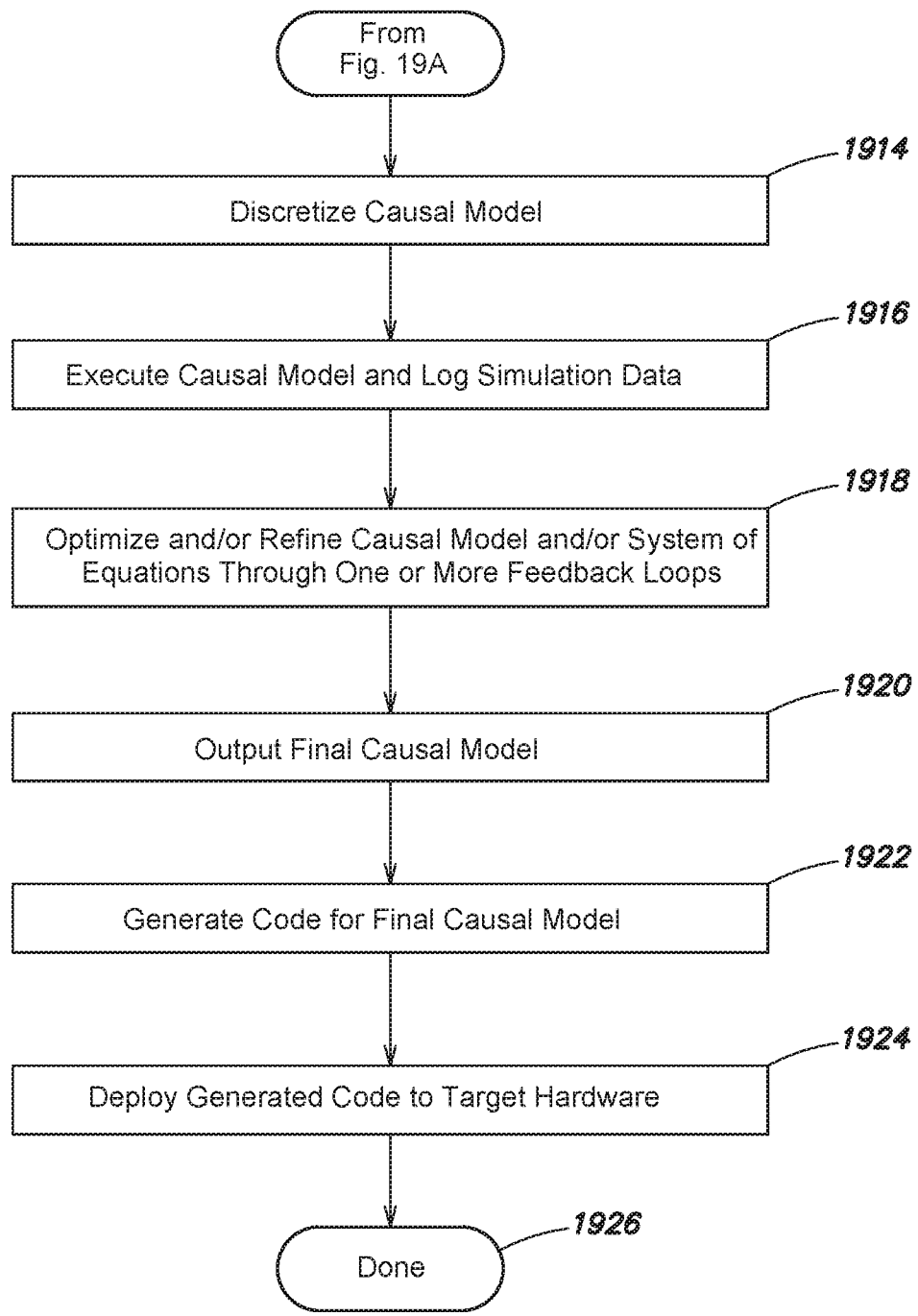

FIGS. 19A-B are partial views of a flow diagram of an example method in accordance with one or more embodiments. It should be understood that the flow diagrams described herein are representative only. In some embodiments, one or more steps may be omitted, one or more steps may be optionally performed, multiple steps may be combined or consolidated, additional steps may be added, the order of steps may be changed, and/or one or more sequences as indicated by the arrows of the flow diagram may be omitted.

The simulation model compiler may access an acausal physical component model or portion thereof, as indicated at block 1902. The equation generator 106 may generate a system of equations for the acausal model, as indicated at block 1904. The partitioning engine 108 may compute a Jacobian matrix for at least some of the system of equations, as indicated at block 1906. The partitioning engine 108 may perform one or more decomposition operations on the Jacobian matrix to produce an upper block triangular matrix, as indicated at block 1908. The partitioning engine 108 may group the equations of the upper block triangular matrix into partitions, as indicated at block 1910. For example, the partitioning engine 108 may analyze all of the dependencies between the equations and the variables and may group subsets of the equations that it determines must be solved together, along with the variables that those subsets of equations determine, into groups. The simulation model generator 122 may generate a causal model based on the decomposed Jacobian matrix, as indicated at step 1912. The discretizer 110 may discretize the causal model, as indicated at step 1914 (FIG. 19B). In some embodiments, the simulation model compiler 102 may execute, e.g., simulate, the discretized causal model and may log information from the simulation, as indicated at block 1916. Exemplary information that may be logged includes variable values over time, output values over time, etc. The optimizer 112 may optimize the causal model and/or the system of equations, for example as a part of a feedback loop, as indicated at block 1918. In some embodiments, the feedback loop may include user input. The simulation environment 100 may output the causal model, e.g., following the optimization process, as indicated at block 1920. For example, the simulation environment 100 may generate a visual presentation of the causal model for display on a display device, as indicated at block 1920. The code generator 130 may generate code for the causal model, as indicated at block 1922. The generated code may be deployed at target hardware, as indicated at block 1924. Processing may then be complete as indicated by Done block 1926.

Figure 20:
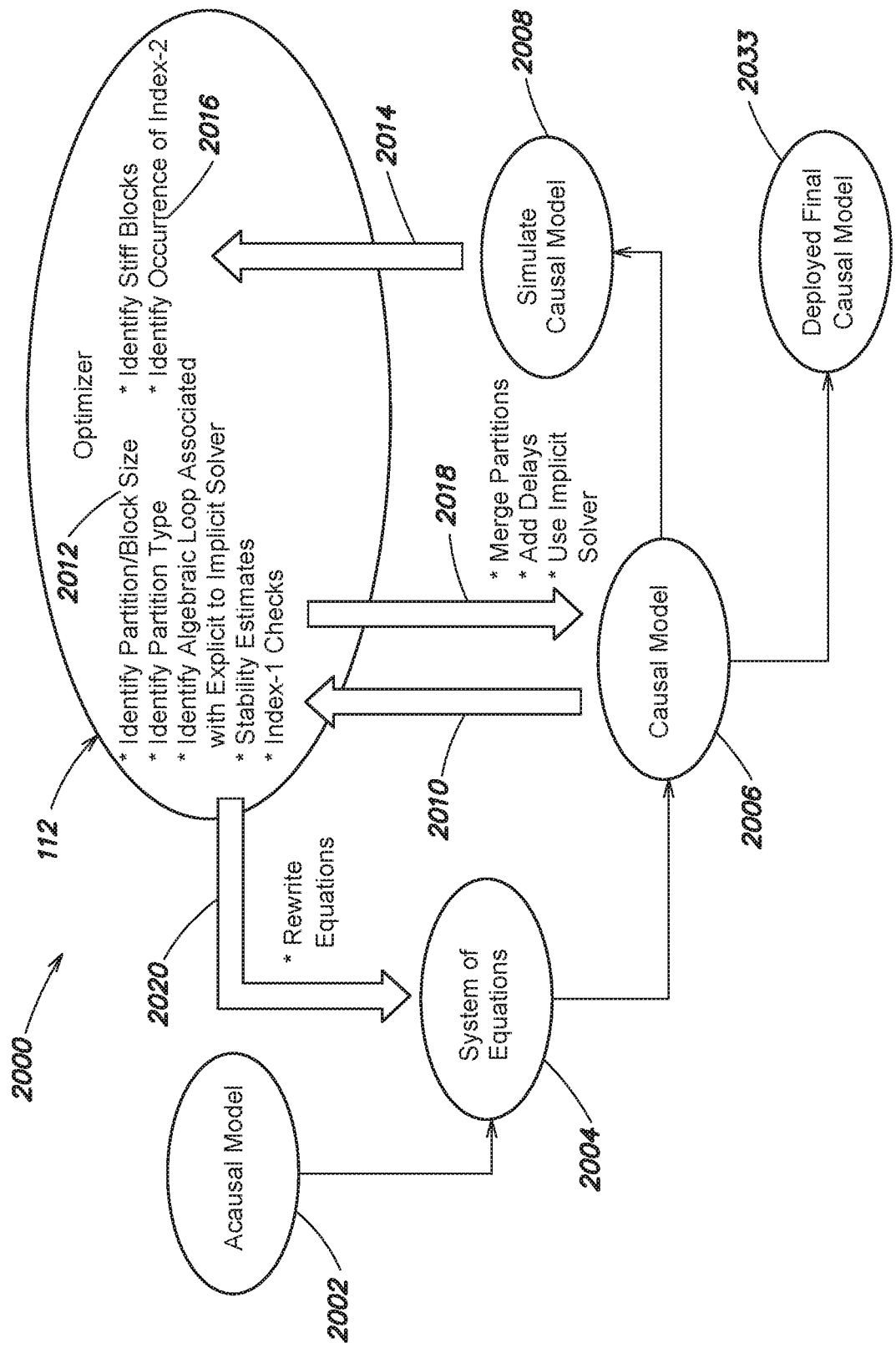
FIG. 20 is a schematic illustration of an example feedback loop in accordance with one or more embodiments.

FIG. 20 is a schematic illustration of an example feedback loop 2000 in accordance with one or more embodiments. As described, the process flow of the present disclosure may start with an acausal model, as indicated at 2002. The equation generator 106 may generate a system of equations, as indicated at 2004, for the acausal model 2002. The simulation model generator 122 may generate a causal model, as indicated at 2006, based on the system of equations 2004. The simulation model compiler 102 may execute, e.g., simulate, the causal model 2006, as indicated at 2008.

The optimizer 112 may obtain information regarding the causal model 2006 as indicated by arrow 2010. For example, as indicated at 2012, the model analyzer 103 may analyze the causal model 2006 and provide the following information to the optimizer 112: the size of the partitions/blocks, the types of partitions, such as linear, switched linear, and/or nonlinear, the existence of algebraic loops, e.g., resulting from switching from an explicit solver to an implicit solver during discretization, stability estimates for the causal model 2006, and index-1 checks. The size of a given partition may be associated with the number of equations included in the given partition and the variables included in those equations. An example of a stability estimate may include an estimate of the maximum discrete step size that results in a stable simulation, e.g., one that generates trajectories that do not diverge to infinity. Index-1 checks may be performed through static analysis of the causal model, e.g., by the model analyzer 103, to determine whether the current configuration of the causal model 2006 may run into a singularity due to a change in index. If the index is determined to be two, then one algebraic partition may fail to simulate because of a singular Jacobian.

The optimizer 112 also may obtain information during simulation of the causal model 2006 as indicated by arrow 2014. For example, as indicated at 2016, the optimizer 112 may access data logged during simulation 2008 of the causal model 2006 and, based on the logged data, may identify stiff blocks of the causal model 2006 and may identify occurrence of index-2 or higher DAEs.

Based on the information obtained on the causal model 2006 and from the simulation 2008 of the causal model 2006, the optimizer 112 may derive one or more modifications to the causal model 2006 and/or to the system of equations 2004, as indicated by arrows 2018 and 2020, respectively. For example, the optimizer 112 may determine that two or more partitions should be merged, e.g., to prevent index-2 singularities, thereby improving robustness. The optimizer 112 may also determine to include one or more delays and/or filters to the causal model 2006 and/or use an implicit solver, for example to resolve (e.g., break) one or more algebraic loops detected in the causal model 2006. The optimizer 112 may determine that the system of equations 2004 should be rewritten to prevent nonlinearities from affecting variables being solved. As an example, if an equation is log(x)=y, and the variable being solved for is x, the optimizer 112 may rewrite this equation as x=exp(y), thus converting an equation that is nonlinear in the variables being solved for into an equation that is linear in those variables.

In some embodiments, the optimizer 112 may apply one or more rules to determine the optimizations to be applied to the causal model 2006 and/or to the system of equations 2004. For example, in response to determining an index-2 condition, the optimizer 112 may merge all of the blocks of an algebraic loop with particular classes of equations, assuming implicit solvers are used everywhere in the causal model 2006. The classes may, for example, be defined by whether equations satisfy a particular property, such as whether the classes contain a particular language construct (e.g., a "delay" operator), or, e.g., whether they reference event variables. In other embodiments, the optimization process may include user involvement.

If the optimizer changes the system of equations 2004, then a new causal model may be generated. Additionally, the new causal model may be analyzed and may be simulated and the optimization process repeated. Similarly, if the causal model is modified, the modified causal model may be analyzed and may be simulated. That is, the optimization process as illustrated at FIG. 20 may be performed iteratively. A final version of the causal model may be deployed as indicated at 2022. For example, code may be generated for the final version of the causal model and the generated code deployed to target hardware, such as an embedded processor or other device operating in real-time.

In some embodiments, other arrangements besides a Jacobian matrix may be constructed that include the algebraic equations and the algebraic variables from the set of equations generated for the acausal model. Exemplary arrangements include the Jacobian's sparsity pattern, a bipartite graph, and a logical matrix, among others.

Additional Embodiments

It should be understood that one or more features of the present disclosure may be implemented in other ways.

Figure 10:
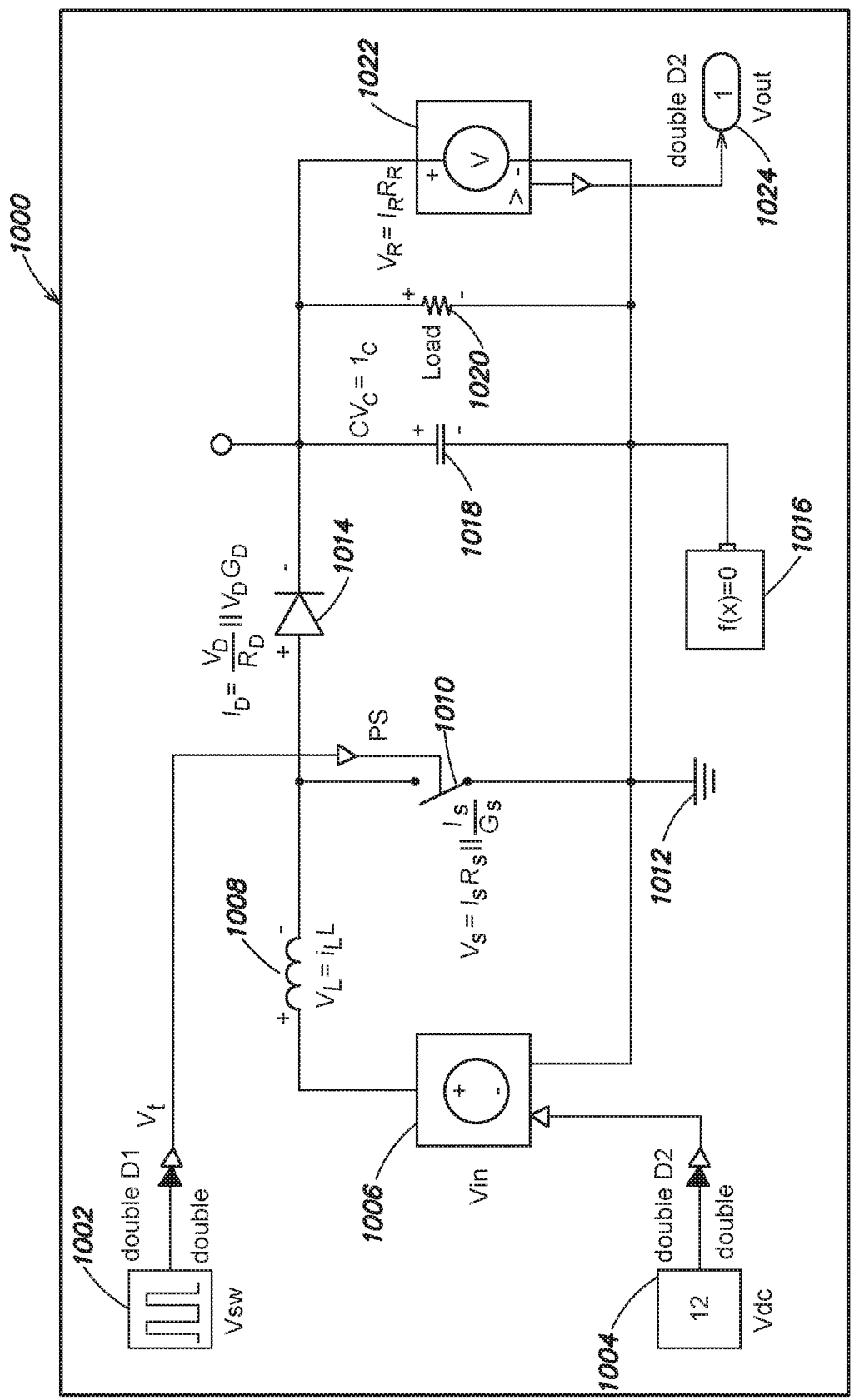
FIG. 10 is an illustration of an example acausal simulation model in accordance with one or more embodiments.

FIG. 10 is an illustration of an example acausal model 1000 in accordance with one or more embodiments. The acausal model 1000 may include a plurality of elements arranged to model a boost converter circuit. For example, the acausal model 1000 may include a Pulse Generator block 1002, a Constant block 1004, a Controlled Voltage Source element 1006, an Inductor element 1008, a Switch element 1010, an Electrical Ground element 1012, a Diode element 1014, a Solver Configuration block 1016, a Capacitor element 1018, a Resistor element 1020, a Voltage Sensor element 1022, and an Outport block 1024. The Controlled Voltage Source element 1006, Inductor element 1008, Switch element 1010, Electrical Ground element 1012, Diode element 1014, Capacitor element 1018, Resistor element 1020, and Voltage Sensor element 1022 may model physical component elements and have non-directional ports. The Pulse Generator block 1002, the Constant block 1004, the Solver Configuration block 1016, and the Outport block 1024 may model dynamic systems and have directed ports.

The Solver Configuration block 1016 may specify the solver parameters for the model 1000.

The Diode element 1014 may implement the following functionality:

if $V_D > V_{threshold}$ $I_D = V_D/RD$ (Low Resistance Mode)

else $I_D = V_D * G_D$ (Low Conductance Mode)

The Switch element 1010 may implement the following functionality:

if $V_r > 0.0$ $V_S = I_S * R_S$ (Low Resistance Mode)

else $V_S = I_S/G_S$ (Low Conductance Mode)

The model analyzer 103 may analyze an acausal model to determine whether it is a purely linear model, a switched linear model, or a nonlinear model. For example, the model analyzer 103 may statically analyze the acausal model and search for the presence of one or more types of model elements, such as switch type elements (e.g., switches, diodes, and elements controllable by a gate signal) and non-linear element types. Examples of non-linear element types include AC voltage source elements, AC current source elements, piecewise linear (PWL) voltage source elements, and PWL current source elements. If the acausal model includes one or more non-linear elements, the model analyzer 103 may identify the acausal model as non-linear. If the acausal model includes no non-linear element types, but does include one or more switch or diode elements, the model analyzer 103 may identify the acausal model as switched linear. If the acausal model includes no non-linear element types and no switch or diode elements, the model analyzer 103 may identify the acausal model as linear.

If the model analyzer 103 determines that an acausal model is a switched linear model, it may also determine the number of modes of the model. Switch and diode elements may each introduce two modes to an acausal model. In some embodiments, the model analyzer 103 may determine the number of modes as $2^n$ where n is the number of switch and diode type elements. This may represent a worst-case scenario. In other embodiments, the model analyzer 103 may dynamically analyze the acausal model over a user specified simulation time or a default simulation time of the model, and determine the number of modes active during that simulation time. Dynamic analysis may result in a number of modes that is less, possibly far less, than $2^n$. As described, determining and using the number of modes that are active may reduce the hardware resources required when deploying the code 132 generated for the acausal model to the target hardware 134 as compared to using a worst-case scenario.

With reference to the acausal model 1000 of the boost converter circuit, the solver 104 may determine that the model 1000 is a switched linear model, based on the presence of the switch and diode elements 1010 and 1014. The solver 104 may also determine that the acausal model 1000 has the following four modes of operation:

mode (1)=Diode element 1014 is off and Switch element 1010 is open, mode (2)=Diode element 1014 is off and Switch element 1010 is closed, mode (3)=Diode element 1014 is on and Switch element 1010 is closed, and mode (4)=Diode element 1014 is on and Switch element 1010 is open.

The equation generator 106 may construct a system of equations for the acausal model 1000. The system of equations may be linear State Space Equations of the form:

$$M\dot{x}=A(m)x(t)+B(m)u(t)$$

$$y(t)=C(m)x(t)+D(m)u(t)$$

where
M is the mass matrix,
x is the state vector,
$\dot{x}$ is the derivative of the state vector with respect to time,
y is the output vector,
u is the input vector,
t is simulation time,
A is the state or system matrix,
B is the input matrix,
C is the output matrix, and
D is the feedthrough or feedforward matrix.

The discretizer 110 may discretize the linear State Space Equations over time, e.g., simulation time of the acausal model 1000. The discretizer 110 may use the Backward Euler numerical approach to discretize the linear State Space Equations, producing Discrete State Space Equations.

For example, the discretized algebraic state variables may be given by:

$$x_{\Delta T}{}^n == x^n$$

and the approximate derivatives for the differential state variables may be given by:

$$\dot{x}_{\Delta T}^{n+1} == \frac{x_{\Delta T}^{n+1} - x_{\Delta T}^n}{\Delta T}$$

The Discretized State Space Equations generated by the discretizer 110 may be given by the form:

$$x_{\Delta T}{}^{n+1}=\hat{A}(m)x_{\Delta T}{}^n+\hat{B}u_{\Delta T}{}^n$$

$$y_{\Delta T}{}^n=\hat{C}(m)x_{\Delta T}{}^n+\hat{D}u_{\Delta T}{}^n$$

where $$\hat{A}(m) = \left(\frac{1}{\Delta T}M - A(m)\right)^{-1}\frac{1}{\Delta T}M$$

$$\hat{B}(m) = \left(\frac{1}{\Delta T}M - A(m)\right)^{-1}B(m)$$

$\hat{C}=C$
$\hat{D}=D$
m is mode.

Discretization of the linear State Space Equation:

$$y(t)=C(t)x(t)+D(t)u(t)$$

may involve only considering the current time step.

For the different modes, the matrices $\hat{A}$, $\hat{B}$, $\hat{C}$, or $\hat{D}$ may be different, e.g., have different elements. For example, for the acausal model 1000, which has four modes of operation, there may be four versions of each matrix $\hat{A}$, $\hat{B}$, $\hat{C}$, or $\hat{D}$—one version of each matrix for each of the four modes.

As described, the model analyzer 103 may perform a dynamic analysis of the acausal model, e.g., at runtime, to determine the number of modes activated or used by the acausal model. The equation generator 106 may only create versions of the $\hat{A}$, $\hat{B}$, $\hat{C}$, or $\hat{D}$ matrices that are determined to be active, e.g., actually used.

One or more of the matrices $\hat{A}$, $\hat{B}$, $\hat{C}$, or $\hat{D}$ may be sparse. For example, some elements may have values, e.g., numeric values, while other elements are zero.

FIG. 11 is a schematic illustration of an example of the four discretized state or system matrices generated by the equation generator 106 for the four modes of the acausal model 1000 in accordance with one or more embodiments. For example, the equation generator 106 may generate four versions 1102-1105 of the state or system matrix $\hat{A}$. These four versions 1102-1105 of the state of system matrix $\hat{A}$ may be labeled $\hat{A}(1)$, $\hat{A}(2)$, $\hat{A}(3)$, $\hat{A}(4)$, respectively. As illustrated, some elements of the matrices 1102-1105 contain numeric values, while other elements are zero and/or empty. In some embodiments, the numeric values may be stored in computer memory in double precision floating-point data type or single precision floating-point data type. The four versions 1102-1105 of the state of system matrix $\hat{A}$ may be sparse, e.g., the elements of columns 3 and 4 may be zero as indicated by dashed boundary 1106.

The matrices 1102-1105 are for illustrative purposes only. Submatrices for a state or system matrix may have many non-zero elements, such as hundreds or possibly thousands of non-zero elements.

The equation generator 106 may generate submatrices for at least one or more and preferably for all of the versions of the sparse matrices $\hat{A}$, $\hat{B}$, $\hat{C}$, or $\hat{D}$. Specifically, the equation generator 106 may generate submatrices from the versions of the matrices associated with each of the modes. The equation generator 106 may generate the submatrices by removing columns whose elements are zero from the sparse matrices $\hat{A}$, $\hat{B}$, $\hat{C}$, or $\hat{D}$. Referring to FIG. 11, the equation generator 106 may remove columns 3 and 4 indicated by dashed boundary 1106 from the four versions 1102-1105 of the state or system matrix $\hat{A}$. The equation generator 106 may similarly generate submatrices for the different versions of the input matrix $\hat{B}$, the output matrix $\hat{C}$, and the feedthrough or feedforward matrix $\hat{D}$.

The simulation model generator 122 may construct a causal simulation model based upon the Discrete State Space Equations:

$$x_{\Delta T}{}^{n+1}=\hat{A}(m)x_{\Delta T}{}^n+\hat{B}u_{\Delta T}{}^n$$

$$y_{\Delta T}{}^n=\hat{C}(m)x_{\Delta T}{}^n+\hat{D}u_{\Delta T}{}^n$$

The model generator 122 may include one or more Inport blocks for the input vector u and one or more Outport blocks for the output vector y in the causal simulation model. The model generator 122 may include one Constant block for each version of the $\hat{A}$, $\hat{B}$, $\hat{C}$, $\hat{D}$ submatrices in the causal simulation model. The model generator 122 may include four Switch blocks in the causal simulation model: one to select among the versions of the state or system submatrices $\hat{A}$; one to select among the versions of the input submatrices $\hat{B}$; one for the versions of the output submatrices $\hat{C}$; and one to select among the versions of the feedthrough or feedforward submatrices $\hat{D}$. The model generator 122 may connect the outputs of the Constant blocks and the outputs of the Inport blocks for the input vector u to the Switch blocks. The model generator 122 may configure the Switch blocks to select the version of the submatrices associated with the mode for the current simulation time step. In each timestep, mode iteration may be performed to resolve the mode for the next timestep. A mode computation function may compute a mode index value using previous states and inputs. For example:

$$\text{mode\_index}=fcn(x,u)$$

As an example, suppose a switch input of an acausal model turns from 'off' to 'on' in a next timestep. The mode computation function will return the correct mode_index value, i.e., 'on', for the next timestep. As described, switch elements of the causal model generated for the acausal model may take this mode_index value as a control value for selecting the appropriate topology of the causal model, e.g., the appropriate submatrices.

Figure 12:
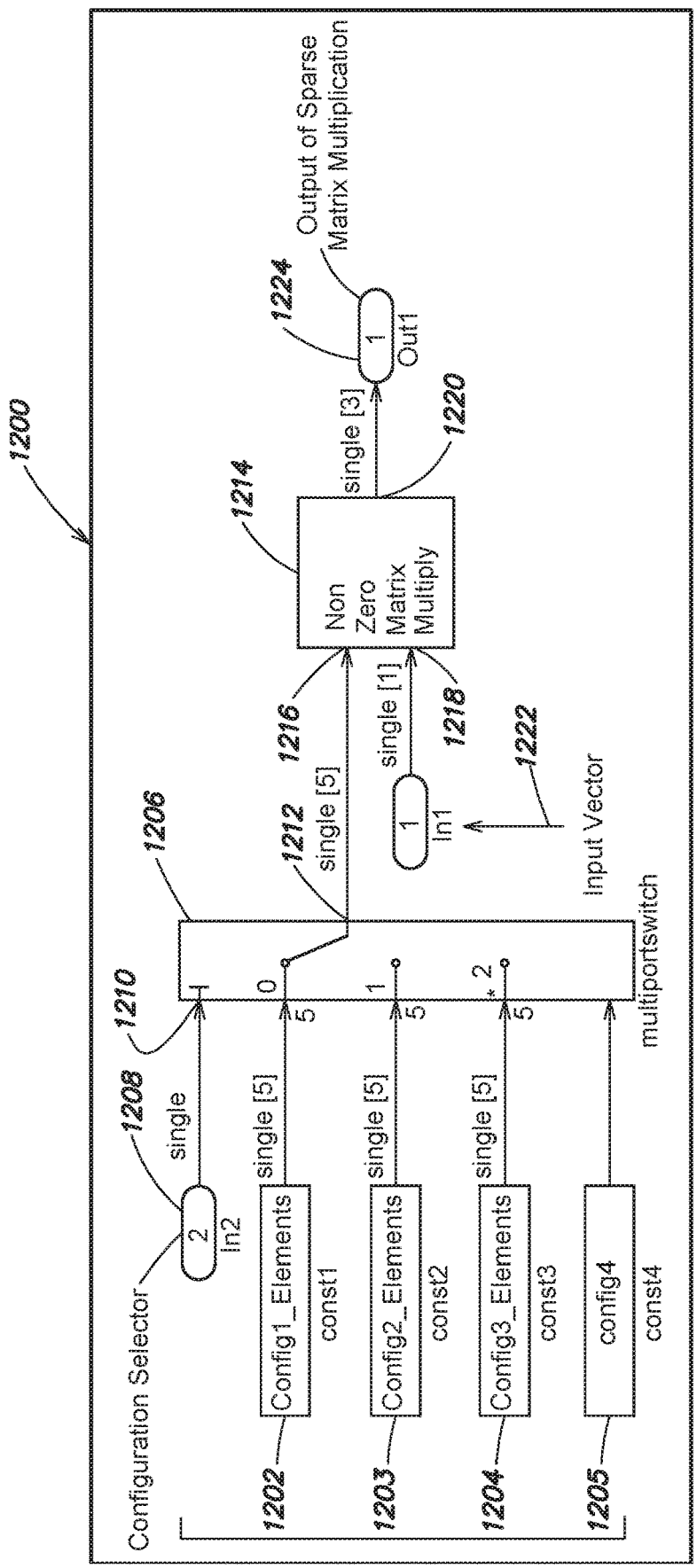
FIG. 12 is an illustration of a portion of an example causal simulation model in accordance with one or more embodiments.

FIG. 12 is an illustration of a portion 1200 of an example causal simulation model generated for the acausal model 1000 in accordance with one or more embodiments. The simulation model generator 122 may construct the portion 1200 to implement $$\hat{A}(m)x_{\Delta T}^n$$

from the Discrete State Space Equations.

The model generator 122 may include four Constant blocks 1202-1205 in the model portion 1200 for the four submatrices for the four versions of the state of system matrix $\hat{A}$. Each of the Constant blocks 1202-1205 may store one of the versions of the state of system matrix $\hat{A}$. In some embodiments, the Constant blocks 1202-1205 store only the non-zero values of the respective sparse matrices. The model generator 122 may connect outputs of the four Constant blocks 1202-1205 to a Switch block 1206. The model generator 122 may connect a configuration selector signal indicated at 1208 to a control input port 1210 of the Switch block 1206. The Switch block 1206 may have an output 1212 and, depending on the value of the configuration selector signal 1208, the Switch block may output the values from one of the versions of the state of system matrix A as stored at a respective one of the Constant blocks 1202-1205. The model generator 122 may include a matrix multiply block 1214 having two inputs 1216 and 1218 and one output 1220 in the portion 1200. The model generator 122 may connect the output 1212 of the Switch block 1206 to the input 1216 of the matrix multiply 1214 and the input vector u to the input 1218 of the matrix multiply 1214 as indicated at 1222. The output 1220 of the matrix multiply block 1214 may be connected to an Outport block 1224.

The simulation model generator 122 may construct similar model portions for the four versions of the input matrix $\hat{B}$, the four versions of the output matrix $\hat{C}$, and the four versions of the feedthrough or feedforward matrix $\hat{D}$.

Figure 13:
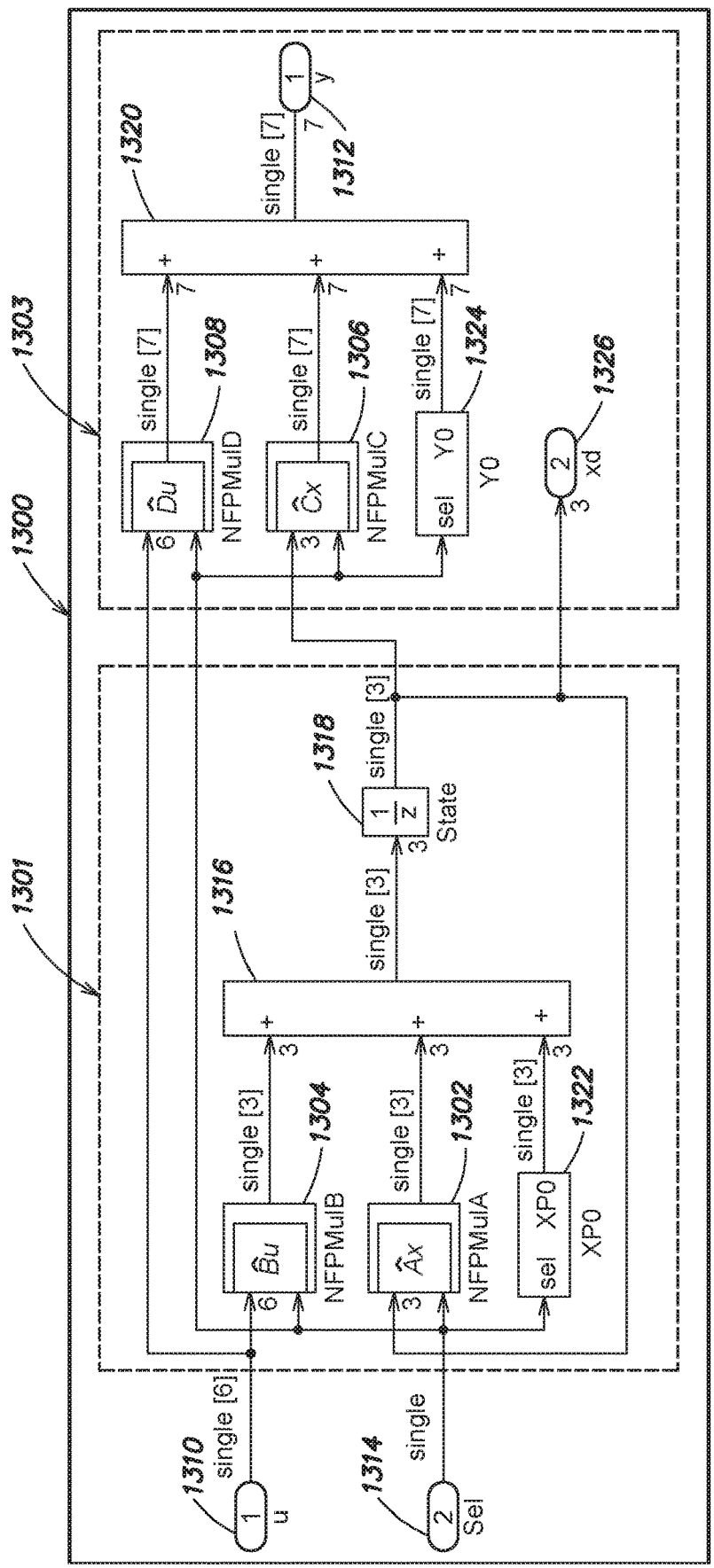
FIG. 13 is an illustration of an example causal simulation model in accordance with one or more embodiments.

FIG. 13 is an illustration of another portion 1300 of an example causal simulation model generated for the acausal model in accordance with one or more embodiments. The simulation model generator 122 may construct the portion 1300 to implement the Discrete State Space Equations:

$$x_{\Delta T}^{n+1} = \hat{A}(m)x_{\Delta T}^n + \hat{B}u_{\Delta T}^n$$

$$y_{\Delta T}^n = \hat{C}(m)x_{\Delta T}^n + \hat{D}u_{\Delta T}^n$$

The model portion 1300 may include two model parts 1301 and 1303 for the above equations. The simulation model generator 122 may include a subsystem 1302 that represents the model portion 1200 and that implements $$\hat{A}(m)x_{\Delta T}^n$$

from the Discrete State Space Equations.
The model generator 122 may construct a subsystem 1304 that implements $$\hat{B}u_{\Delta T}^n$$

from the Discrete State Space Equations. Subsystems 1302 and 1304 may be included in the model part 1301.

The model generator 122 may construct a subsystem 1306 that implements $$\hat{C}(m)x_{\Delta T}^n$$

from the Discrete State Space Equations.
The model generator 122 may construct a subsystem 1308 that implements $$\hat{D}u_{\Delta T}^n$$

from the Discrete State Space Equations. Subsystems 1306 and 1308 may be included in the model part 1303.

The model generator 122 may include an Inport block 1310 for the input vector u and an Outport block 1312 for the output vector y. The model generator 122 may include an Inport block 1314 for the switch signal that controls the Switch blocks included in the subsystems 1302-1308. The model generator 122 may connect outputs of the subsystems 1302 and 1304 to an Add block 1316 and a Unit Delay block 1318 that updates the current state value with the next state value to proceed with the next iteration of the time step. The Add block 1316 performs the addition operation for the equation:

$$x_{\Delta T}^{n+1} = \hat{A}(m)x_{\Delta T}^n + \hat{B}u_{\Delta T}^n$$

The Integrator block 1318 may update the next state of x, i.e., it may calculate) $x^{n+1}$. The output of the Integrator block 1318 may be provided to the subsystem 1306 and also may be fed back to the subsystem 1302.

The model generator 122 may connect outputs of the subsystems 1306 and 1308 to an Add block 1320.

The model generator 122 may include Constant blocks 1322 and 1324 named 'XP0' and 'Y0' that may represent biases of the Discrete State Space equations. For example, when some portion of u(t) is constant, the equation generator 106 may generate equations:

$$M\dot{x} = A(m)x(t) + B'(m)u(t) + XP(m)$$

$$y(t) = C(t)x(t) + D'(t)u(t) + YP(m)$$

where the B' and D' matrices contain only values relevant to input sources that are non-constant. The values of the Constant blocks 1322 and 1324 may be the constant values is for a particular mode.

The model generator 122 may include an optional Outport block 1326 named 'xd' that is the output of the Integrator block 1318, i.e., x(n+1). This may be used for data display, debugging, or other purposes.

As part of the solution 116 generated for the acausal model 1000, the equation generator 106 may utilize an iterative approach to determine the mode for the next simulation time step. For example, as described, the State Space Equations include:

$$M\dot{x} = A(m)x(t) + B(m)u(t)$$

When discretized using a Backward Euler discretization method, this becomes:

$$x^{n+1} = \hat{A}(m^{n+1})x^n + \hat{B}(m^{n+1})u^{n+1}$$

For the solution 116, the equation generator 106 may first compute $m^{n+1}$ to obtain the correct $x^{n+1}$.

However, $m^{n+1}$ is a function of $x^{n+1}$ and $u^{n+1}$. The equation generator 116 may create a solution that solves for $m^{n+1}$ iteratively.

For example, to get: $m_0^{n+1} = f(x^{n+1}, u^{n+1})$
the equation generator 106 may create a solution that starts with a guess for $m_0^{n+1}$ that is calculated from $x^n$ as given by:

$$m_0^{n+1} = f(x^n, u^{n+1})$$

The equation generator 106 may use this to calculate a guess for $x^{n+1}$ $$x_0^{n+1} = \hat{A}(m_0^{n+1})x^n + \hat{B}(m_0^{n+1})u^{n+1}$$

The equation generator 106 may then use this estimation of $x^{n+1}$ to calculate a better guess for $m^{n+1}$.

FIG. 14 is a schematic illustration of an example iterative process 1400 in accordance with one or more embodiments. The changes in 'n' are a simulation time step of the acausal model 1000. The changes in 'i' are an iteration step all of which must be performed in a given time step to compute the mode of the next simulation time step. At each iteration, a new value is computed for the state variable 'x' for the next simulation time step. The equation generator 106, however, may not update the current state variable 'x' with the computed value for next state value until the last iteration is performed, at which the mode for the next simulation time step is also determined. In some embodiments, the number of iterations implemented by the equation generator 106 may be specified, e.g., by a user. For example, a user may enter a number of iterations at one or more User Interfaces, such as a parameters or properties page for a solver. The number of iterations may be chosen to converge on an accurate determination of the mode of the next simulation time step. In other embodiments, the equation generator 106 may implement a default number of iterations, e.g., five.

The simulation model generator 122 may implement the iterative solution determined by the equation generator 106 in the causal model for the acausal model 1000.

Figure 15:
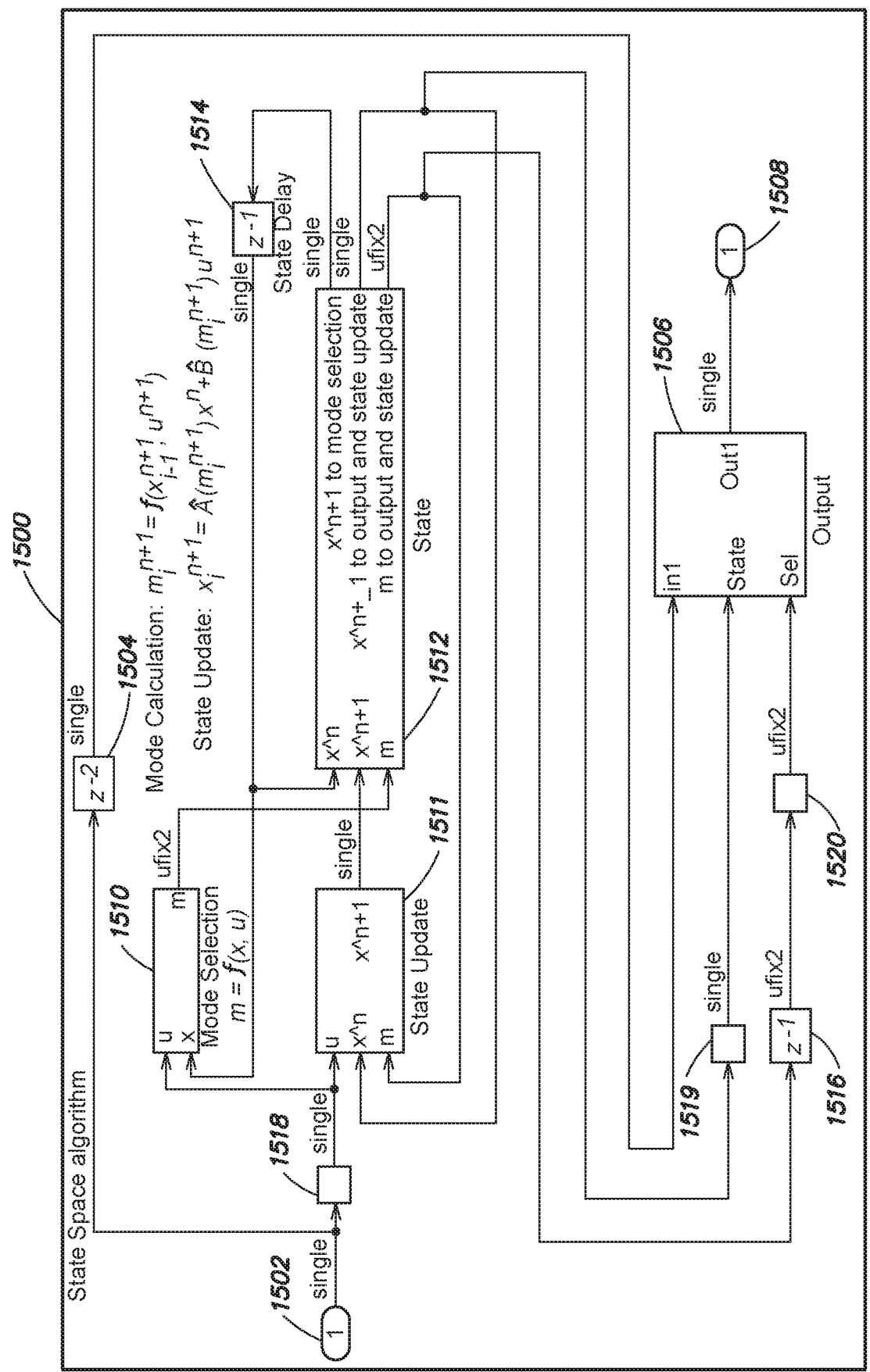
FIG. 15 is a schematic illustration of a portion of an example causal simulation model in accordance with one or more embodiments.

FIG. 15 is a schematic illustration of an example causal simulation model 1500 generated for the acausal model 1000 in accordance with one or more embodiments. The simulation model generator 122 may construct the causal model 1500. The causal model 1500 may include an Inport block 1502, a Zero Order Hold block 1504, a subsystem 1506 named 'Output', and an Outport block 1508. The causal model 1500 may also include three other subsystems 1510-1512 named 'Mode Selection', 'State Update', and 'State', two Zero Order Hold blocks 1514 and 1516, and three Rate Transition blocks 1518-1520. The causal model 1500 may be a multi-rate model running at two rates. For example, for each simulation time step, the components 1502, 1504, 1506, and 1508 run once, while the components 1510-1512, 1514, and 1516 run the number of iterations, e.g., five.

The State Update subsystem 1511 may correspond to the model part 1301 (FIG. 13) and may implement:

$$x_{\Delta T}^{n+1} = \hat{A}(m)x_{\Delta T}^n + \hat{B}u_{\Delta T}^n$$

The Output subsystem 1506 may correspond to the model part 1303 and may implement:

$$y_{\Delta T}^n = \hat{C}(m)x_{\Delta T}^n + \hat{D}u_{\Delta T}^n$$

The State subsystem 1512 may implement the iterative process 1400 (FIG. 14) to manage what values are passed to the State Update subsystem 1511 and the Mode Calculation subsystem 1510 as part of the iterative process.

The Rate Transition blocks 1518-1520 may relate to the mode selection algorithm. The rate at which upsampling or downsampling happens may be the same as the number of iterations required to select a mode in a given timestep. The Rate Transition block 1518 is the upsample block which ensures that the inner feedback loop, e.g., the State Update subsystem 1511 and the State subsystem 1512, that selects the mode runs at a selected rate faster than the rest of the model 1500 which runs at the same rate as the chosen timestep. The Rate Transition blocks 1519 and 1520 down-sample the data received from the faster zone to synchronize with the sampling rate of the timestep.

Figure 23A:
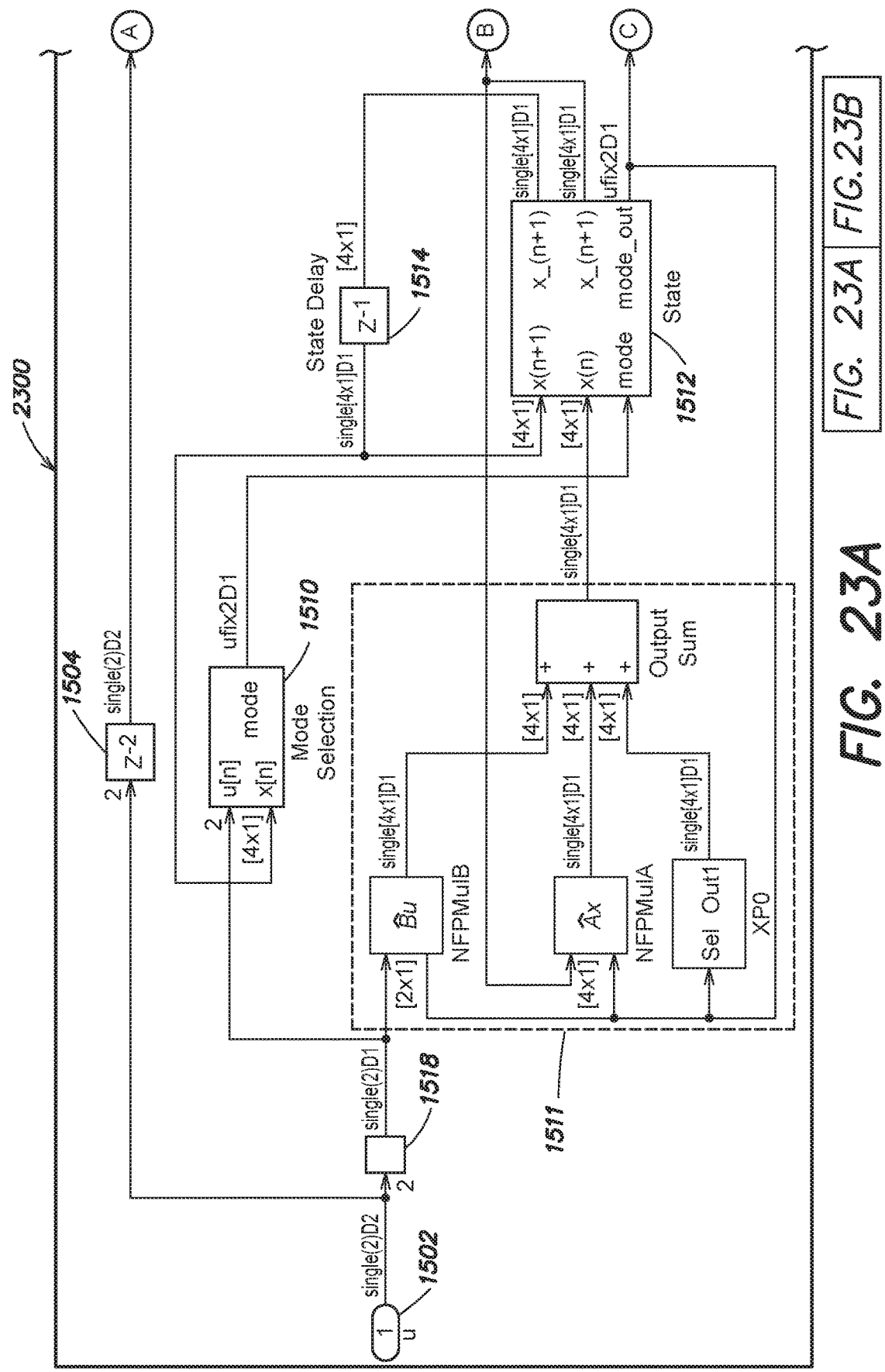
FIGS. 23A and 23B are partial views of an illustration of an example causal simulation model in accordance with one or more embodiments.
Figure 23B:
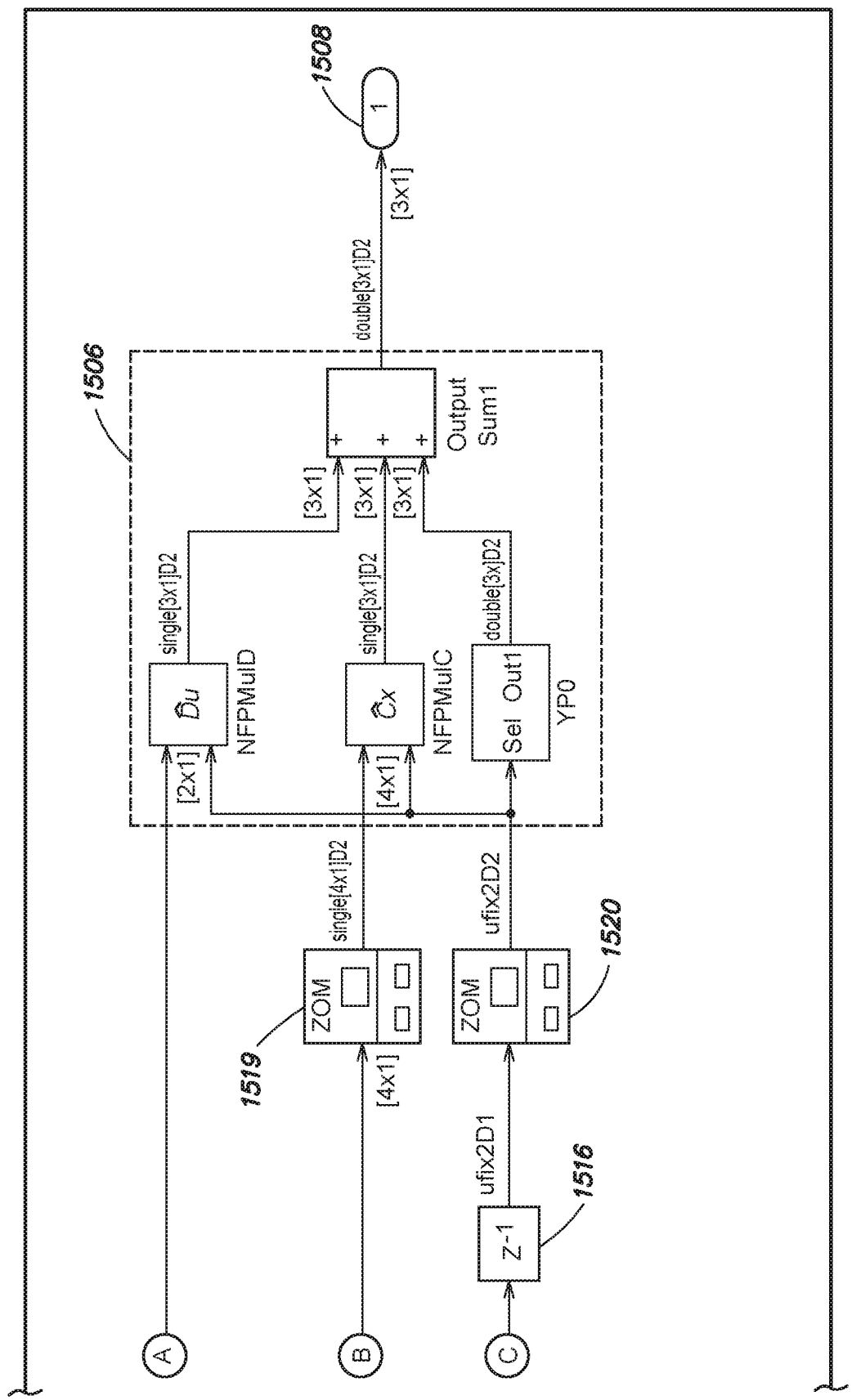

FIGS. 23A and 23B are partial views of a schematic illustration of an example causal simulation model 2300 generated for the acausal model 1000 in accordance with one or more embodiments. The causal model 2300 is similar to the causal model 1500. However, the Output subsystem 1506 and the State Update subsystem 1511 illustrated in the causal model 1500 (FIG. 15) are opened in the causal model 2300 to provide a more full view of the causal model 2300 generated for the acausal model 1000 by the model generator 122. Elements of the State Update perform Dot Product operations using the discretized, sparse matrices $\hat{A}$ and $\hat{B}$. Elements of the Output subsystem 1506 perform Dot Product operations using the discretized, sparse matrices $\hat{C}$ and $\hat{D}$.

Figure 16:
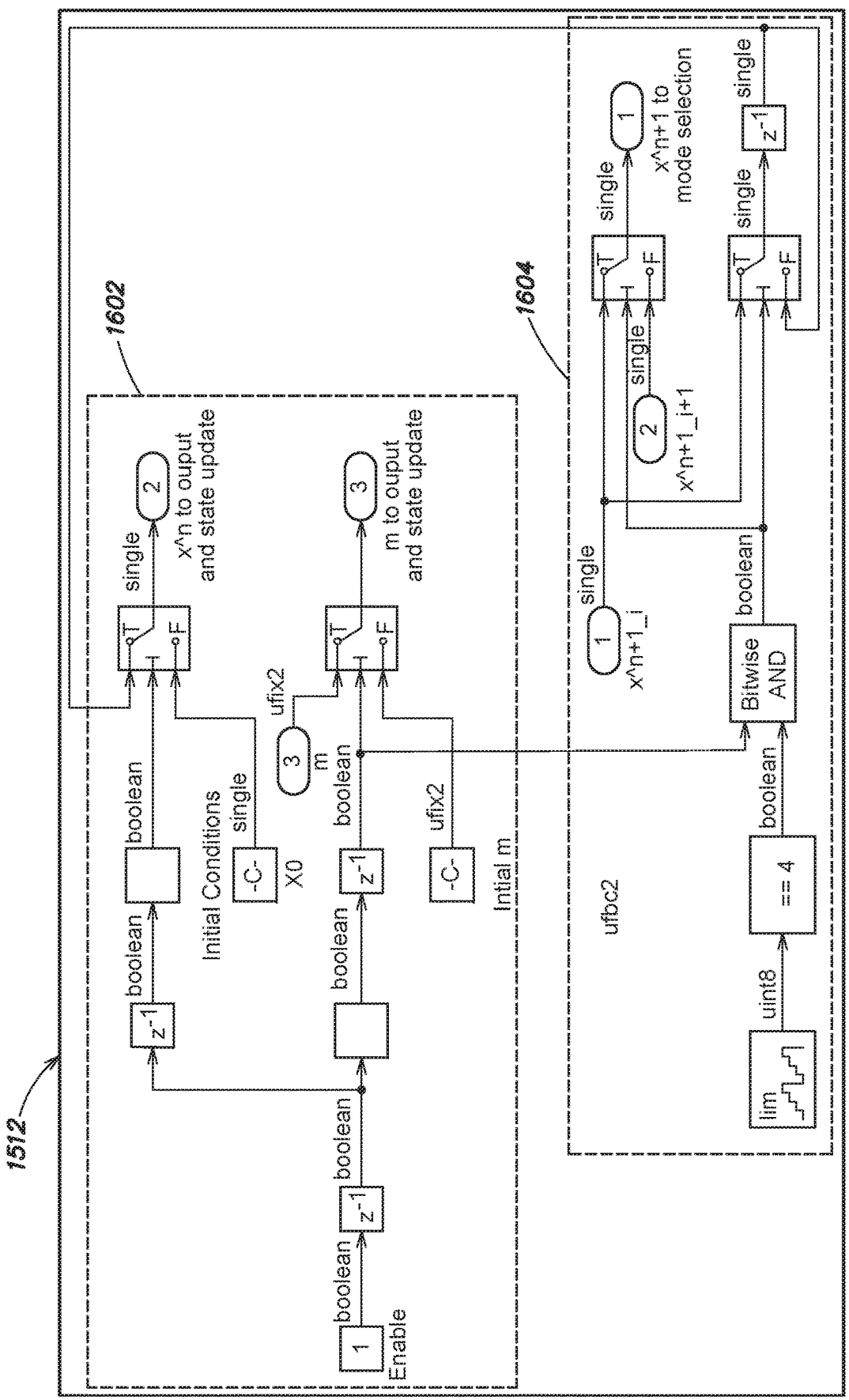
FIG. 16 is a schematic illustration of an example component from the causal simulation model of FIG. 15 in accordance with one or more embodiments.

FIG. 16 is a schematic illustration of the State subsystem 1512 in accordance with one or more embodiments. In FIG. 16, the State subsystem 1512 is opened to show its contents. The State subsystem 1512 may include two portions as indicated by dashed boundaries 1602 and 1604. The first portion 1602 may perform state and mode initialization. For the first iterative step, the first portion 1602 may use the initial mode and, for the first two iterations, it may use the initial state. Otherwise, the first portion 1602 may pass through the mode and the previous state. The second portion 1604 may hold the computed value for $x_n$ until the last iteration. At the last iteration, the second portion 1604 may pass the last determination for $x_{i=1}^{n+1}$ to the mode selection subsystem 1510 (FIG. 15) for determining $m_i^{n+1}$.

The code generator 130 may generate code, such as HDL code, for the causal model generated for the acausal model 1000. For example, the code generator 130 may generate HDL code for the causal model illustrated in FIGS. 15 and 23. In some embodiments, the optimizer 112 may cooperate with the code generator 130 to optimize the generated HDL code for execution on specific target hardware.

For example, the optimizer 112 and/or the code generator 130 may utilize Native Floating Point (NFP) implementations of at least some and preferably all of the blocks included in the causal model illustrated in FIGS. 15 and 23. For example, the optimizer 112 and/or the code generator 130 may utilize NFP implementations for the Switch blocks, Multiply blocks, Add blocks, Data Type Conversion blocks, Relational Operator blocks, and Rounding function blocks, e.g., Floor, Ceiling, etc. Suitable NFP implementations of blocks for use in implementing the causal models are described in U.S. Pat. No. 10,140,099 for Systems and Methods for Generating Code from Executable Models with Floating Point Data, which is hereby incorporated by reference in its entirety.

In addition, the optimizer 112 and/or the code generator 130 may analyze the target hardware characteristics and/or attributes 138. Based on the target hardware characteristics and/or attributes 138, the optimizer 112 may determine how to store the sparse submatrices implemented by the Constant blocks at the target hardware 134 for the versions of the state or system submatrices $\hat{A}$, the versions of the input submatrices $\hat{B}$, the versions of the output submatrices $\hat{C}$, and the versions of the feedthrough or feedforward submatrices $\hat{D}$. For example, the optimizer 112 may determine that the submatrices should be stored at registers of DSP slices and/or Read Only Memory (ROM) blocks of the target hardware 134.

As noted, the target hardware characteristics and/or attributes 138 may include the number and type of hardware elements for an FPGA, such as the number, type, and characteristics, such as size, of DSP slices including the number and size of registers at the DSP slices and the number and size of ROM blocks. The target hardware characteristics and/or attributes 138 may correspond to a particular target hardware device or in some embodiments it may correspond to a family of target hardware devices, such as the Agilex, Stratix, Arria, Cyclone, and MAX families of FPGA products from Intel Corp. of Santa Clara, Calif. and the Kintex, Artix, Virtex, Zynq, and Spartan families of FPGA products from Xilinx Inc., among others. The optimizer 112 and/or the code generator 130 may utilize at least some of the target hardware characteristics and/or attributes 138 as constraints and/or thresholds during HDL code generation so that the HDL code does not exceed the resources available at the target hardware device or the family of target hardware devices. As a result, the generated HDL code is synthesizable and may be used by a synthesis tool to successfully program any of the target hardware devices of the family.

Figure 17:
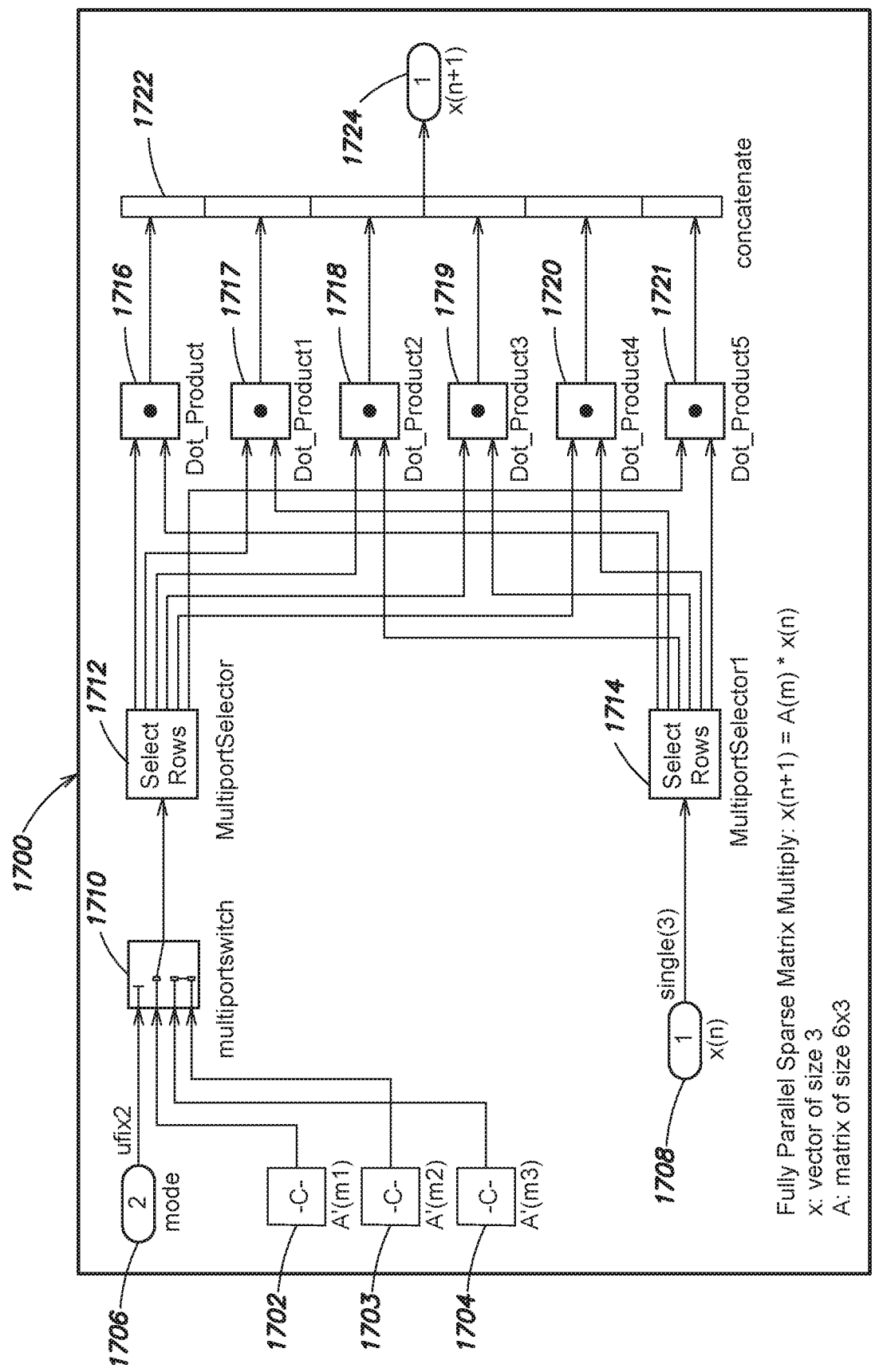
FIG. 17 is a schematic illustration of an example fully parallel space matrix multiply in accordance with one or more embodiments.
Figure 18A:
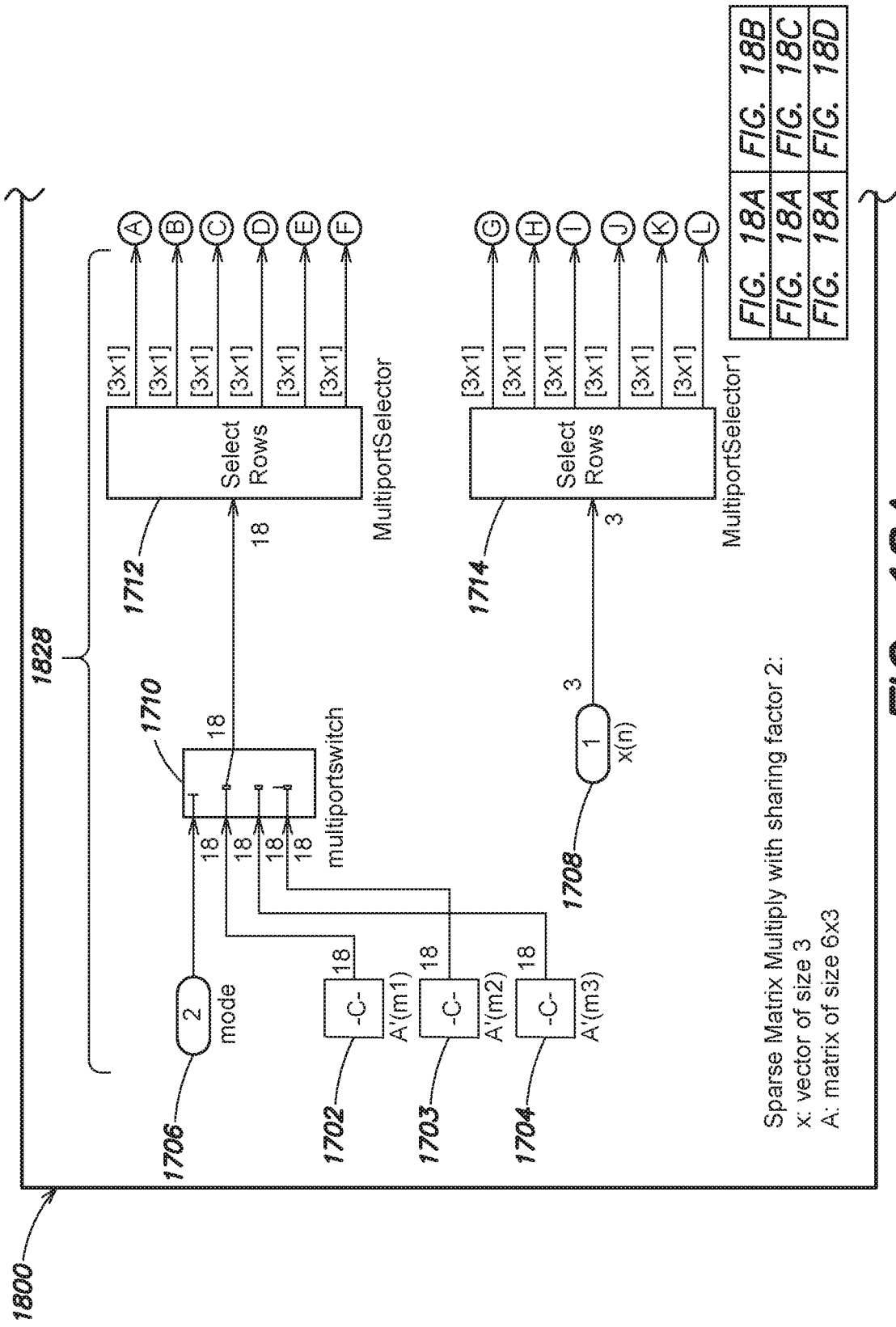
FIGS. 18A-18D are partial views of a schematic illustration of an example sparse matrix multiply in accordance with one or more embodiments.
Figure 18B:
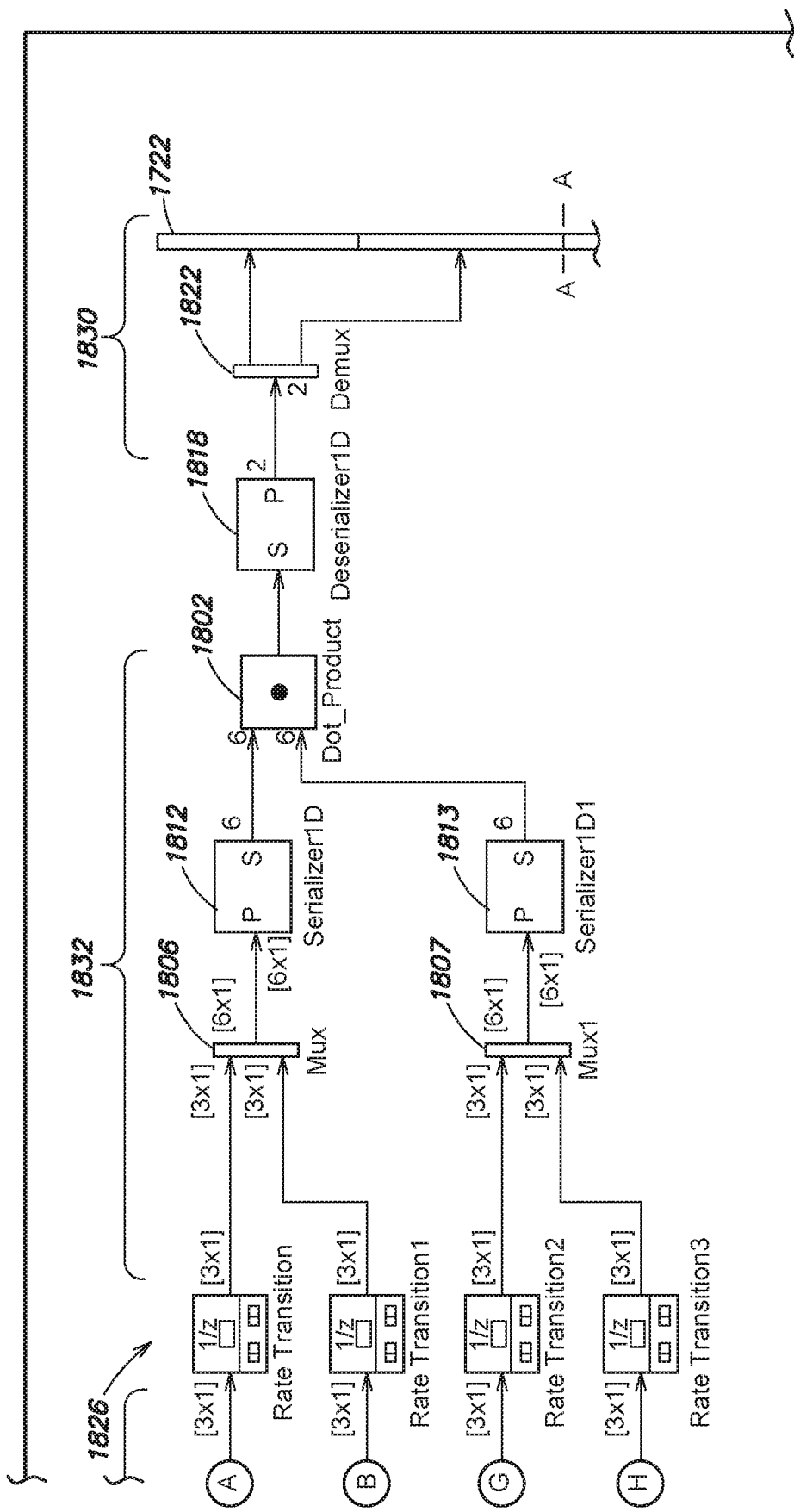
Figure 18C:
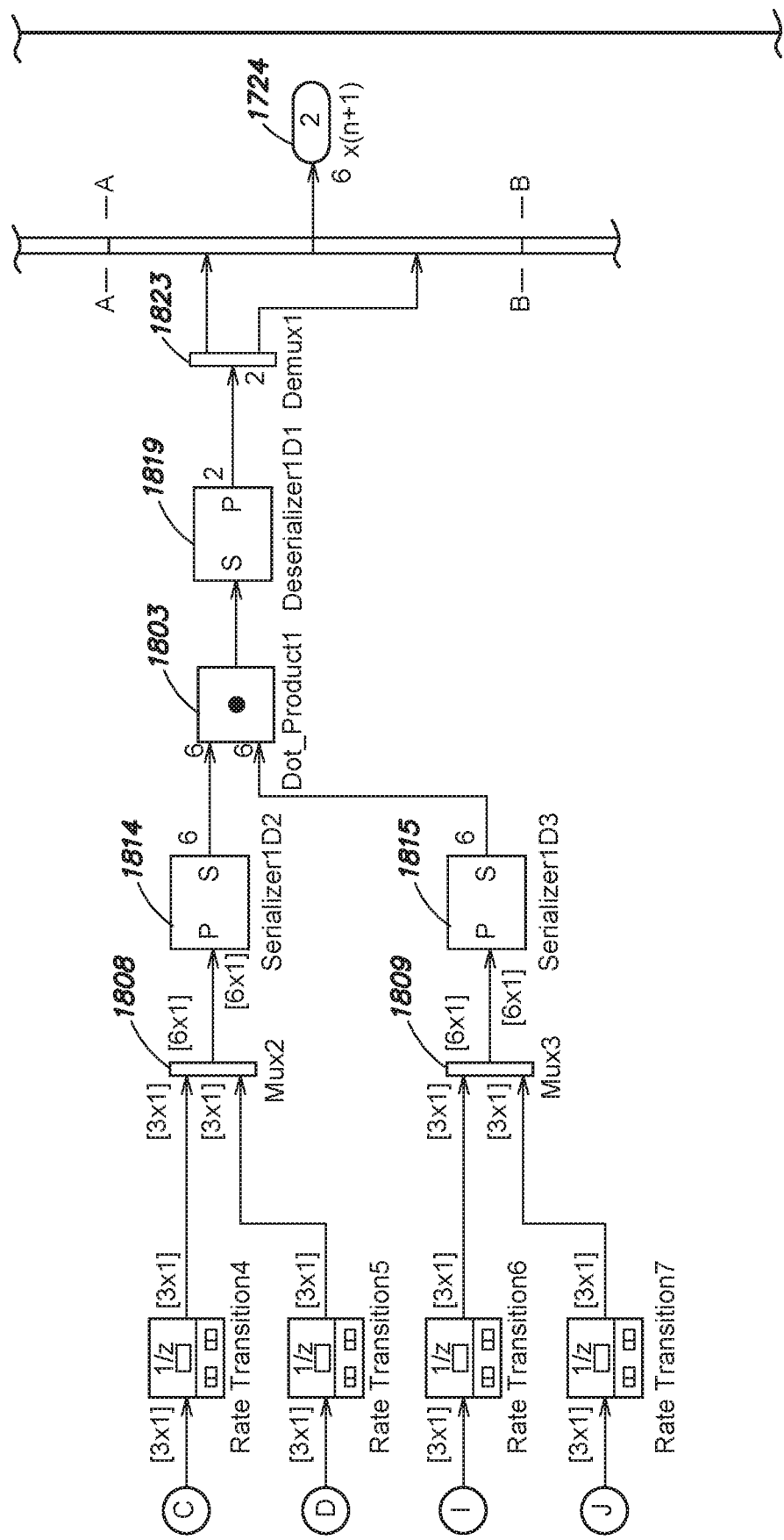
Figure 18D:
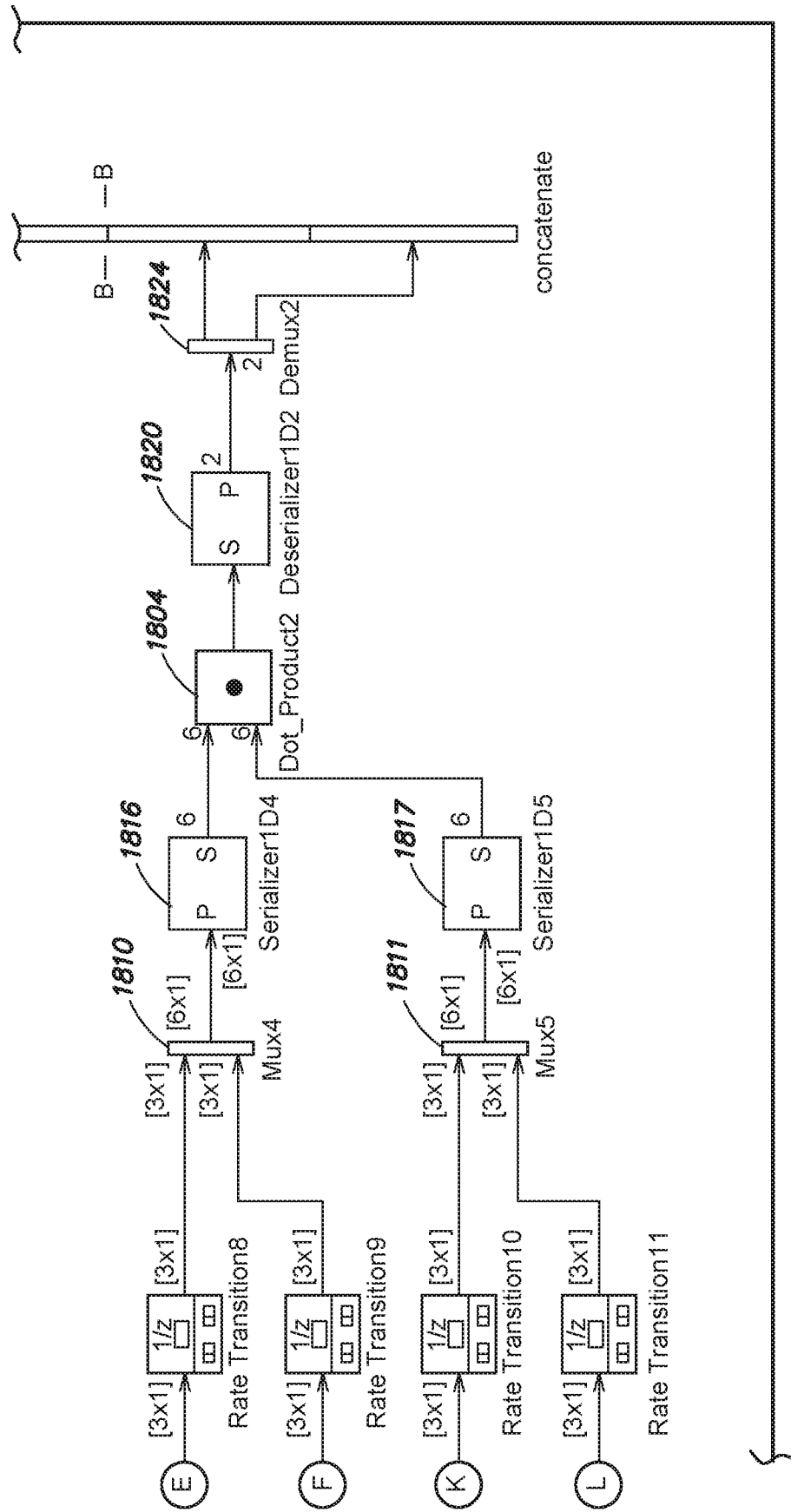

FIG. 17 is a schematic illustration of an example portion of a causal simulation model 1700 implementing a fully parallel sparse matrix multiply that may be generated by the simulation model generator 122 in accordance with one or more embodiments. The associated acausal physical component model may have three modes, and the causal simulation model portion 1700 generated by the simulation model generator 122 may include three constant blocks 1702-1704. Each constant block 1702-1704 may store the non-zero values of the discretized version of one of the matrices, e.g., $\hat{A}$, for each mode. The size of the matrices $\hat{A}$ may be 6×3. The causal model portion 1700 also may include two Inport blocks 1706 and 1708 named 'mode' and 'x(n)', respectively. The Inport block 1706 may receive a value for the mode and the Inport block 1708 may receive a vector for x. The size of the vector for x may be three. The causal simulation model portion 1700 may further include a Multiport Switch block 1710, two Multiport Selector blocks 1712 and 1714, six Dot Product blocks 1716-1721, a Concatenate block 1722, and an Outport block 1724. The three Constants blocks 1702-1704 may be connected as inputs to the Multiport Switch block 1710 and the Inport block 1706, which is associated with the computed mode value, may be connected to the control input of the Multiport Switch block 1710. The output of the Multiport Switch block 1710 may be provided as the input to the Multiport Selector block 1712.

The simulation model generator 122 may configure the Multiport Selector block 1712 to correctly characterize an entire row of the discretized matrix utilizing the retrieved non-zero values. The Inport block 1708, which is associated with the x vector, may be connected as an input to the Multiport Selector block 1714. Outputs of the Multiport Selector blocks 1712 and 1714 may be provided as the inputs to the six Dot Product blocks 1716-1721. In some embodiments, each Constant block may store respective entries that are non-zero for any mode configuration of the matrix, even if that entry is zero for a current matrix/Constant block. Entries that are zero for all mode configurations of the matrix may be omitted from all of the Constant blocks, thereby saving memory. Based on the switch condition as determined by the value of the mode Inport block 1706, the Multiport Switch block 1710 selects only one of the mode configurations and provides as its output the values of one of A(m1), A(m2), or A(m3). The Multiport Selector 1712 may align the received values to the correct column and row of the sparse matrix. It should be understood that other sparse matrix storage and retrieval techniques may be used.

The computed mode value of the Inport block 1706 determines which of the three $\hat{A}$ matrices is output by the Multiport Switch block 1710. The Multiport Selector blocks 1712 and 1714 then output respective rows of the selected $\hat{A}$ matrix and the x vector, which are provided to the Dot Product blocks 1716-1721. The Concatenate block 1722 concatenates the outputs of the Dot Product blocks 1716-1721 to generate the result of the Dot Product operation, which is provided to the Outport block 1724.

The causal model portion 1700 may be a single rate model portion.

As illustrated, the causal simulation model portion 1700 includes a respective Dot Product block 1716-1721 for each row of the $\hat{A}$ matrices. During code generation, the code generator 130 may designate registers of DSP slices of the target hardware 134, e.g., an FPGA, for storing the contents of the Constant blocks 1702-1704, e.g., the three $\hat{A}$ matrices.

In some embodiments, the discretized matrices may have tens or hundreds of rows. Furthermore, as the number of modes of an acausal physical component model increases, the number of $\hat{A}$, $\hat{B}$, $\hat{C}$, $\hat{D}$ matrices to be stored in the FPGA fabric also increases. The optimizer 112 may determine whether the size of all of the $\hat{A}$, $\hat{B}$, $\hat{C}$, $\hat{D}$ matrices exceeds a threshold of the FPGA's resources. In some embodiments, the threshold applied by the optimizer 112 may be 70-80% of the FPGA's resources, e.g., registers of DSP slices. If the size of the $\hat{A}$, $\hat{B}$, $\hat{C}$, $\hat{D}$ matrices to be stored in the FPGA fabric exceeds the threshold, the optimizer 112 may map the $\hat{A}$, $\hat{B}$, $\hat{C}$, $\hat{D}$ matrices to ROM blocks of the FPGA.

Figure 24A:
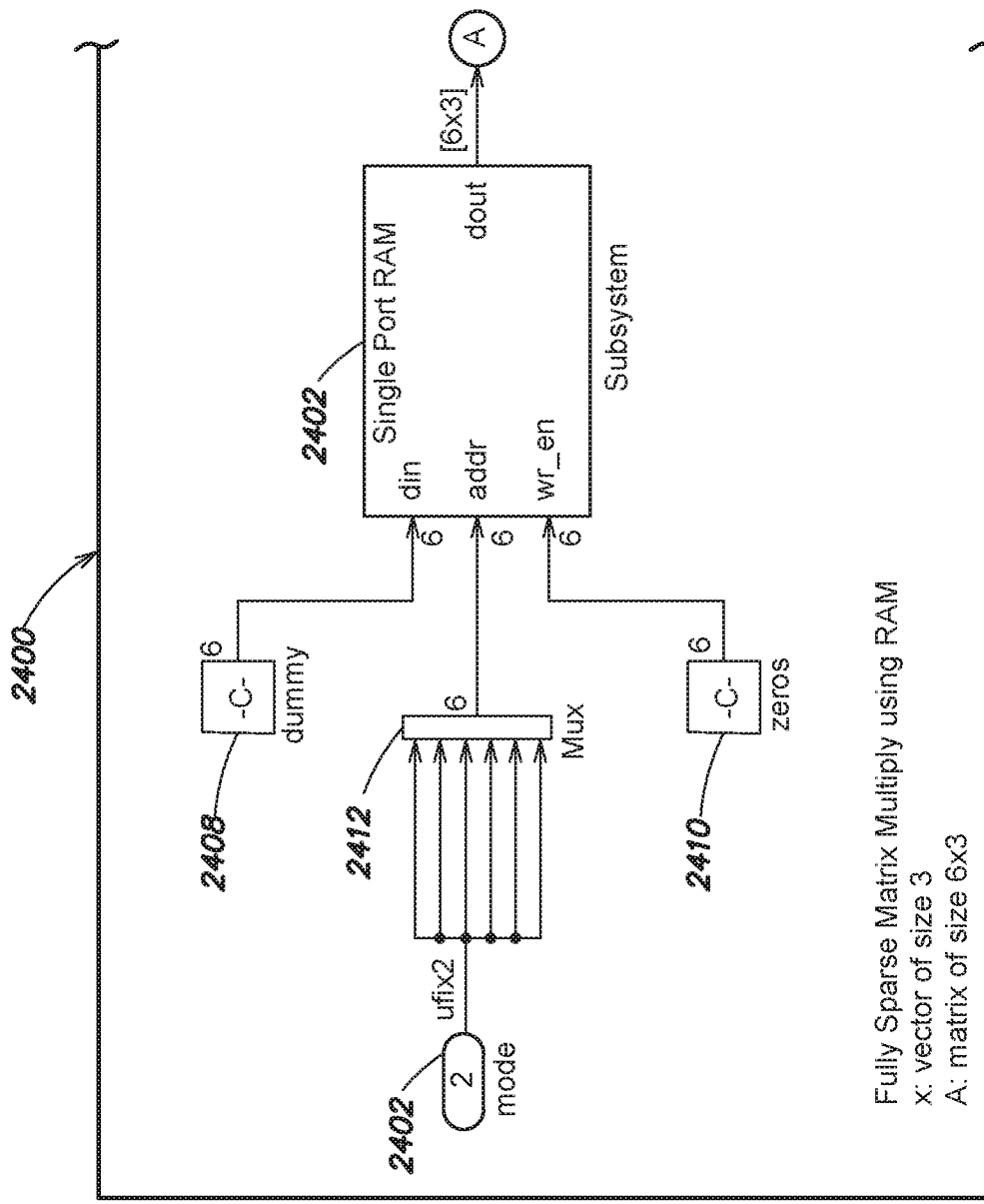
FIGS. 24A and 24B are partial views of a schematic illustration of an example fully parallel space matrix multiply in accordance with one or more embodiments.
Figure 24B:
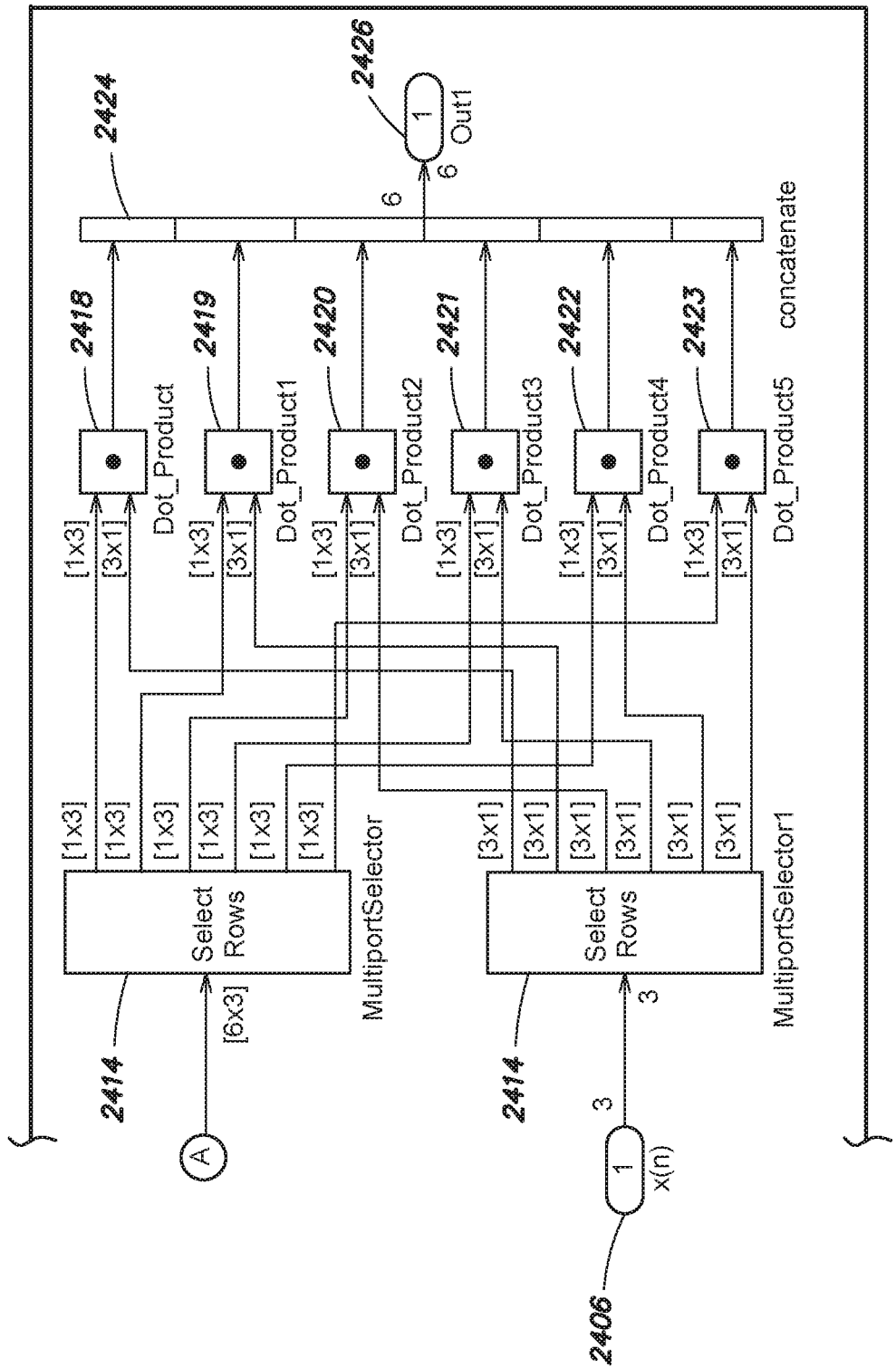

FIGS. 24A and 24B are partial views of a schematic illustration of an example portion of a causal simulation model 2400 implementing a fully parallel sparse matrix multiply that may be generated by the simulation model generator 122 in accordance with one or more embodiments. Here, the discretized matrix is initialized using RAM as opposed to registers of DSP slices as illustrated at FIG. 17. The causal model portion 2400 may include a block that models sequential read and write operations to a RAM or ROM, such as a Single Port RAM block 2402. Initial values of the Single Port RAM block 2402 may contain the non-zero values of the sparse matrix, e.g., $\hat{A}$. There may be no write enable performed during simulation of the causal model portion 2400 so functionally the Single Port RAM block 2402 may act as a ROM.

The causal model portion 2400 may further include two Inport blocks 2404 and 2406 named 'mode' and 'x(n)', respectively. The Inport block 12404 may receive a value for the mode and the Inport block 2406 may receive a vector for x. The size of the vector for x may be three. The causal model portion 2400 may include two Constant blocks 2408 and 2410 named 'dummy' and 'zeros', and a Mux block 2412. The Single Port RAM block 2402 may include three input ports: data input (din), write address (addr), and write enable (wr_en). The output of the Constant block 2408 may be connected to the din port, the output of the Mux block 2412 may be connected to the addr port, and the output of the Constant block 2410 may be connected to the wr_en port. The simulation model generator 122 may configure the Constant block 2410 to contain zeros. As a result, the Single Port RAM 2402 may mimic operation of a ROM. The causal simulation model portion 2400 may further include two Multiport Selector blocks 2414 and 2416, six Dot Product blocks 2418-2423, a Concatenate block 2424, and an Outport block 2426 named 'Out l'. The output of the Single Port RAM block 2402 may be provided as the input to the Multiport Selector block 2414. The Inport block 2406, which is associated with the x vector, may be connected as an input to the Multiport Selector block 2416. Outputs of the Multiport Selector blocks 2414 and 2416 may be provided as the inputs to the six Dot Product blocks 2418-2423. As with the causal simulation model portion 1700, the Concatenate block 2424 concatenates the outputs of the Dot Product blocks 2418-2423 to generate the result of the Dot Product operation, which is provided to the Outport block 2426.

Mapping the $\hat{A}$, $\hat{B}$, $\hat{C}$, $\hat{D}$ matrices to ROM blocks by the simulation model generator 122 may reduce sample frequency of the FPGA as an extra clock cycle may be required to read values of the $\hat{A}$, $\hat{B}$, $\hat{C}$, $\hat{D}$ matrices when stored at ROM blocks, such as the Single Port RAM block 2402.

It should be understood that causal model portions 1700 and 2400 are meant for illustrative purposes and the simulation model generator 122 may generate other causal simulation models utilizing other model elements.

The optimizer 112 also may apply Resource Sharing and/or Streaming optimization techniques so that the generated HDL code meets the available resources of the target hardware 134. For example, FPGAs typically have a limited number of DSP slices or other hardware resources that may be utilized to implement the functionality of one or more of the matrix multiply blocks 1214 (FIG. 12) and/or the Dot Product blocks of FIGS. 17 and 24. The optimizer 112 may direct the simulation model generator 122 to share a Dot Product block across more than one row of a discretized matrix. In other embodiments, input data processed by a multiplier, adder, or other block may be streamed. With resource sharing, the target hardware 134, e.g., an FPGA, will run at a higher rate to provide the same resources to multiple operations. For example, if the sharing factor is N and the base rate of the causal simulation model 1500 is T, then the FPGA base rate will become N*T.

FIG. 26 is a schematic illustration of an example resource sharing process 2600 when the Sharing Factor is a factor of the number of rows of the discretized matrix in accordance with one or more embodiments. While discretized matrices may have many, e.g., tens or hundreds of rows and columns, for ease of description and illustration, an $\hat{A}$ matrix 2602 is a 10×10 matrix and an x matrix 2604 is a 10×1 vector, such that the result 2606 of the matrix multiply is a 10×1 vector. Without resource sharing, the simulation model generator 122 may utilize ten Dot Product blocks, e.g., one for each row of the $\hat{A}$ matrix 2602, in the causal simulation model being generated. For discretized matrices having tens or hundreds of rows, the target hardware 134, e.g., the FPGA, may not have sufficient resources to provide dot product blocks for each row. To optimize the generated causal simulation model, and thus the HDL code generated from the causal simulation model, the optimizer 112 may implement resource sharing. Suppose further that the value of the Sharing Factor to be used with the $\hat{A}$ matrix 2602 is a factor of the number of rows of the $\hat{A}$ matrix 2602. For example, suppose the Sharing Factor, which may be user specified, is five, as indicated at 2608. Based on these values, the optimizer 112 may create two sharing groups 2610 and 2612. The first sharing group 2610 may perform the matrix multiply for rows 0-4 of the $\hat{A}$ matrix 2602 and the second sharing group 2612 may perform the matrix multiply for rows 5-9 of the $\hat{A}$ matrix 2602.

Figure 27A:
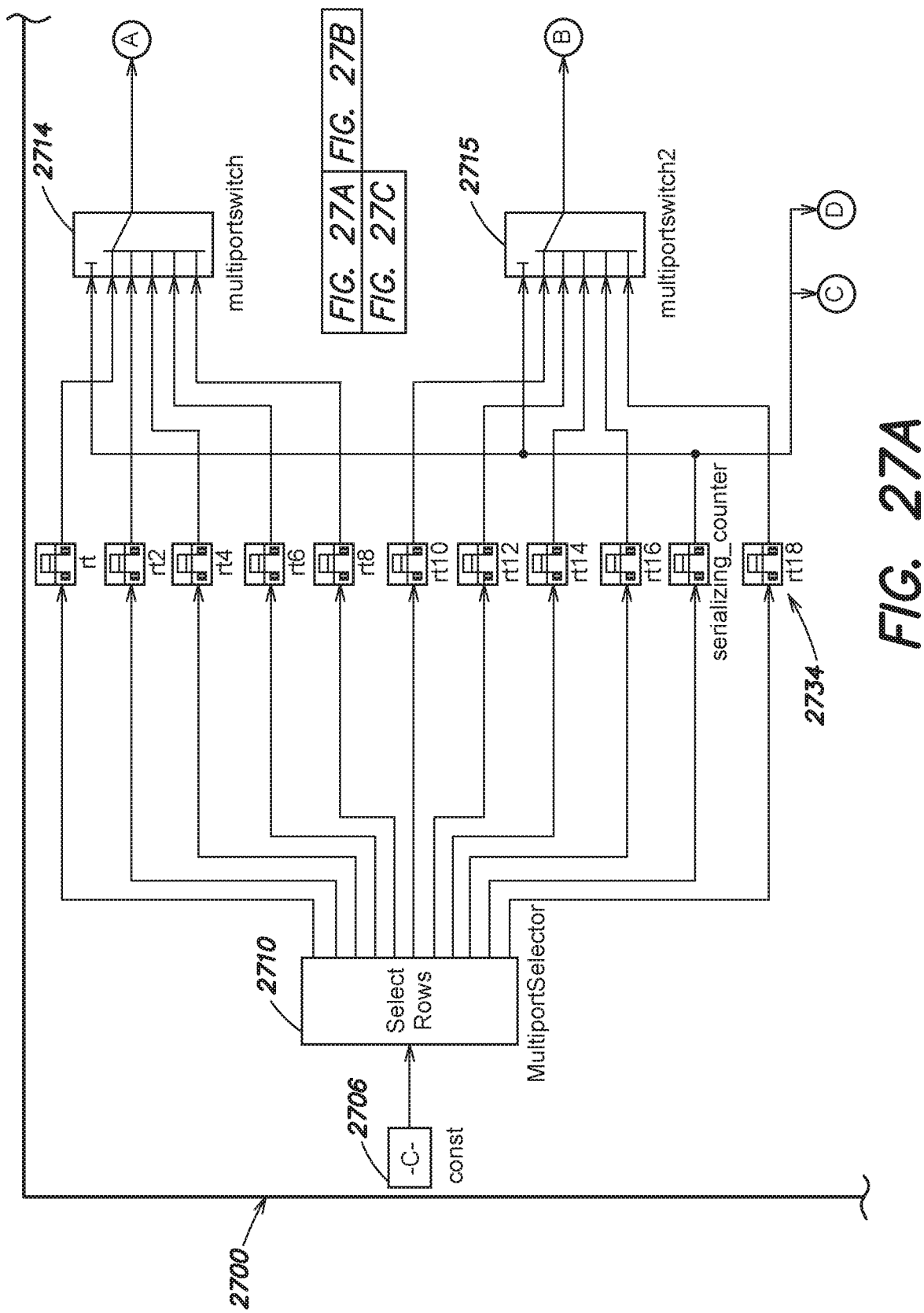
FIGS. 27A-27C are partial views of a schematic illustration of a portion of a causal simulation model implementing resource sharing in accordance with one or more embodiments.
Figure 27B:
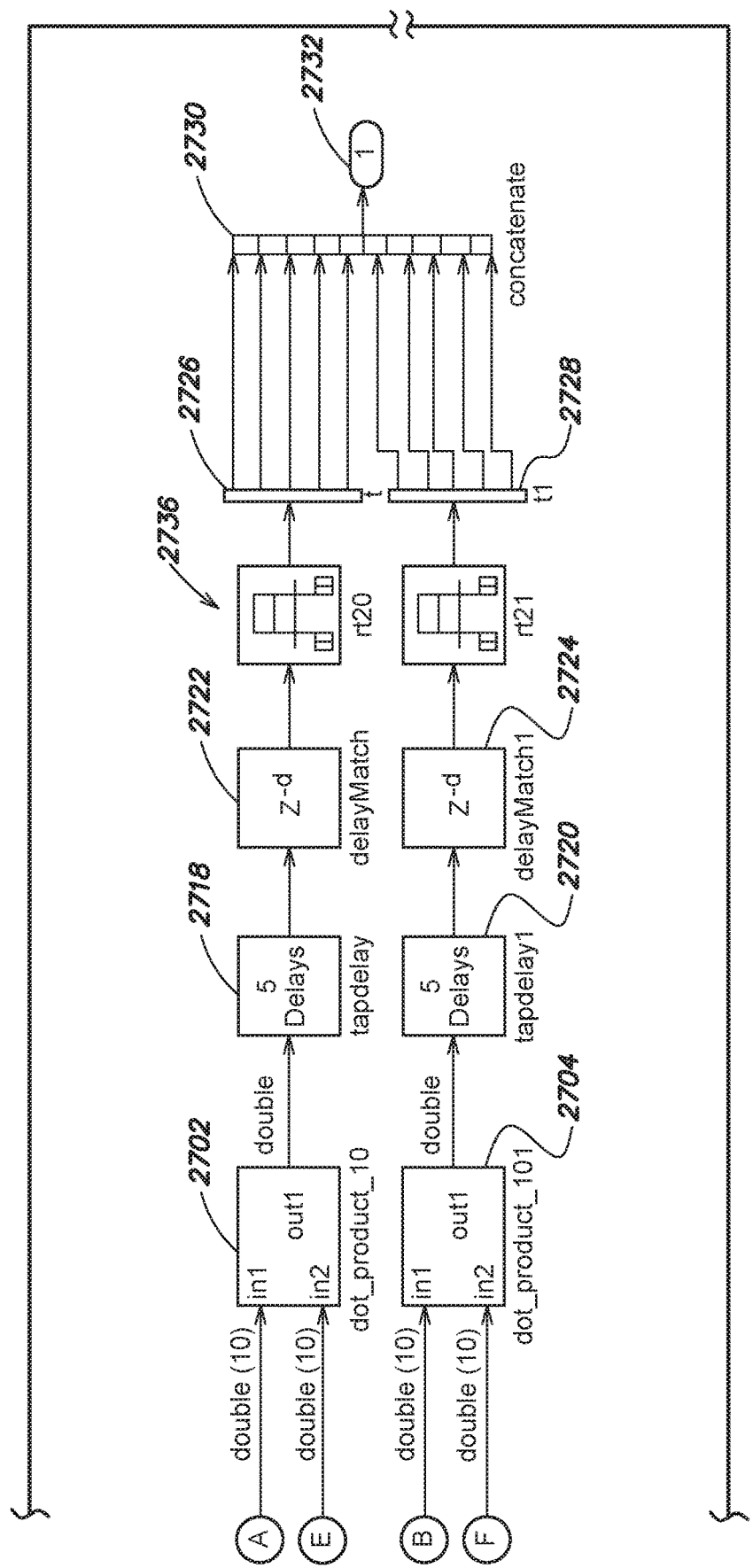
Figure 27C:
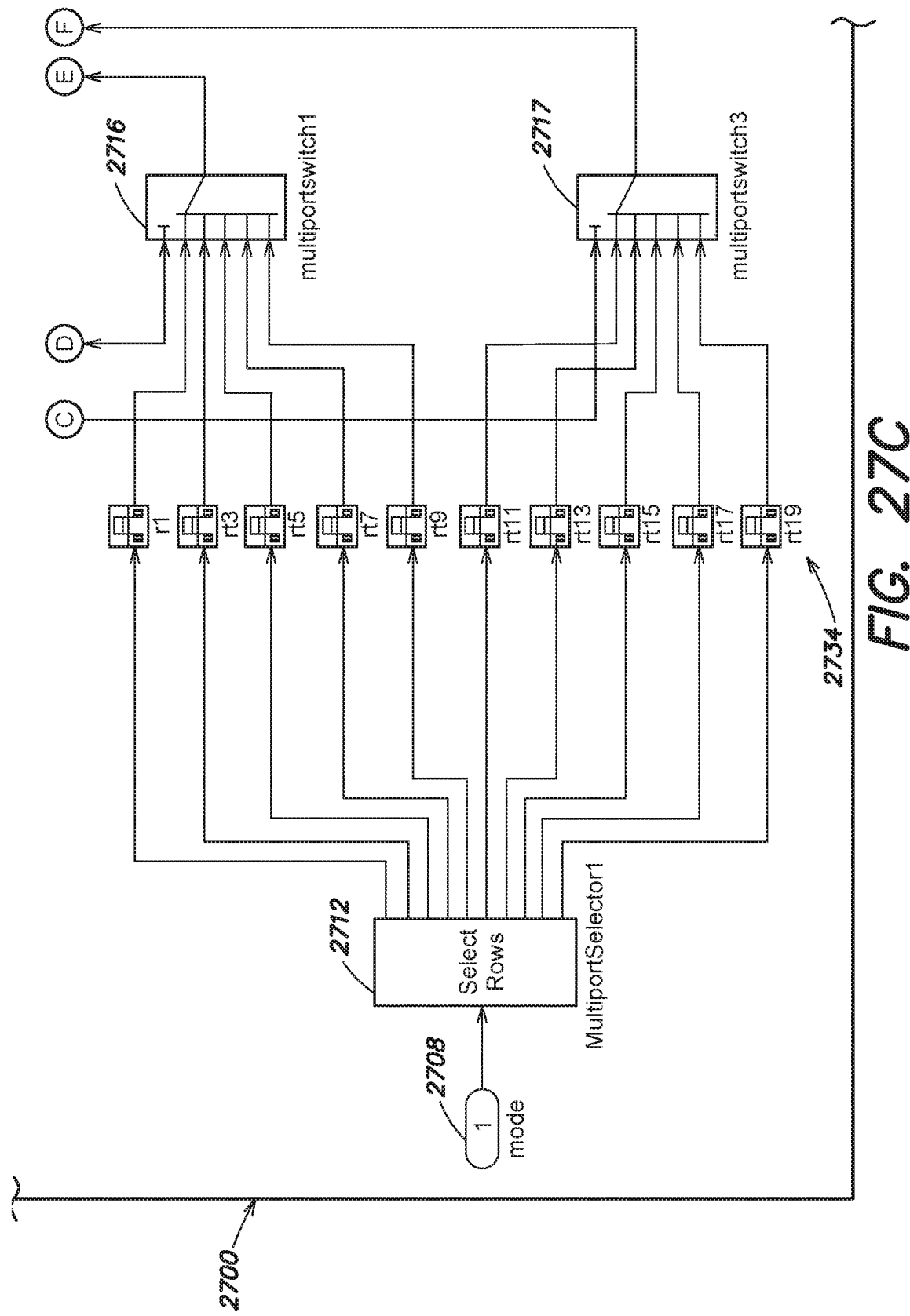

FIGS. 27A-27C are partial views of a schematic illustration of a portion of an example causal simulation model 2700 implementing the resource sharing example of FIG. 26 in accordance with one or more embodiments. While the $\hat{A}$ matrix 2602 (FIG. 26) has ten rows, instead of a fully parallel implementation having ten Dot Product blocks, the causal model portion 2700 generated by the simulation model generator 122 includes just two Dot Product blocks 2702 and 2704. The causal model portion 2700 also may include a Constant block 2706 named 'const' and an Inport block 2708 named 'mode'. The Constant block 2706 may be associated with one or more discretized matrices, and the Inport block 2708 may receive a value for the mode. The causal model portion 2700 may further include two Multiport Selector blocks 2710 and 2712 and four Multiport Switch blocks 2714-2717. The causal simulation model portion 2700 may also include two Tap Delay blocks 2718 and 2720, two Delay Match blocks 2722 and 2724, two Bus blocks 2726 and 2728, a Concatenate block 2730, and an Outport block 2732. The simulation model generator 122 may configure the four Multiport Switch blocks 2714-2717, the two Dot Product blocks 2702 and 2704, the two Tap Delay blocks 2718 and 2720, and the two Delay Match blocks 2722 and 2724 to run at a faster rate than the Constant block 2706, the Inport block 2708, the two Multiport Selector blocks 2710 and 2712, the two Bus blocks 2726 and 2728, the Concatenate block 2730, and the Outport block 2732. The simulation model generator 122 may include Rate Transition blocks in the causal simulation model portion 2700 to transition between blocks running at different rates. For example, the simulation model generator 122 may include a plurality of Rate Transition blocks indicated generally at 2734 between the Multiport Selector blocks 2710 and 2712 and the Multiport Switch blocks 2714-2717. The simulation model generator 122 may also include additional Rate Transition blocks indicated generally at 2736 between the Delay Match blocks 2722 and 2724 and the Bus blocks 2726 and 2728.

The Multiport Selector block 2710 may align the received values to match the sparse matrix, as described with FIG. 17. The Multiport Switch block 2714 may select one of the choices based on the fast clock for the dot product computation. The Tap Delay blocks 2718 and 2720 and the Delay Match blocks 2722 and 2724 may perform delay balancing so that the resource shared system, e.g., model 2700, behaves equivalently to the original system (before resource sharing) in time, e.g., temporarily.

FIGS. 18A-18D are partial views of a schematic illustration of a portion of an example causal simulation model 1800 implementing a resource sharing example of the causal simulation model portion 1700 of FIG. 17 with a sharing factor of two (2) in accordance with one or more embodiments. While the causal simulation model portion 1700 includes six Dot Product blocks 1716-1721, resource sharing reduces the number of Dot Product blocks in the causal simulation model portion 1800 to three, e.g., Dot Product blocks 1802-1804. The causal simulation model portion 1800 includes many of the same elements, e.g., blocks, as the causal simulation model portion 1700, such as the three Constant blocks 1702-1704, the two Inport blocks 1706 and 1708, the Multiport Switch block 1710, the two Multiport Selector blocks 1712 and 1714, the Concatenate block 1722, and the Outport block 1724. The sharing optimization may be implemented by the optimizer 122 using time-division multiplexing. Because the outputs of the shared resource(s), e.g., the Dot Product blocks 1802-1804, are to be sampled at the predefined sample rate of the original model, e.g., causal simulation model portion 1700, the optimizer 112 may construct and configure the causal simulation model portion 1800 such that the shared resource(s) run at a faster rate than the data rate. For example, the optimizer 112 and the simulation model generator 122 may include multiplexer-serializers at the inputs of the shared resource(s) and demultiplexer-deserializers at the outputs of the shared resource(s) as well as rate transition blocks. Specifically, the simulation model generator 122 may include six Multiplexer (Mux) blocks 1806-1811, six Serializer blocks 1812-1817, three Deserializer blocks 1818-1820, and three Demuliplexer (Demux) blocks 1822-1824. The simulation model generator 122 also may include twelve Rate Transition blocks indicated generally at 1826 in the causal simulation model portion 1800.

The causal simulation model portion 1800 may be a multirate model portion. Two regions indicated at 1828 and 1830, which are associated with the inputs and outputs of the shared Dot Product blocks 1802-1804, may operate at one rate, while another region indicated at 1832, which is associated with the Mux blocks 1806-1811, the Serializer blocks 1812-1817, and the Dot Product blocks 1802-1804 operate at another rate which is three times the rate at which regions 1828 and 1830 run.

When the sharing factor is not a factor of the number of rows of the respective sparse matrices, the number of elements of the last sharing group may be less than the previous sharing group. If the previous group had a sharing factor of N, the last group may have a sharing factor of M where M<N. This may have an impact in the FPGA base clock rate because the FPGA base clock rate is the multiple of the least common multiple of the sharing factors used in all the groups. For example, if N=4 and M=3, then the FPGA base clock rate will be 12× faster than the base rate of the associated causal simulation model. However, if both M and N are 4, then the FPGA base clock rate will be 4× the base rate of the associated causal simulation model, thus effectively running the user design at a better sample rate. So, an objective may be to always have that last group have the same number of elements as the previous groups. The optimizer 112 may achieve this by adding dummy rows to the Dot Product block(s). At the output of the Dot Product block(s), the optimizer 112 may use a Terminator block to reject the data coming from the dummy row. This may result in achieving as low a timestep as possible when using resource sharing.

Figure 28:
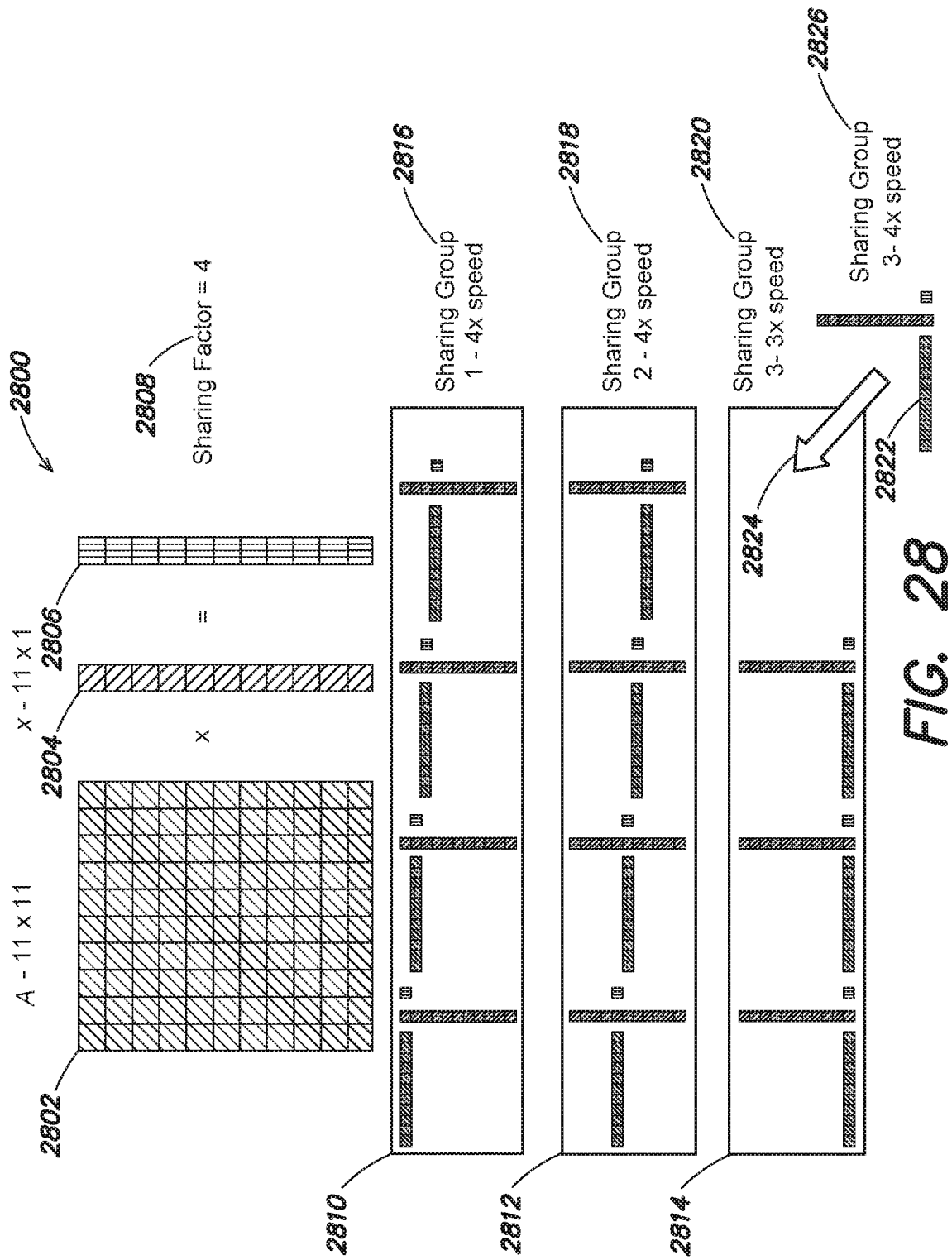
FIG. 28 is a schematic illustration of an example resource sharing process in accordance with one or more embodiments.

FIG. 28 is a schematic illustration of an example resource sharing process 2800 when the Sharing Factor is not a factor of the number of rows of the discretized matrix in accordance with one or more embodiments. Again, while discretized matrices may have many, e.g., tens or hundreds of rows and columns, for ease of description and illustration, an Â matrix 2802 is an 11×11 matrix and an x matrix 2804 is an 11×1 vector, such that a result 2806 of the matrix multiply is an 11×1 vector. Suppose the Sharing Factor to be used with the Â matrix 2802 is four, as indicated at 2808. Based on these values, the optimizer 112 may create three sharing groups 2810, 2812, and 2814. The first sharing group 2810 may perform the matrix multiply for rows 0-3 of the Â matrix 2802. The second sharing group 2812 may perform the matrix multiply for rows 5-8 of the Â matrix 2802. The third sharing group 2814 may perform the matrix multiply for rows 9-11 of the Â matrix 2802. In this case, for the first and second sharing groups 2810 and 2812, the Sharing Factor is four, resulting in a 4× speed increase as indicated at 2816 and 2818. For the third sharing group 2814, the Sharing Factor is three, resulting in a 3× speed increase as indicated at 2820. As a result, the FPGA base clock rate will be 12× faster than the base rate of the associated causal simulation model, as 12 is the least common multiple of three and four.

As noted, the optimizer 112 may be configured to add a dummy row as indicated at 2822, which may be associated with the third sharing group 2814 as indicated by arrow 2824. Adding the dummy row 2822 may result in the Sharing Factor for the third group 2814 to be changed from three to four as indicated at 2826. By including the dummy row 2822, the FPGA base clock rate need only be 4× faster than the base rate of the associated causal simulation model.

Figure 29A:
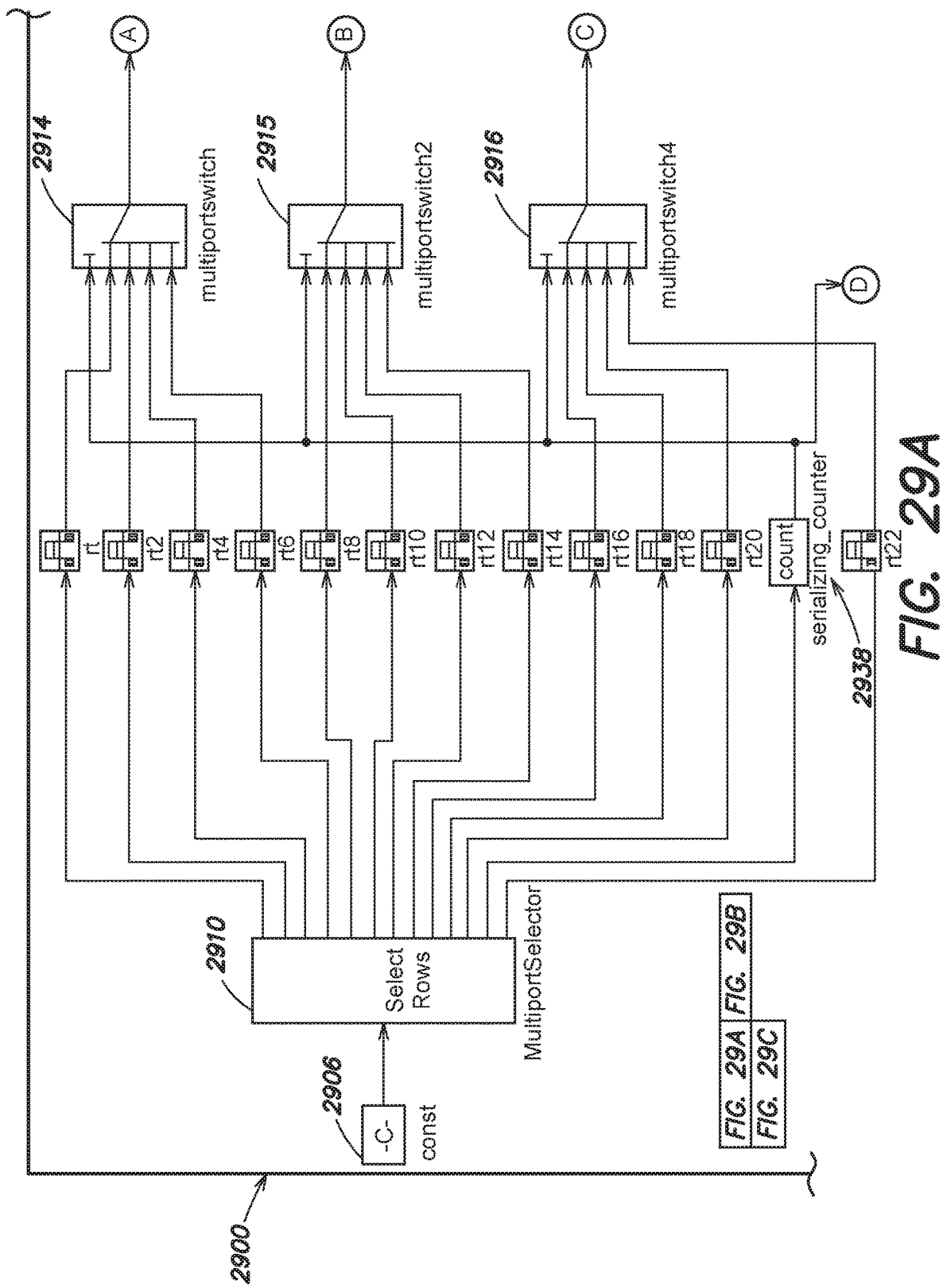
FIGS. 29A-29C are partial views of a schematic illustration of a portion of a causal simulation model implementing resource sharing in accordance with one or more embodiments.
Figure 29B:
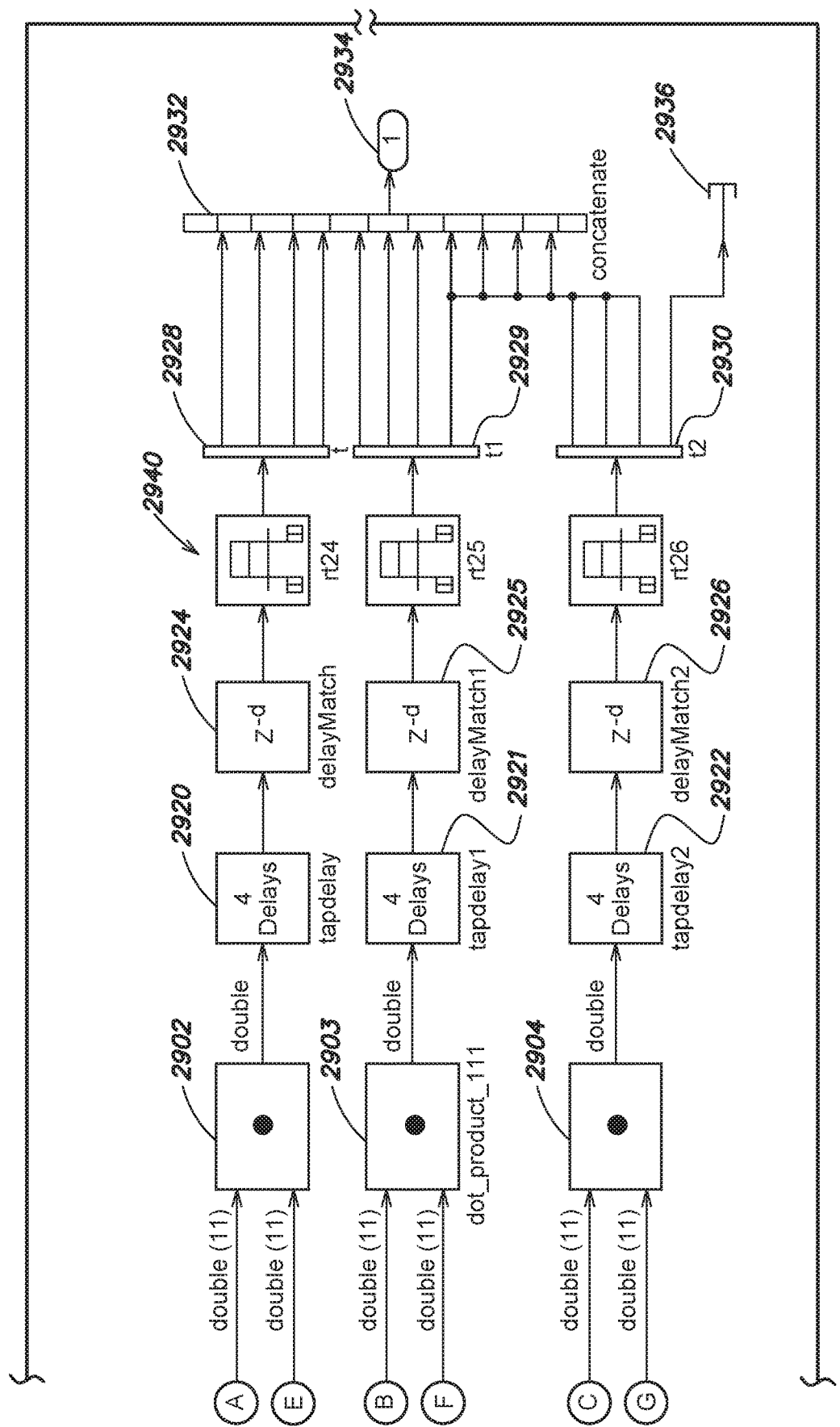
Figure 29C:
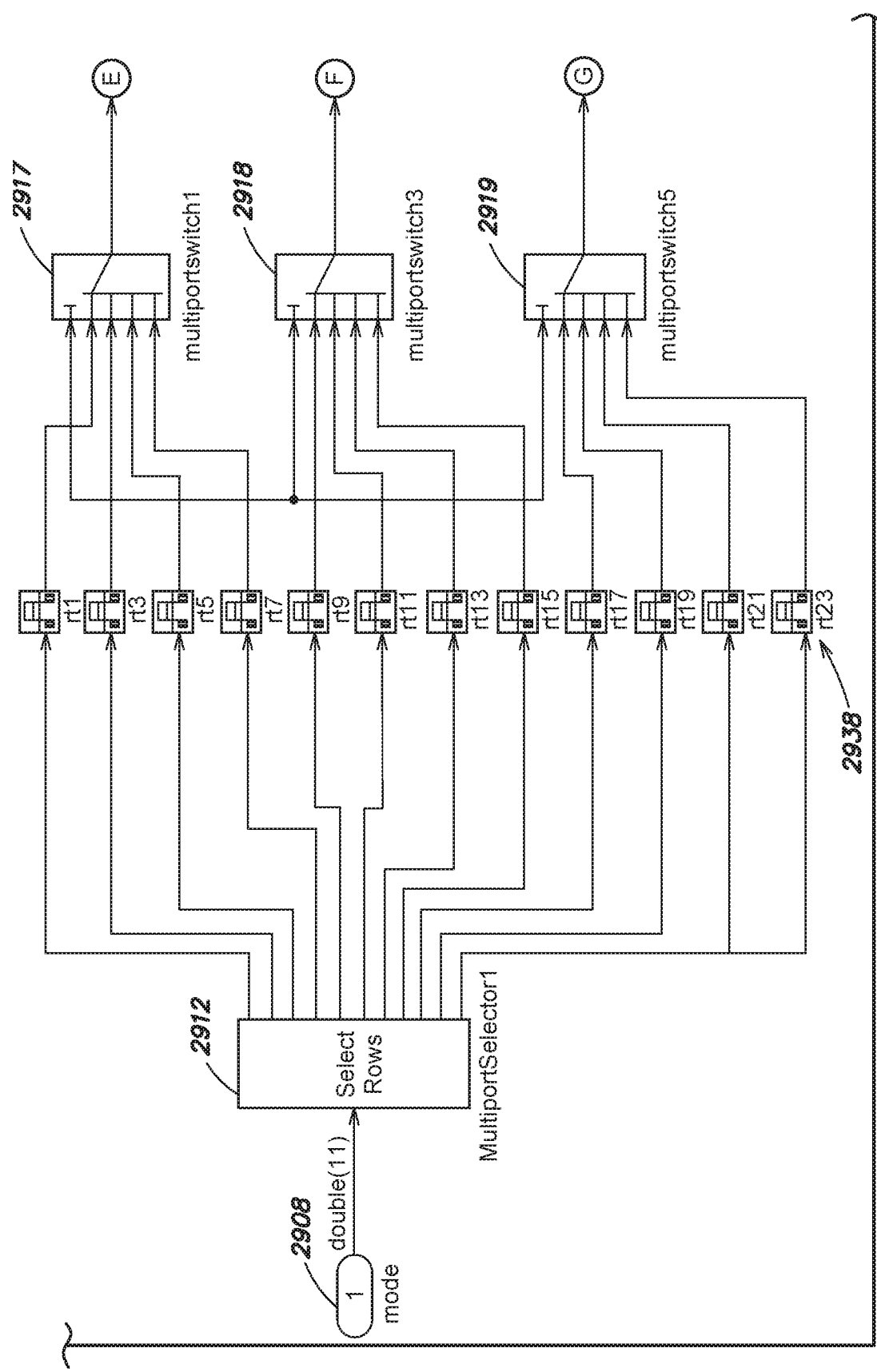

FIGS. 29A-29C are partial views of a schematic illustration of a portion of a causal simulation model 2900 implementing the resource sharing example of FIG. 28 in accordance with one or more embodiments. While the Â matrix 2802 (FIG. 28) has eleven rows, instead of a fully parallel implementation having eleven Dot Product blocks, the causal simulation model portion 2800 generated by the simulation model generator 122 includes just three Dot Product blocks 2902-2904. The causal model portion 2900 also may include a Constant block 2906 named 'const' and an Inport block 2908 named 'mode'. The Constant block 2906 may be associated with one or more discretized matrices, e.g., the Â matrix 2802, and the Inport block 2908 may receive a value for the mode. The causal model portion 2900 may further include two Multiport Selector blocks 2910 and 2912 and six Multiport Switch blocks 2914-2919. The causal model portion 2900 may also include three Tap Delay blocks 2920-2922, three Delay Match blocks 2924-2926, three Bus blocks 2928-2930, a Concatenate block 2932, and an Outport block 2934. To resolve the dummy row 2822 (FIG. 28) that was added, the simulation model generator 122 may add a Terminator block 2936 to the causal simulation model portion 2900. The simulation model generator 122 may configure the Terminator block 2936 to discard the output computed by the Dot Product block 2904 associated with the dummy row. This arrangement may ensure that the dummy row computation is discarded (via Terminator block 2936) and is not collected by the Concatenate block 2932.

The simulation model generator 122 may configure the four Multiport Switch blocks 2914-2919, the three Dot Product blocks 2902-2904, the three Tap Delay blocks 2920-2922, and the three Delay Match blocks 2924-2926 to run at a faster rate than the Constant block 2906, the Inport block 2908, the two Multiport Selector blocks 2910 and 2912, the three Bus blocks 2928-2930, the Concatenate block 2932, the Terminator block 2936, and the Outport block 2934. The simulation model generator 122 may include Rate Transition blocks in the causal simulation model portion 2900 to transition between blocks running at different rates. For example, the simulation model generator 122 may include a plurality of Rate Transition blocks indicated generally at 2938 between the Multiport Selector blocks 2910 and 2912 and the Multiport Switch blocks 2914-2919. The simulation model generator 122 may also include additional Rate Transition blocks indicated generally at 2940 between the Delay Match blocks 2924-2926 and the Bus blocks 2928-2930.

The optimizer 112 may apply one or more rules for optimizing the HDL generated for the specific target hardware 134. For example, the optimizer 112 may utilize the number of multiplier or other resources at the target hardware 134 as a constraint in the determination of resource sharing. The optimizer 112 may perform a trade-off analysis between the sharing factor and the state update simulation time step. For example, a higher resource sharing/streaming factor may cause a decrease in the state update simulation time step, because each time step may need to process additional data with a limited number of resources, e.g., multipliers, adders, etc. The optimizer 112 may implement an objective to not decrease the simulation time step while still ensuring that the causal model fits onto the target hardware 134, e.g., ensure that the causal model does not require more resources than are available at the target hardware 134.

In some embodiments, the optimizer 112 may receive one or more options or settings, e.g., by a user, that direct and/or control the optimizations implemented by the optimizer 112 and/or the code generator 130.

Suitable techniques for performing resource sharing and streaming optimizations are described in U.S. Pat. No. 8,694,947 for Resource Sharing Workflows within Executable Graphical Models, U.S. Pat. No. 8,863,069 for Hardware Definition Language Generation for Data Serialization from Executable Graphical Models, U.S. Pat. No. 9,436,441 for Systems and Methods for Hardware Resource Sharing, and U.S. Pat. No. 9,454,627 for Systems and Methods for Optimizing Executable Models for Hardware Synthesis, which patents are hereby incorporated by reference in their entireties.

FIGS. 25A-D are partial views of a flow diagram of an example method in accordance with one or more embodiments.

The simulation model compiler 102 may access an acausal physical component model, such as the model 1000, as indicated at block 2502. The simulation model compiler 102 also may receive one or more attributes of target hardware, e.g., the target hardware 134, on which HDL code generated for the acausal physical component model 1000 is to be deployed, as indicated at block 2504. For example, the simulation environment 100 may include a User Interface (UI) engine that may present one or more UIs, such as Graphical User Interfaces (GUIs), on a display. A user may identify the acausal physical component model 1000 by entering its name and the file directory path indicating where in a file system or in memory the acausal physical component model is stored. The user may also identify the target hardware 134, e.g., by manufacturer name, product family name, and/or product name. In some embodiments, the simulation environment 100 may include or have access to a library that includes characteristics of target hardware searchable by family and/or product name. The user may also identify the hardware synthesis tools 136 to be used to synthesize the target hardware 134. Exemplary target hardware includes the Speedgoat IO331 FPGA/I/O module from Speedgoat GmbH of Liebefeld Switzerland and the CompactRIO systems from National Instruments Corp. of Austin, Tex., among others, and exemplary hardware synthesis tools 136 include Xilinx Vivado and ISE, Altera Quartus, and Microsemi Libero, among others.

The model analyzer 103 may analyze the acausal physical component model 1000, as indicated at block 2506, e.g., to determine whether it is linear, switched linear, or non-linear. If the model 1000 is determined to be non-linear, as indicated by decision block 2508, the model analyzer 103 may determine options and/or suggestions for revising the model to make it linear or switched linear. The UI engine may present these options and/or suggestions to the user, e.g., in one or more UIs, as indicated by Yes arrow 2510 leading to block 2512.

In some embodiments, the model analyzer 103 may be configured to apply one or more rules indicating that non-linear elements may be replaced with linear or switched linear elements that may be configured to have equivalent functionality as the non-linear element being replaced. For example, the model analyzer 103 may search the model 1000 for the existence of one or more predefined elements that may render the model non-linear. Exemplary elements of the Simscape modeling environment that may cause the model to be non-linear include an AC voltage source element, an AC current source element, a Piecewise Linear (PWL) voltage source element, a PWL current source element, a Variable Resistor element, and a non-linear Inductor element, among others. The model analyzer 103 may recommend that the user consider replacing AC voltage source, AC current source, PWL voltage source, and PWL current source elements with either Controller Voltage Source element or a Controller Current Source element also of the Simscape modeling environment in which the non-linearity is handled utilizing the control ports of the Controller elements. For Variable Resistor elements, the model analyzer 103 may recommend that the user consider replacing the Variable Resistor element with a set of Switch and Resistor elements for each desired value, thereby converting the non-linear model to a switched linear model. For non-linear Inductor elements, the model analyzer 103 may recommend that the user consider utilizing a linear element instead.

It should be understood that the techniques and methods described herein may be applied to linear or switched linear simulation models in other physical domains besides electrical, such as mechanical and hydraulic. For a mechanical simulation model, the system of equations generated by the equation generator 106 may be based on one or more equations of motion. For a hydraulic simulation model, the system of equations generated by the equation generator 106 may be based on one or more energy and/or conservation equations.

Figure 30:
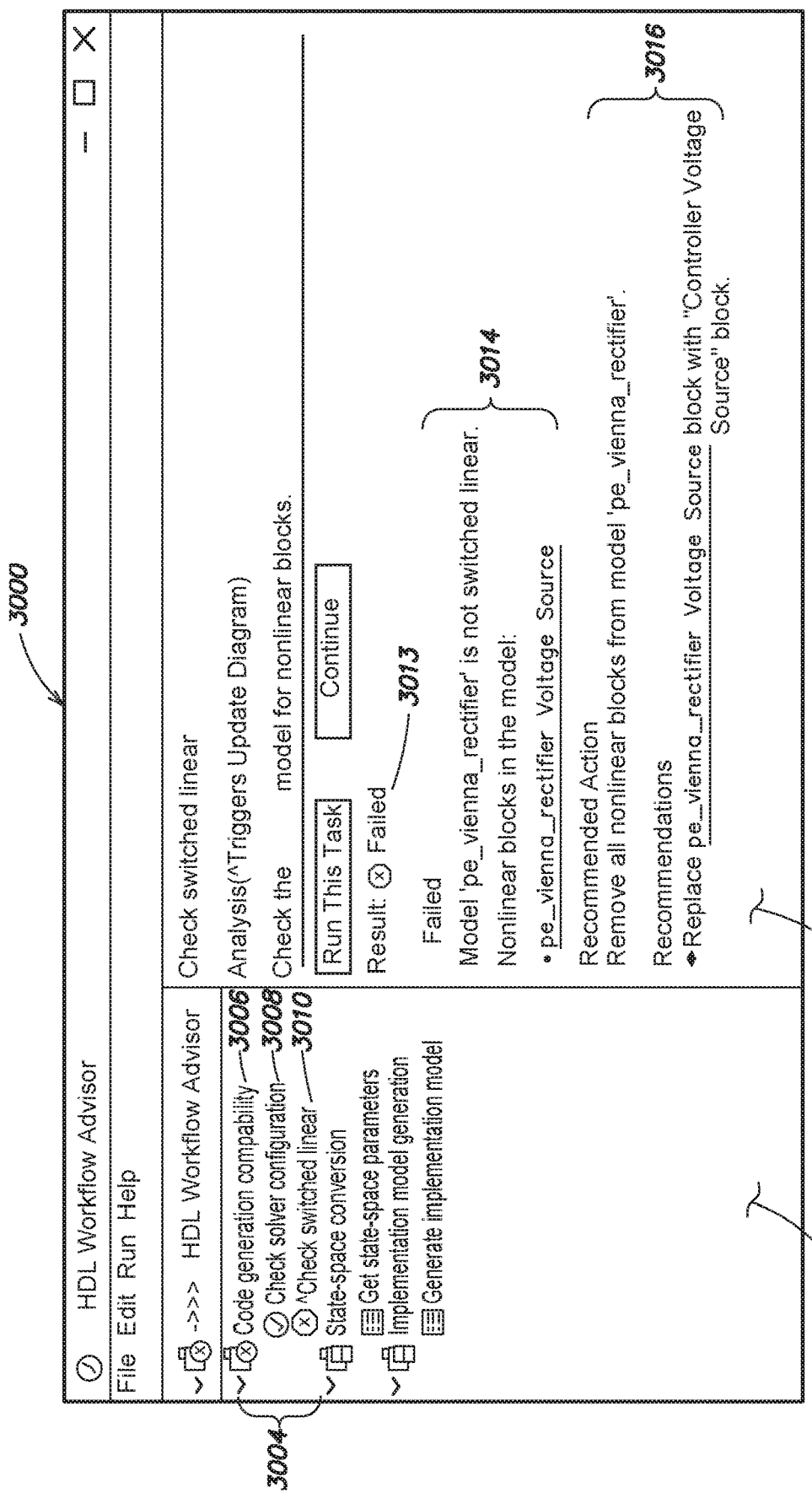
FIG. 30 is a schematic illustration of an example User Interface in accordance with one or more embodiments.

FIG. 30 is a schematic illustration of an example User Interface (UI) 3000 presenting a suggested recommendation in accordance with one or more embodiments. The UI 3000 may be presented on the display device 118 and may include a status pane 3002 that may provide a status of the process indicated at 3004 of generating a causal simulation model for an acausal physical component model. The process 3004 may include a code generation compatibility step 3006 that may include a check solver configuration sub-step 3008 and a check switched linear sub-step 3010. The UI 3000 may also include an information pane 3012 that may provide information associated with the current step of the process, e.g., the check switched linear sub-step 3010. The information pane 3012 may include an indication of the result of the current step, e.g., failed, as indicated at 3013. The information pane 3012 also may include information indicated at 3014 that a non-linear element was detected, e.g., an AC voltage source element. The information pane 3012 also may include a suggestion or recommendation generated by the model analyzer 103 as indicated at 3016, e.g., to replace the AC voltage source element with a Controller Voltage Source element.

It should be understood that the model analyzer 103 may make suggestions for other non-linear elements.

Figure 25A:
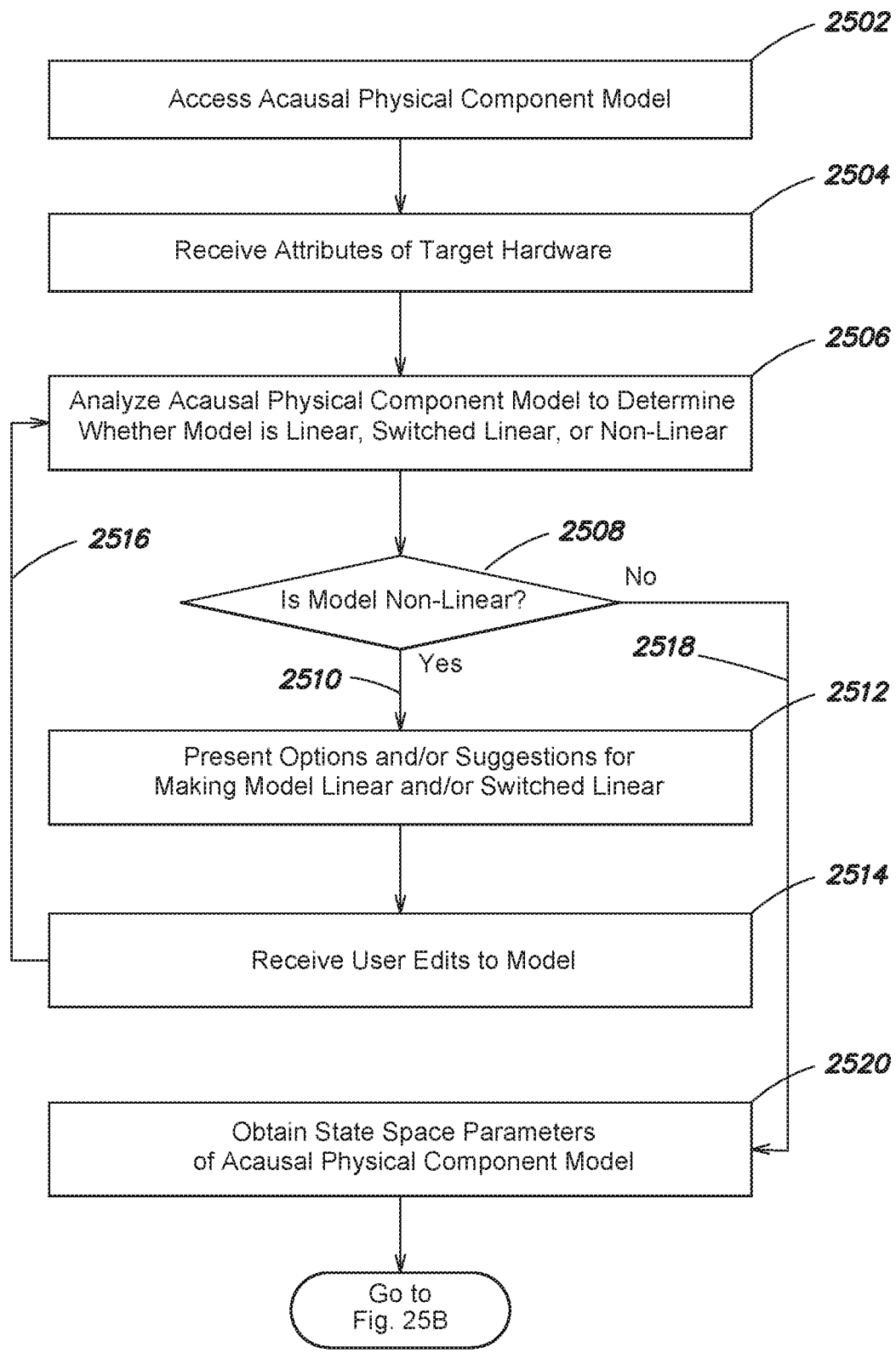
FIGS. 25A-D are partial views of a flow diagram of an example method in accordance with one or more embodiments.
Figure 25B:
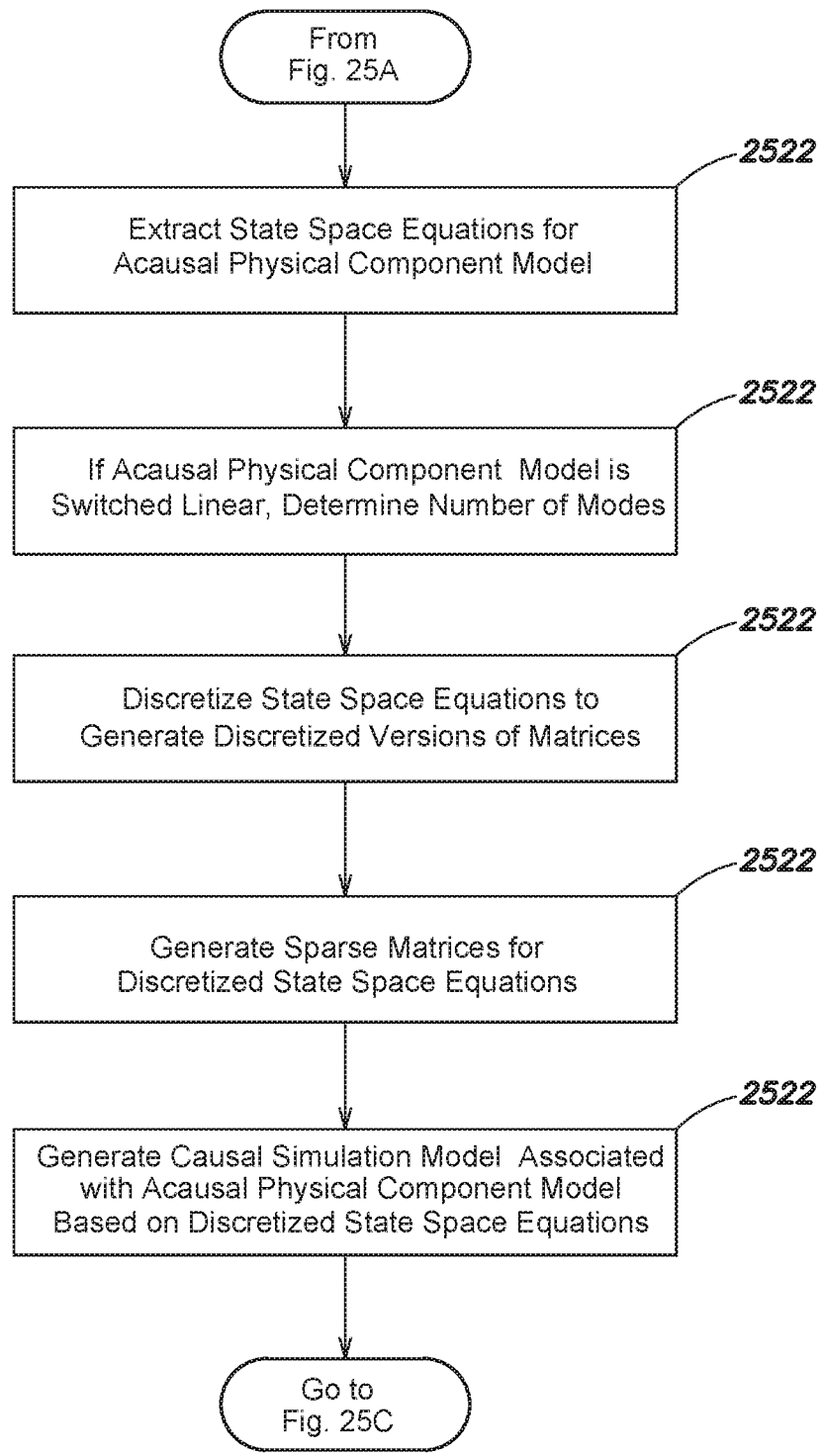

In some cases, the user may modify the acausal physical component model by implementing the recommended suggestion, for example by editing the model, as indicated at block 2514. Processing may then return to block 2506 as indicated by arrow 2516. If the model analyzer 103 determines that the acausal physical component model (whether the original model or the model as revised) is not non-linear, e.g., the model is linear or switched linear, the equation generator 106 may extract the state space parameters for the model 1000, as indicated by No arrow 2518 leading to block 2520. The extracted state space parameters may include the A, B, C, and D matrices. The equation generator 106 also may extract the state space equations for the model 1000, as indicated at block 2522 (FIG. 25B). If the acausal physical component model is switched linear, the model analyzer 103 may determine the number of modes of the model, as indicated at block 2524. Information associated with the extracted parameters and/or equations may be presented in one or more UIs by the UI engine.

Figure 34:
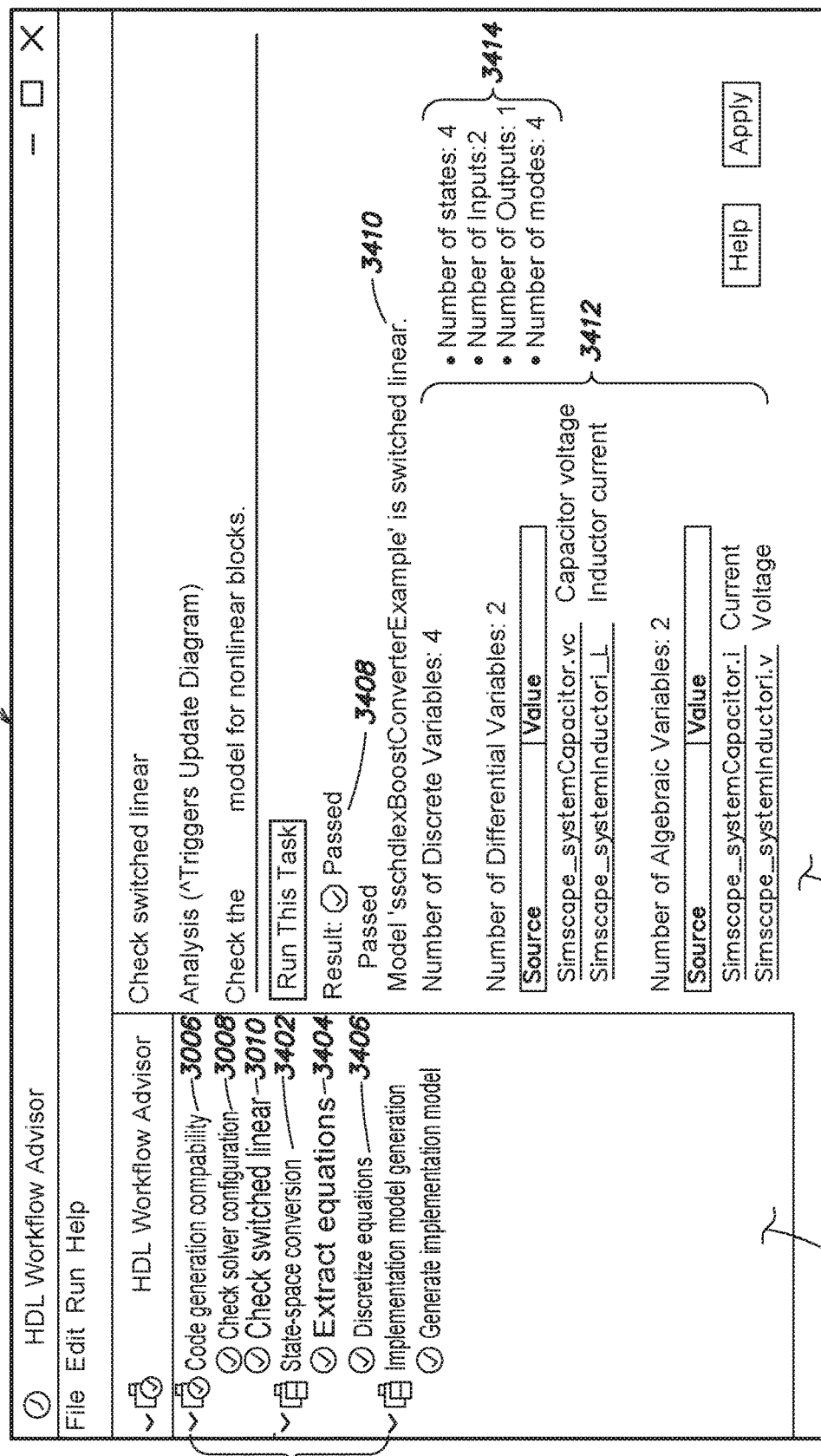
FIG. 34 is a schematic illustration of an example User Interface in accordance with one or more embodiments.

FIG. 34 is a schematic illustration of a User Interface (UI) 3400 presenting an example of information extracted from an acausal physical component model in accordance with one or more embodiments. The UI 3400, which may be similar to the UI 3000 (FIG. 30), may include the status pane 3002 providing the status of the process 3004. The process 3004 may further include a state-space conversion step 3402, which may include an extract equations sub-step 3404 and a discretize sub-step 3406. The UI 3400 may also include the information pane 3012 that may provide information associated with the current step of the process, e.g., the extract equations sub-step 3404. The information pane 3012 may include an indication of the result of the current step, e.g., passed, as indicated at 3408. The information pane 3012 also may include an indication of the linearity type of the acausal model, e.g., switched linear, as indicated 3410. The information pane 3012 may also present information regarding the variables included in the extracted state space equations, such as the number of discrete variables, the number of differential variables, and the number of algebraic variables, as indicated at 3412. The information associated with the extracted variables may include links, e.g., hyperlinks, that if selected may identify the corresponding elements of the acausal physical component model that computes the respective variables. The information pane 3012 may also present additional information regarding the acausal physical component model, such as one or more of the number of states, the number of inputs, the number of outputs, and the number of modes, as indicated at 3414.

Referring back to FIG. 25B, the discretizer 110 may discretize the extracted state-space equations, as indicated at block 2526. The equation generator 106 may also generate sparse matrices for the discretized state-space parameters, e.g., the Â, B̂, Ĉ, D̂ discretized matrices, as indicated at block 2528. Information associated with the discretization of the state space equations may be presented in one or more UIs by the UI engine.

Figure 35:
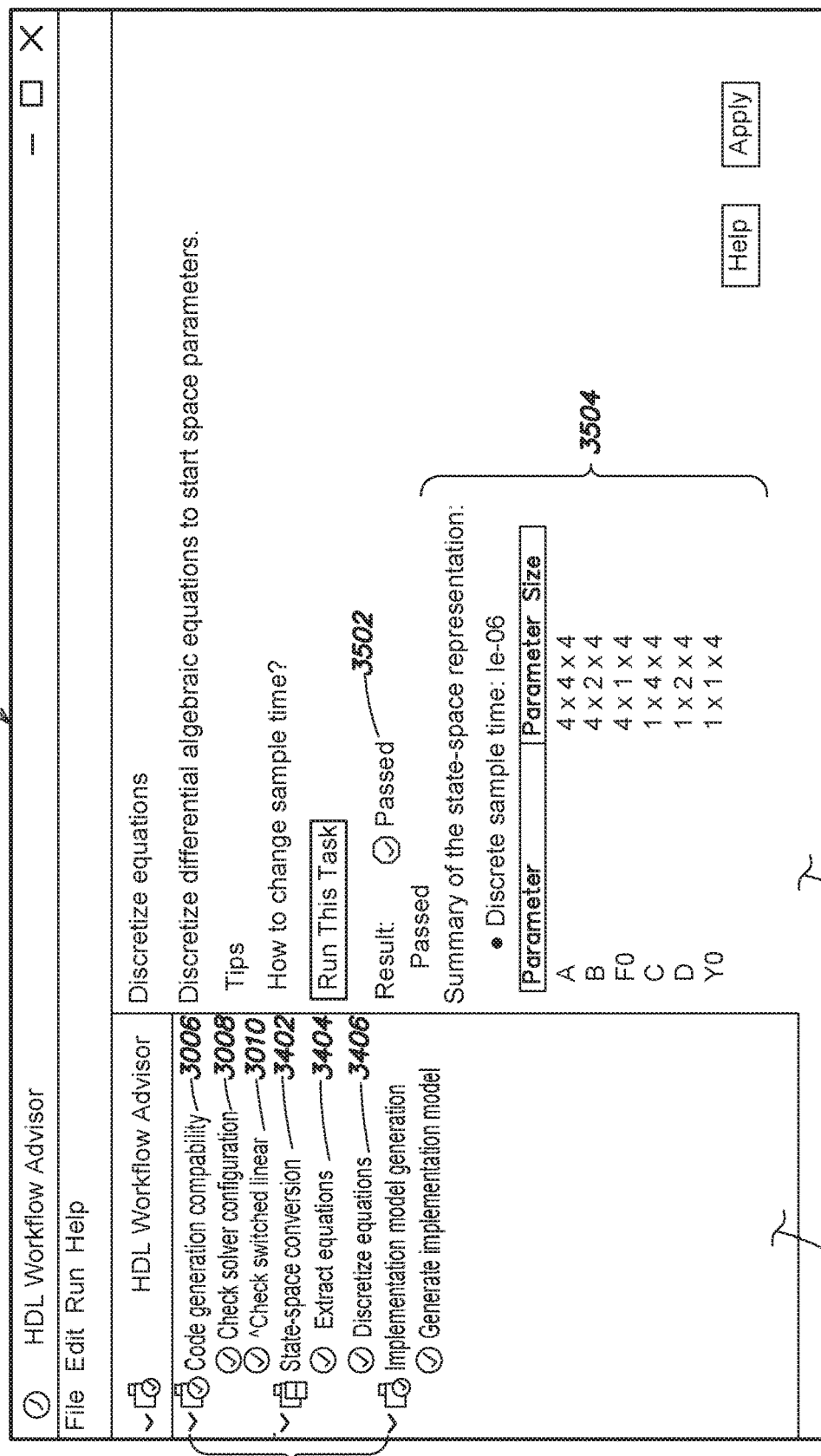
FIG. 35 is a schematic illustration of an example User Interface in accordance with one or more embodiments.

FIG. 35 is a schematic illustration of a User Interface (UI) 3500 presenting an example of information regarding the discretization of the state space equations in accordance with one or more embodiments. The UI 3500 may include the status pane 3002 providing the status of the process 3004 and the information pane 3012 that may provide information associated with the current step of the process, e.g., the discretize equations sub-step 3406. The information pane 3012 may include an indication of the result of the current step, e.g., passed, as indicated at 3502. The information pane 3012 also may include an area 3504 with information on the discretization. For example, the area 3504 may include the sample time used in the discretization and attributes of the discretized matrices, such as their size.

In some embodiments, the user may change the sample time and the discretizer 110 may rerun the discretization step.

In some embodiments, the sampling frequency of the target hardware, e.g., FPGA, achieved after generating HDL code for the causal simulation model and utilizing the HDL code to synthesize the FPGA should match the user desired sample time for running in the real-time system. Suppose, for example, that the user selects a sample time of 1e-6 (1 MHz) as indicated at 3504. The hardware synthesis tools 136 may synthesize the FPGA based on the causal model, and may report a maximum clock frequency, based on the base rate. Suppose the maximum sampling frequency is determined to be 0.5 MHz, which is less than specified value (1 MHz). In response, the user may select a new sample time, e.g., 5e-6 (0.5 MHz) and rerun the process from the discretization steps.

The simulation model generator 122 may generate a causal simulation model based on the acausal physical component model and the discretized state-space equations, as indicated at block 2530. The simulation model generator 122 may receive one or more options for use in generating the causal simulation model. In some embodiments, the options may be specified by the user, e.g., through one or more UIs.

Figure 36:
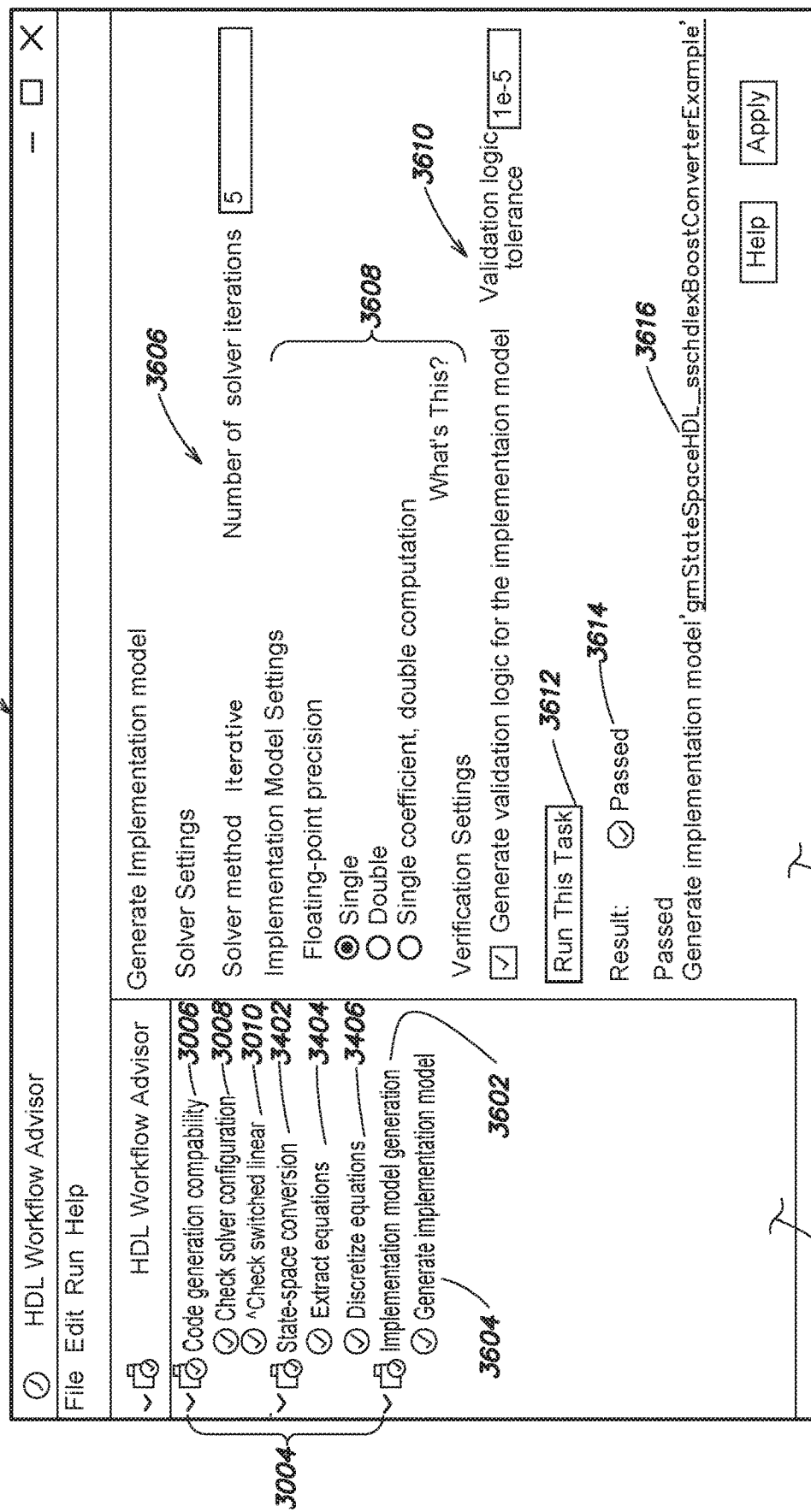
FIG. 36 is a schematic illustration of an example User Interface in accordance with one or more embodiments.

FIG. 36 is a schematic illustration of an example User Interface (UI) 3600 presenting information regarding the causal simulation model generation step in accordance with one or more embodiments. The UI 3600 may include the status pane 3002 providing the status of the process 3004, which may further include an implementation model generation step 3602 that has a generate implementation model sub-step 3604. The UI 3600 may include the information pane 3012 that may provide information associated with the current step of the process, e.g., the generate implementation model sub-step 3604. The information pane 3012 may include an area 3606 for setting solver settings, such as the solver method, e.g., iterative, and the number of iterations, e.g., five, for computing the mode associated with a next simulation time step of the causal simulation model.

The information pane 3012 may include another area 3608 through which options or settings for the causal simulation model may be specified, such as the data type implemented by the simulation model generator 122 in at least part of the causal simulation model. Data type refers to the way in which numbers are represented in computer memory. A data type may determine the amount of storage allocated to a number, the method used to encode the number's value as a pattern of binary digits, and the operations available for manipulating the data type. Different data types may have different precision, dynamic range, performance, and memory usage. A modeling environment may support multiple different data types. An exemplary, non-inclusive list of numeric data types includes: integers, floating point, fixed point, and Boolean. A floating point data type represents numeric values in scientific notation. The IEEE Standard for Floating Point Arithmetic 754 (IEEE 754) specifies standards for floating point computations, and defines several floating point formats commonly used in computing. These floating point formats include 64-bit double-precision binary floating point (double), 32-bit single-precision binary floating point (single), and 16-bit half-precision binary floating point (half), among others.

As indicated in area 3608, available data types may include single precision floating point, double precision floating point, and single precision coefficient, double precision computation. In response to selection of single precision floating point, the simulation model generator 122 may implement the discretized sparse matrices Â, B̂, Ĉ, D̂ and the computations and/or operations of the causal simulation model in single precision floating point. Single precision floating point may reduce the area of the target hardware 134 needed to implement the causal simulation model. However, it may not provide the precision or dynamic range to meet requirements specified for a causal simulation model implementation of the acausal physical component model. In response to selection of double precision floating point, the simulation model generator 122 may implement the discretized sparse matrices Â, B̂, Ĉ, D̂ and the computations and/or operations of the causal simulation model in double precision floating point. This may increase the precision and expand the dynamic range of the causal simulation model during simulation and in HDL code generated for the causal simulation model. However, double precision floating point may require more resources, e.g., block RAM, registers, DSP slices, etc., available on the target hardware 134. That is, the causal simulation model may not fit on the target hardware 134, if double precision floating point is used. In some embodiments, the simulation model generator 122 may implement a hybrid data type, indicated as single precision coefficient, double precision computation, which provides improved precision and dynamic range as compared to single precision floating type and also reduced resource consumption as compared to double precision floating type. In response to selection, e.g., by the user, of the single precision coefficient, double precision computation option, the simulation model generator 122 may implement the values of the sparse discretized matrices in single precision floating point data type and at least some of the computations performed by the causal simulation model, such as Dot Product operations, in double precision floating point data type. In some embodiments, options for additional or other data types may be provided, such as half.

The UI 3600 may include an additional area 3610 through which options or settings for validating the causal simulation model may be specified, such as whether to generate validation logic along with the causal simulation model and validation logic tolerance, e.g., 1e-5 ($1 \times 10^{-5}$), of outputs computed by the causal simulation model as compared with respective outputs computed by the acausal physical component model.

The UI 3600 may include a command button 3612 named 'Run This Task'. In response to selection of the command button 3612, e.g., by a user, the simulation model generator 122 may generate the causal simulation model. The information pane 3012 may include an indication of the result of the current step, e.g., passed, as indicated at 3614. The information pane 3012 also may include a link 3616 to the generated causal simulation model. In response to selection of the link 3616, the simulation environment 100 may open the causal simulation model and present it to the user, e.g., in a new window.

Figure 25C:
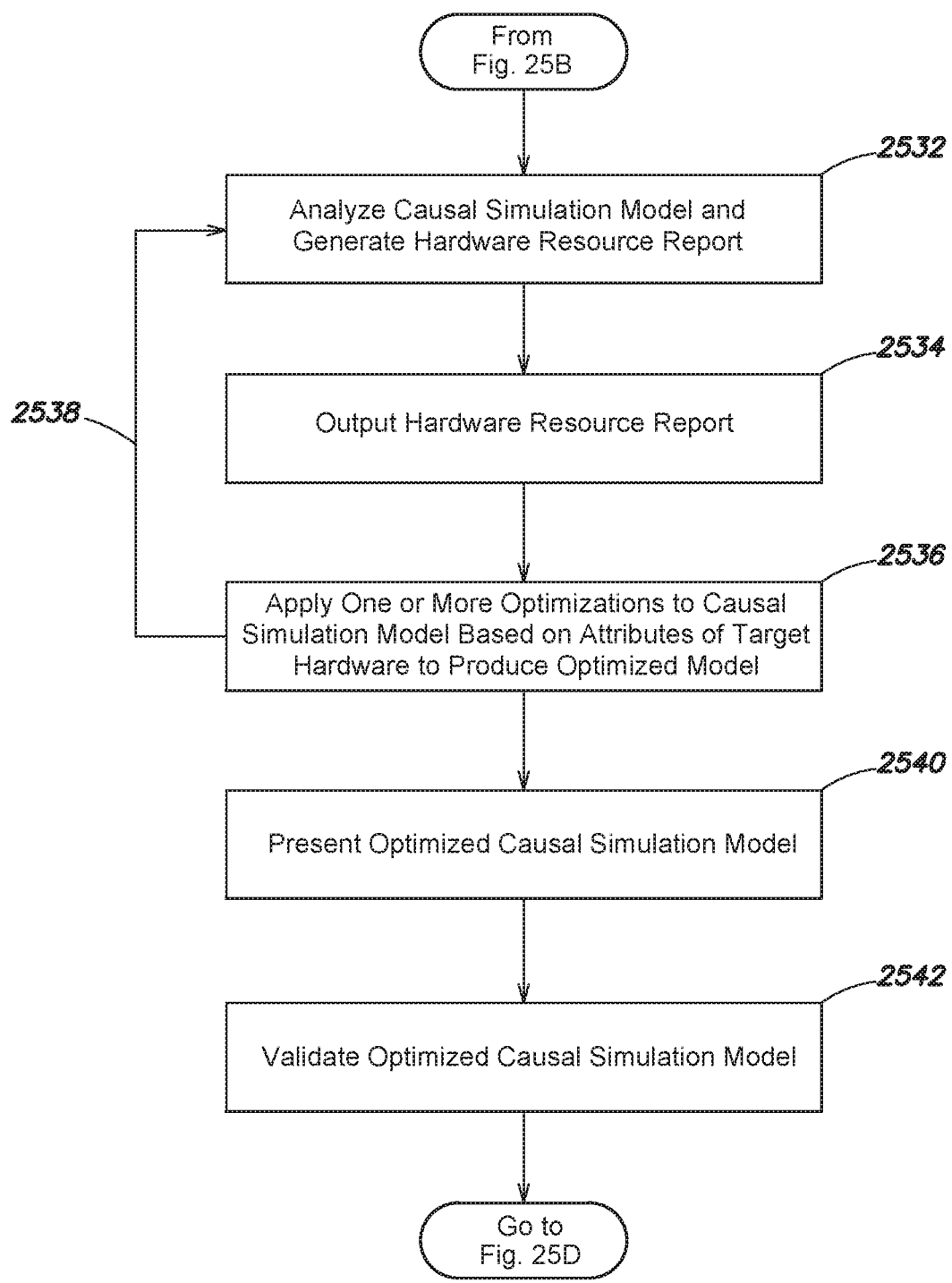

Referring to FIG. 25C, the code generator 130 may analyze the causal simulation model and generate one or more reports, such as one or more reports regarding the hardware resource utilization of the causal simulation model, as indicated at block 2532. The description of hardware resources utilized by the causal simulation model may be independent of any particular target hardware or it may describe the utilization of hardware resources in terms of the resources available at the target hardware 134. The code generator 130 may output the hardware optimization report, e.g., it may present the report on a display, save it to memory, and/or print the report, as indicated at block 2534.

Figure 38A:
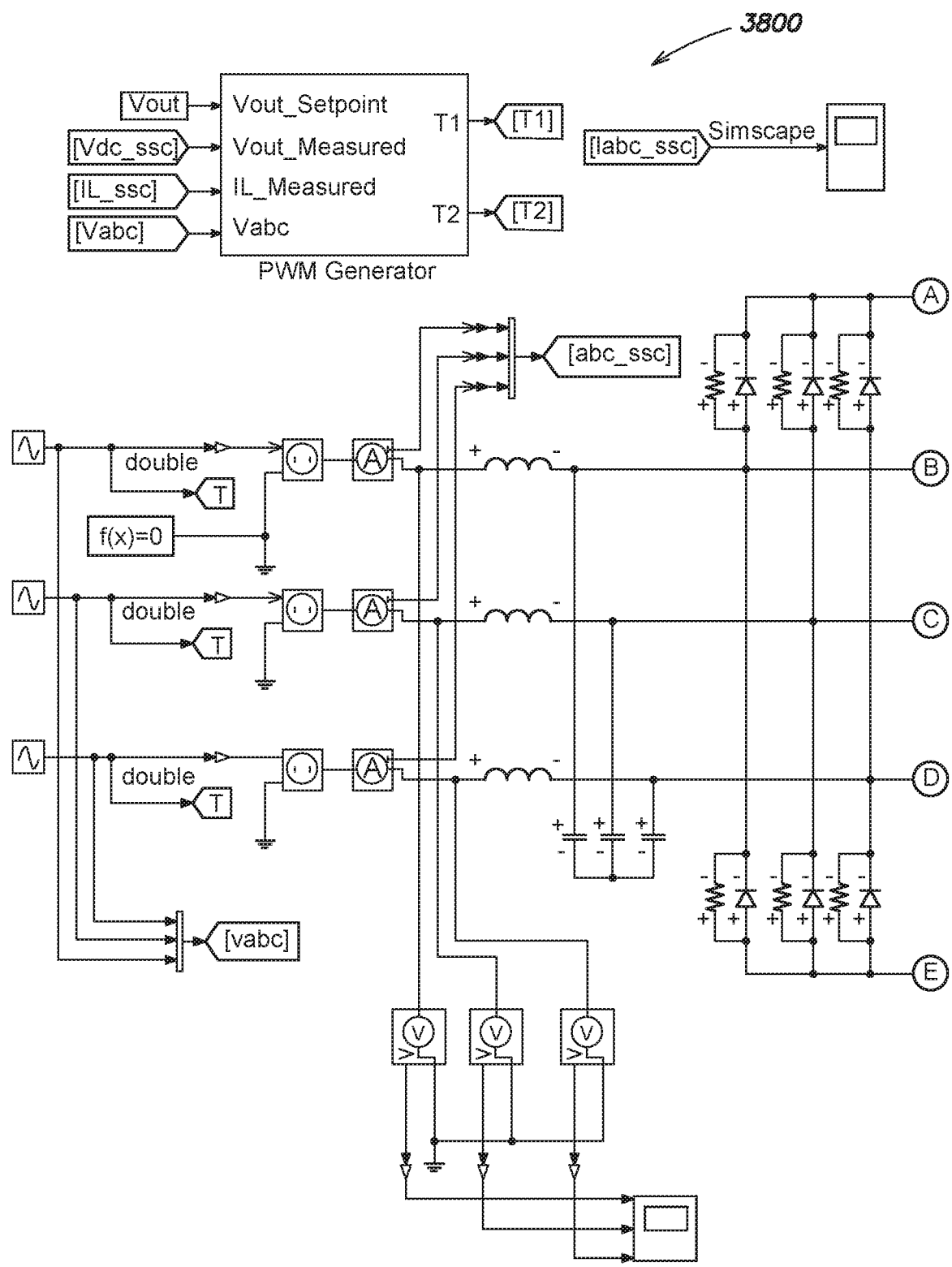
FIGS. 38A and 38B are partial views of a visual depiction of an example acausal physical component model in accordance with one or more embodiments.
Figure 38B:
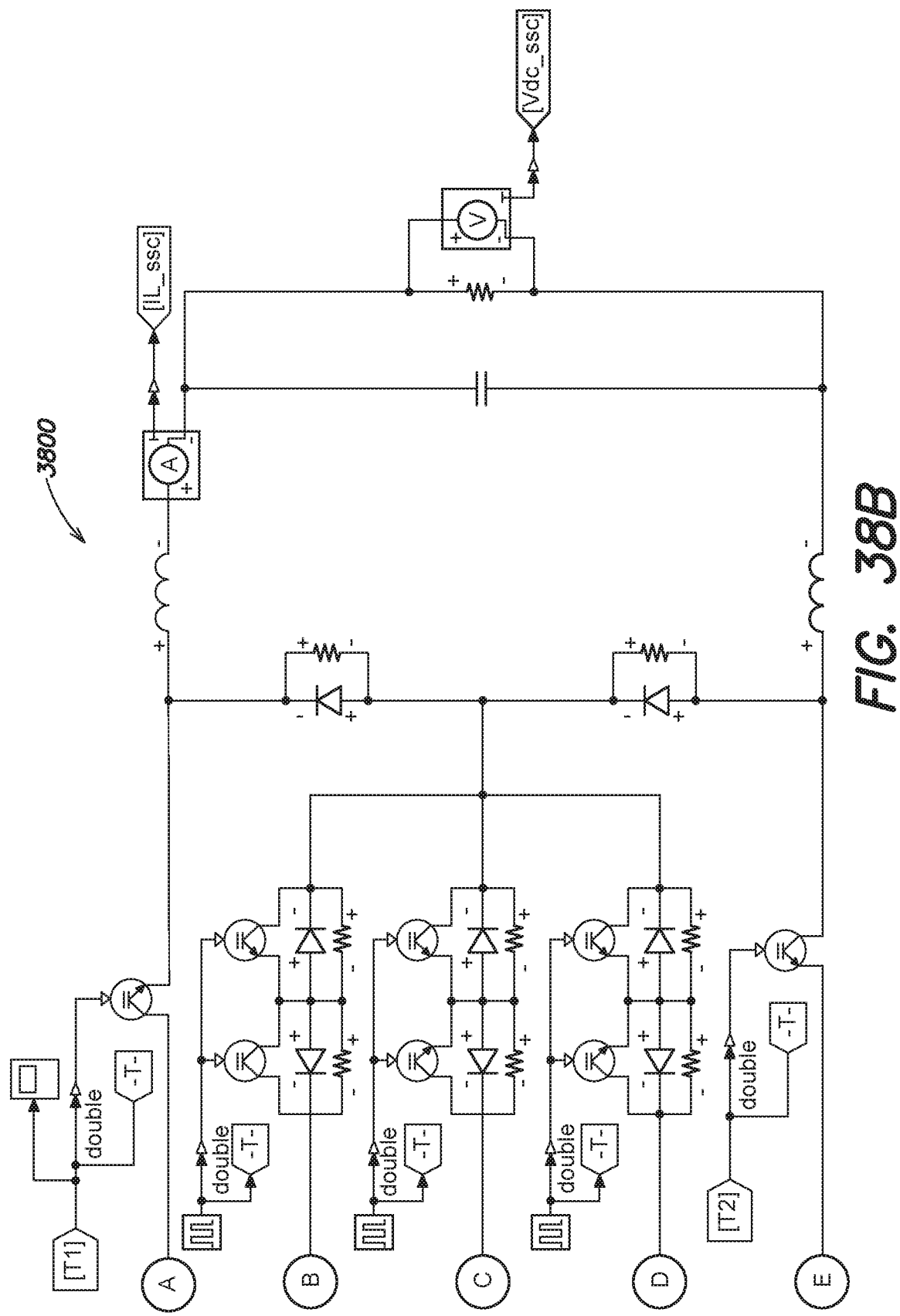

FIGS. 38A and 38B are partial views of a visual depiction of an example acausal physical component model 3800 in accordance with one or more embodiments. The acausal model 3800 simulates a 3-phase AC-DC buck-type converter with power factor correction. A 3-phase AC-DC buck converter, which may also be referred to as a Swiss Rectifier, may be used to charge the batteries of an electric vehicle. The converter may convert AC voltage from a power utility or grid into a DC bus voltage for charging the electric vehicle's batteries. The model 3800 may include a three-phase diode bridge shown in FIG. 38A along with two fast switches shown in FIG. 38B connected to T1 and T2 pulse modulator outputs on the DC side of the rectifier. The LCR circuit (capacitor, inductor, resistor) shown in FIG. 38B filters the high frequency current harmonics and provides stability to the grid currents. In addition, an injector network formed with three 4-quadrant switches shown in FIG. 38B in the middle of the circuit is run at twice the line frequency.

The acausal model 3800 of the Swiss Rectifier allows the currents in the fast switches (T1 and T2) to be formed proportionately to the 2-phase voltages involved in the formation of the diode bridge output voltage. The difference of the voltage is fed to the remaining $3^{rd}$ phase via the injection network. This ensures a sinusoidal current shape for all the 3 phases while assuring a constant system output voltage (at the DC side).

A causal simulation model may be generated for the acausal physical component model 3800 using the techniques described herein. The causal simulation model may be similar in form to the causal simulation model 1500 generated for the acausal model 1000. For example, it may include Mode Selection, State Update, State, and Output subsystems, Rate Transition blocks, Delay, e.g., Zero Order Hold blocks, an Inport block, and an Outport block.

Figure 39:
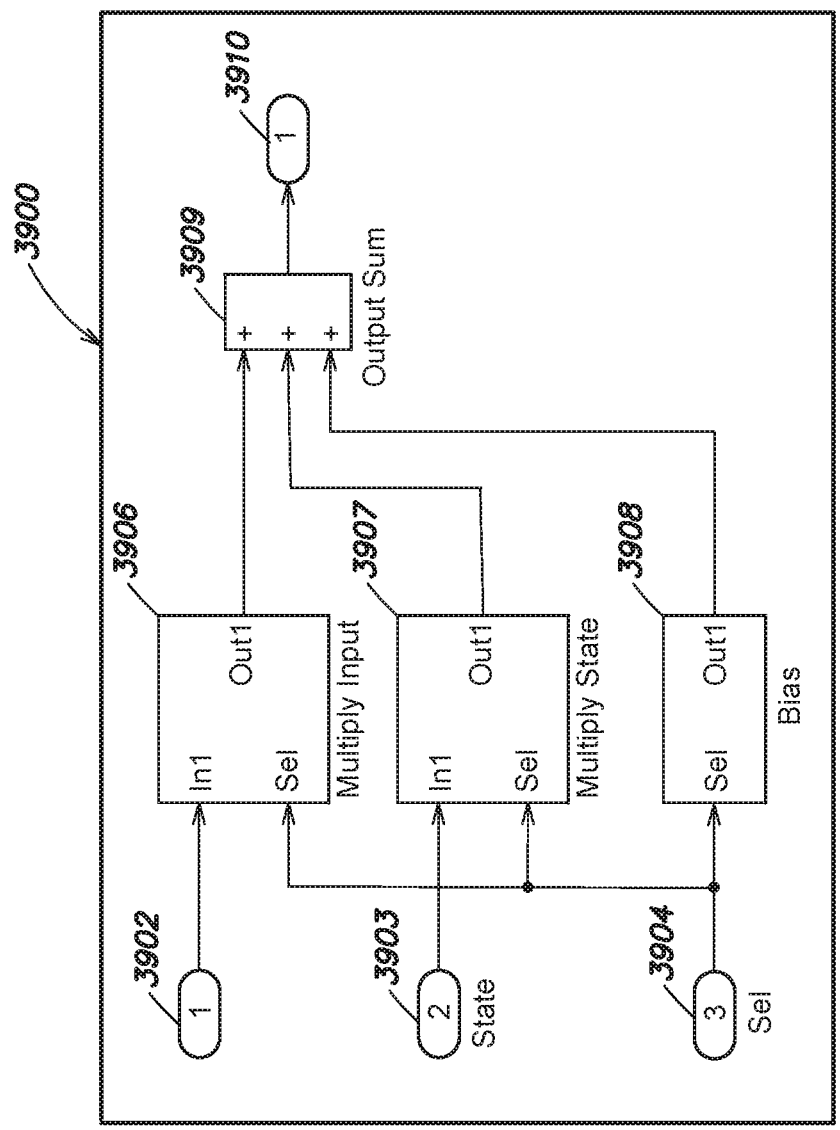
FIG. 39 is a schematic illustration of an example State Update subsystem of a causal simulation model generated for the acausal model of FIGS. 38A and 38B in accordance with one or more embodiments.

FIG. 39 is a schematic illustration of an example State Update subsystem 3900 of a causal simulation model generated for the acausal model 3800 in accordance with one or more embodiments. The State Update subsystem 3900 may include three Inport blocks 3902-3904, four subsystems 3906-3909 named Multiply Input, Multiply State, Bias, and Output Sum, and an Outport block 3910. One or more of the subsystems 3906-3909 may be implemented using Multipliers, Adders/Subtractors, Registers, RAMs, Multiplexers, Input/Output (I/O) bits, Static Shift Operators, and Dynamic Shift Operators.

The code generator 130 may analyze the causal simulation model generated for the acausal model 3800 and/or one or more portions thereof and generate one or more hardware utilization reports.

Figure 31:
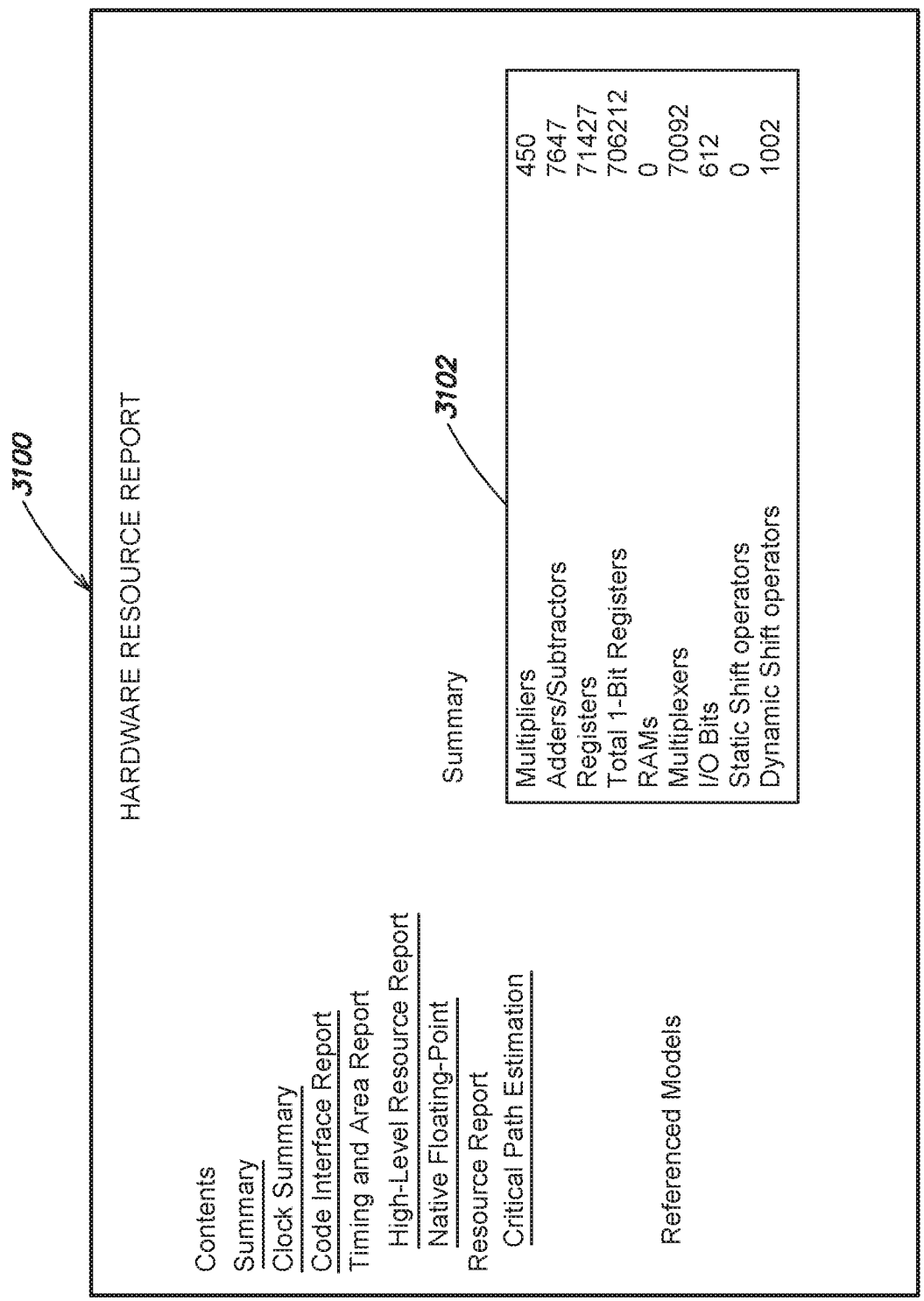
FIG. 31 is a schematic illustration of an example hardware utilization report in accordance with one or more embodiments.

FIG. 31 is a schematic illustration of an example hardware utilization report 3100 in accordance with one or more embodiments. The hardware utilization report 3100 may be for a causal model or portion thereof generated for the acausal physical component model 3800. The report 3100 may include a list as indicated at 3102 of the number of hardware resources by type of resource utilized when implementing the acausal physical component model 3800 in hardware, such as the target hardware 134. As illustrated in the list 3102, the types of hardware resources may include Multipliers, Adders/Subtractors, Registers, RAMs, Multiplexers, Input/Output (I/O) bits, Static Shift Operators, and Dynamic Shift Operators. Suppose the report 3100 indicates that number of Multipliers utilized, i.e., 450, exceeds the number of Multipliers available on the target hardware 134.

In order to reduce the number of Multipliers or other hardware resources utilized when implementing the acausal physical component model 3800 in hardware, the optimizer 112 may apply one or more optimizations, for example, to the corresponding causal simulation model, as indicated at block 2536 (FIG. 25C). As described, exemplary optimizations that may be applied by the optimizer 112 include resource sharing and streaming among others. The code generator 130 may analyze the causal simulation model as optimized and generate and output a hardware resource report, as indicated by arrow 2538, which loops back to block 2532.

Figure 32:
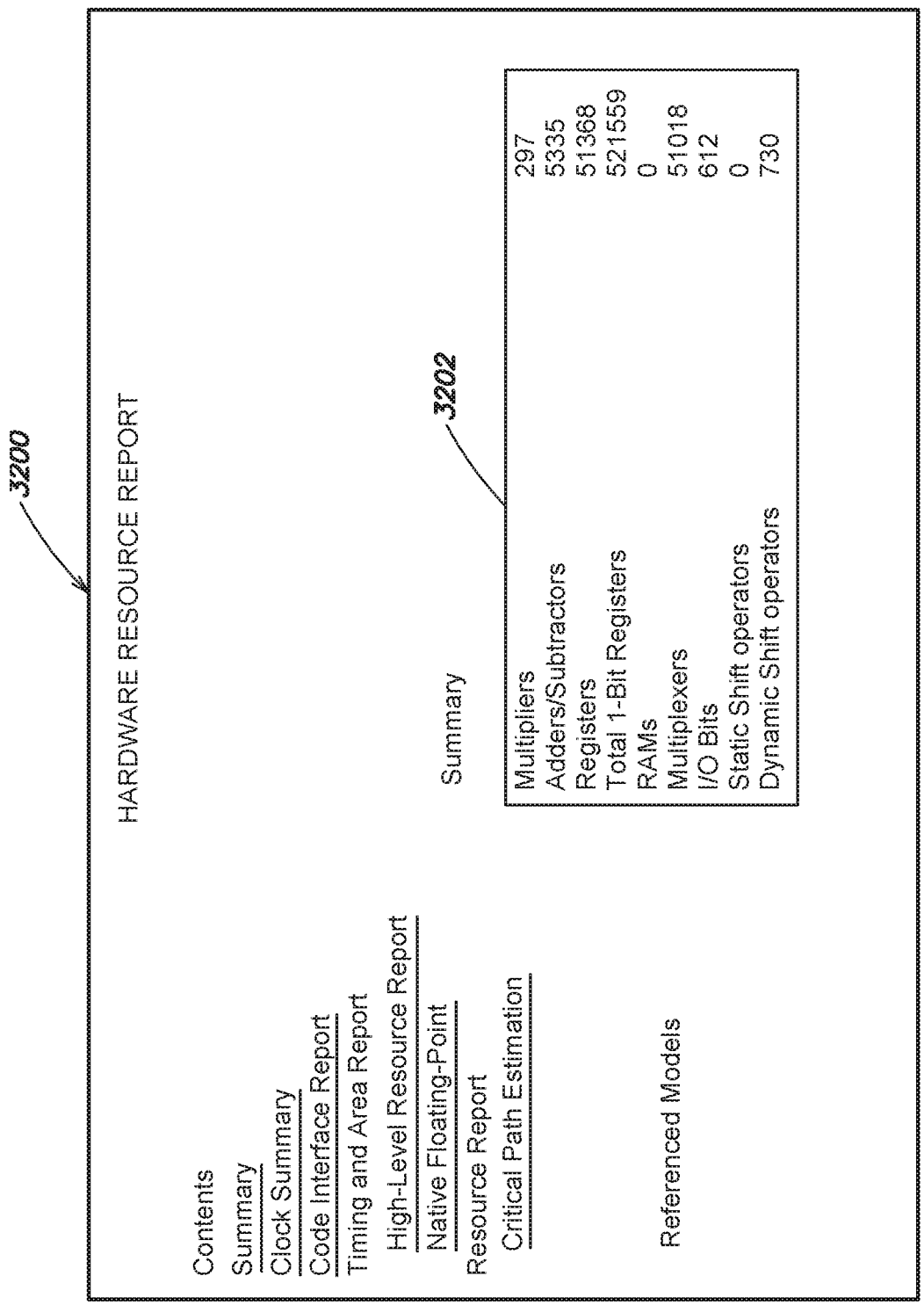
FIG. 32 is a schematic illustration of an example hardware utilization report in accordance with one or more embodiments.

FIG. 32 is a schematic illustration of an example hardware utilization report 3200 following the application of one or more optimizations, such as resource sharing, in accordance with one or more embodiments. The hardware utilization report 3200 may include a list as indicated at 3202 of the number of hardware resources by type of resource utilized following the optimization. As illustrated by a comparison of the reports 3100 and 3200 of FIGS. 31 and 32, application of a resource sharing optimization reduces the number of Multipliers from 450 to 297. The numbers of other types of hardware resources are also reduced. With the application of resource sharing, HDL code generated for the acausal physical component model 3800 may now fit on the target hardware 134.

The simulation model generator 122 may present the optimized causal simulation model, for example it may generate and present a visual display of the causal simulation model on the display device 118, as indicated at block 2540. If the validation option was selected, the simulation model generator 122 also may validate the optimized causal simulation model as compared to the acausal physical component model, as indicated at block 2542. For example, the code generator 130 may include a verification engine configured to verify the causal simulation model 1500 and/or generated HDL code, for example, using an HDL test bench, cosimulation, or SystemVerilog Direct Programming Interface (DPI) test bench. With HDL test bench, the verification engine may generate an HDL test bench by running the causal simulation model and capturing input data and expected output data for a Device Under Test (DUT). The actual DUT output is then compared with the expected output. With cosimulation, the verification engine may generate a cosimulation model having a model component for the simulation model and an HDL cosimulation block. The HDL cosimulation block may interface to a simulation tool, such as ModelSim HDL simulator from Mentor Graphics or Incisive HDL simulator from Cadence. With SystemVerilog DPI test bench, the verification engine may generate a DPI component for the simulation model, including a DUT, and data sources. The DPI component may then interface with a simulator, such as ModelSim (from Mentor Graphics), Incisive (from Cadence), or Vivado (from Xilinx).

Figure 33:
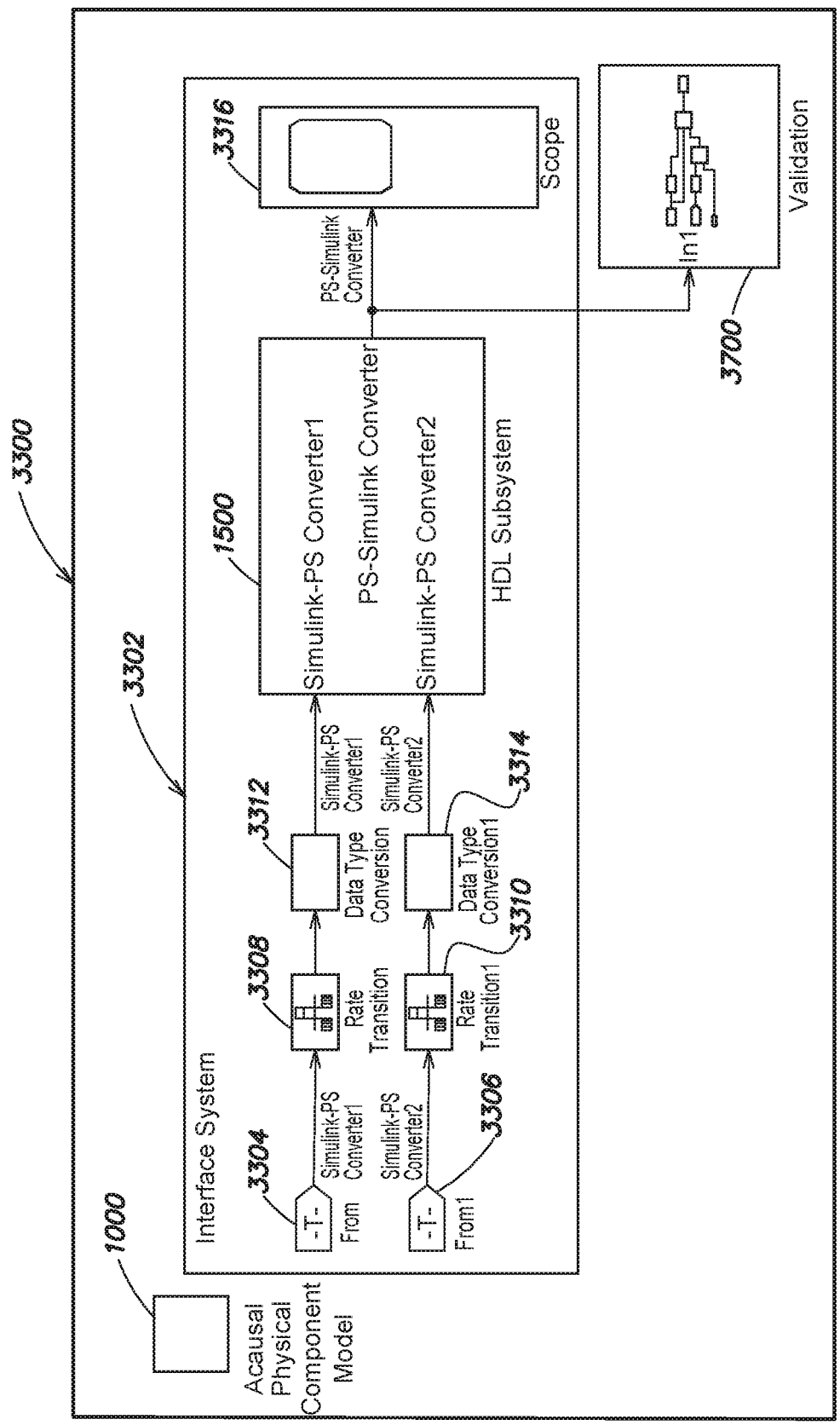
FIG. 33 is a schematic illustration of an example validation environment in accordance with one or more embodiments.

FIG. 33 is a schematic illustration of an example validation environment 3300 as generated by the simulation model generator 122 in accordance with one or more embodiments. The validation environment 3300 may include the acausal physical component model 1000, an interface system 3302, and a validation subsystem 3700. The acausal physical component model 1000 may be abstractly represented in the validation environment 3300 as a subsystem or sub-model element. The interface system 3302 may include two From blocks 3304 and 3306, two Rate Transition blocks 3308 and 3310, two Data Type Conversion blocks 3312 and 3314, the causal simulation model 1500 generated for the acausal physical component model 1000, and a Scope block 3316. The causal simulation model 1500 may be abstractly represented in the interface system 3302 as a subsystem or sub-model named 'HDL Subsystem'. The two From blocks 3304 and 3306 may access the values computed by the Pulse Generator block 1002 and the Constant block 1004 of the acausal physical component model 1000. The two Rate Transition blocks 3308 and 3310 and the two Data Type Conversion blocks process those values, convert them to signals compatible with the causal simulation model 1500 and provide the signals as inputs to the causal simulation model 1500. The output signal computed by the causal simulation model 1500 may be provided to the Scope block 3316 and to the validation subsystem 3700.

The HDL subsystem 1500 may be running on the target hardware 134, e.g., an FPGA, in HIL testing, or it may be targeted for execution by a CPU of a workstation.

Figure 37:
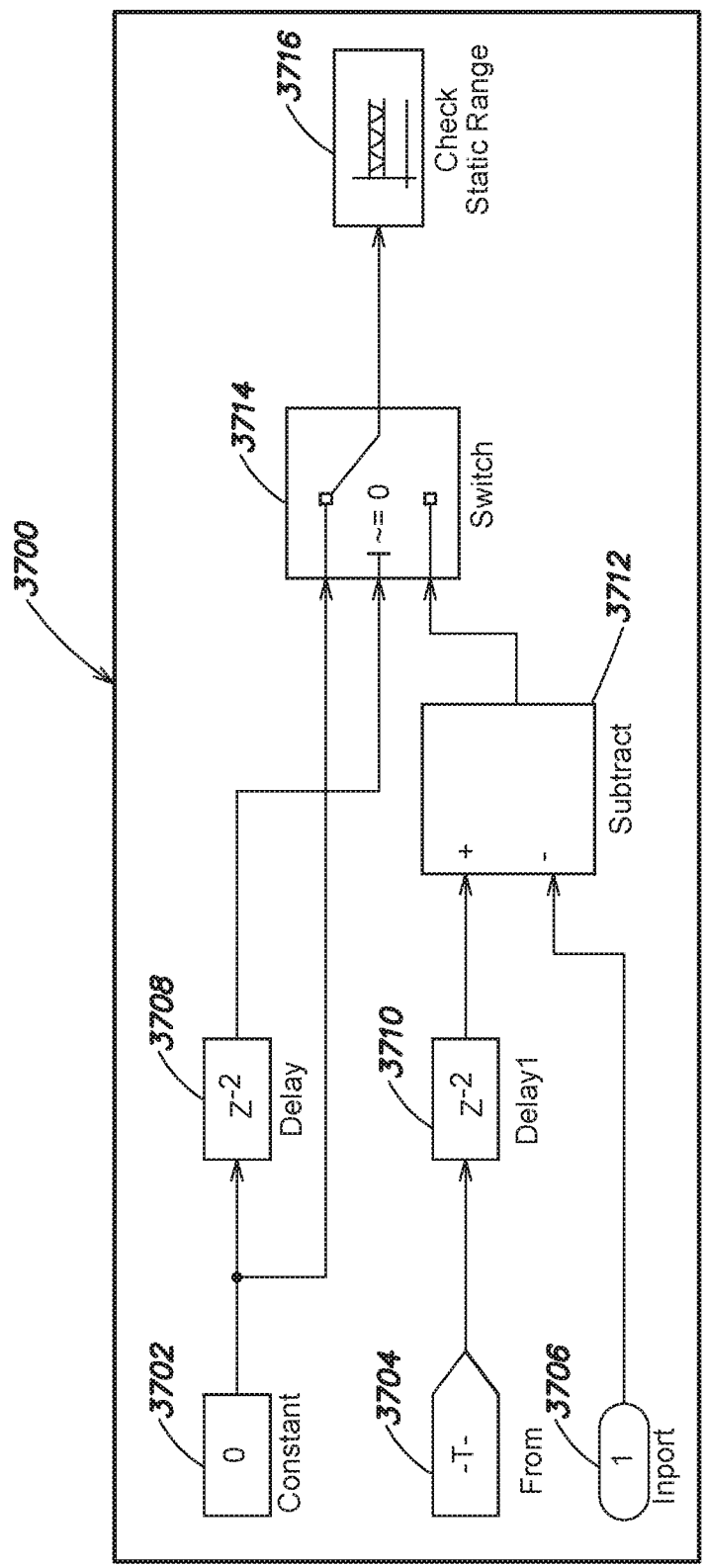
FIG. 37 is a schematic illustration of a validation subsystem in accordance with one or more embodiments.

FIG. 37 is a schematic illustration of the validation subsystem 3700 in accordance with one or more embodiments. The validation subsystem 3700 may include a Constant block 3702, a From block 3704, an Inport block 3706, two Delay blocks 3708 and 3710, a Subtract block 3712, a Switch block 3714, and a Check Static Range block 3716. The From block 3704 may access the value computed by the Voltage Sensor element 1022 of the acausal physical component model 1000. The Inport 3706 may access the output signal computed by the causal simulation model 1500. These two values may be subtracted from each other and the result provided via the Switch block 3714 to the Check Static Range block 3716. If the causal simulation model 1500 computes the same output value as the acausal physical component model, then the output of the Subtract block 3712 will be zero. The Check Static Range block 3716 may perform an assertion operation on the output of the Subtract block 3712. For example, the Check Static Range block 3716 may check whether the output of the Subtract block 3712, which should be zero, falls within a range defined by an upper bound and a lower bound at each time step during execution of the validation environment 3300. If the verification condition applied by the Check Static Range block 3716 is true, the block 3716 may do nothing. If the verification condition is false, e.g., the output of the Subtract block 3712 is outside of the specified range, the block 3716 may halt the simulation of the validation environment 3300 and may display information, such as one or more error or warning messages. The user may set the upper and lower bounds of the Check Static Range block 3716 to define a desired tolerance.

The zero Constant block 3702 and the Switch block 3714 may disable mismatch checking for the initial cycles. For example, conversion of an acausal model to a causal model for which HDL code may be generated by add latency, such as a latency of 2 in the validation subsystem 3700. The simulation values for the first two cycles of the causal model are no good thus should be ignored, as accomplished by the zero Constant block 3702, the Delay block 3708, and the Switch block 3714. The initial condition of the delay block 3708 is 1 and the initial condition of the delay block 3710 is 0.

Figure 25D:
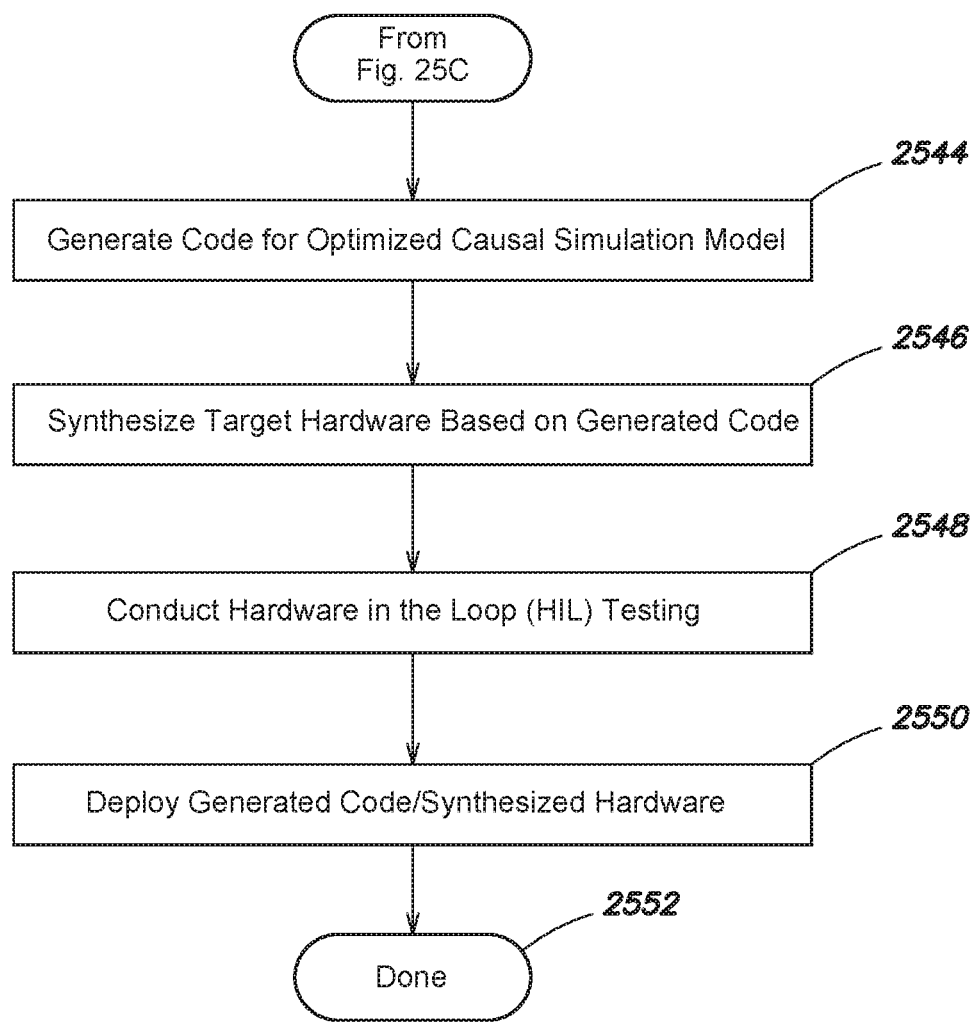

Referring to FIG. 25D, if the validation environment 3300 demonstrates that the causal simulation model 1500 meets the requirements, the code generator 130 may generate code, such as HDL code, for the causal simulation model 1500, as indicated at block 2544. The hardware synthesis tools 136 may synthesize the target hardware 134 based on the generated HDL code, as indicated at block 2546. In some embodiments, the generated HDL code may be used in Hardware in the Loop (HIL) testing, as indicated at block 2548. The generated HDL code may be deployed, for example in production hardware elements, such as embedded or other systems, as indicated at block 2550. Processing may then be complete, as indicated by Done block 2552.

Data Processing Device

Figure 21:
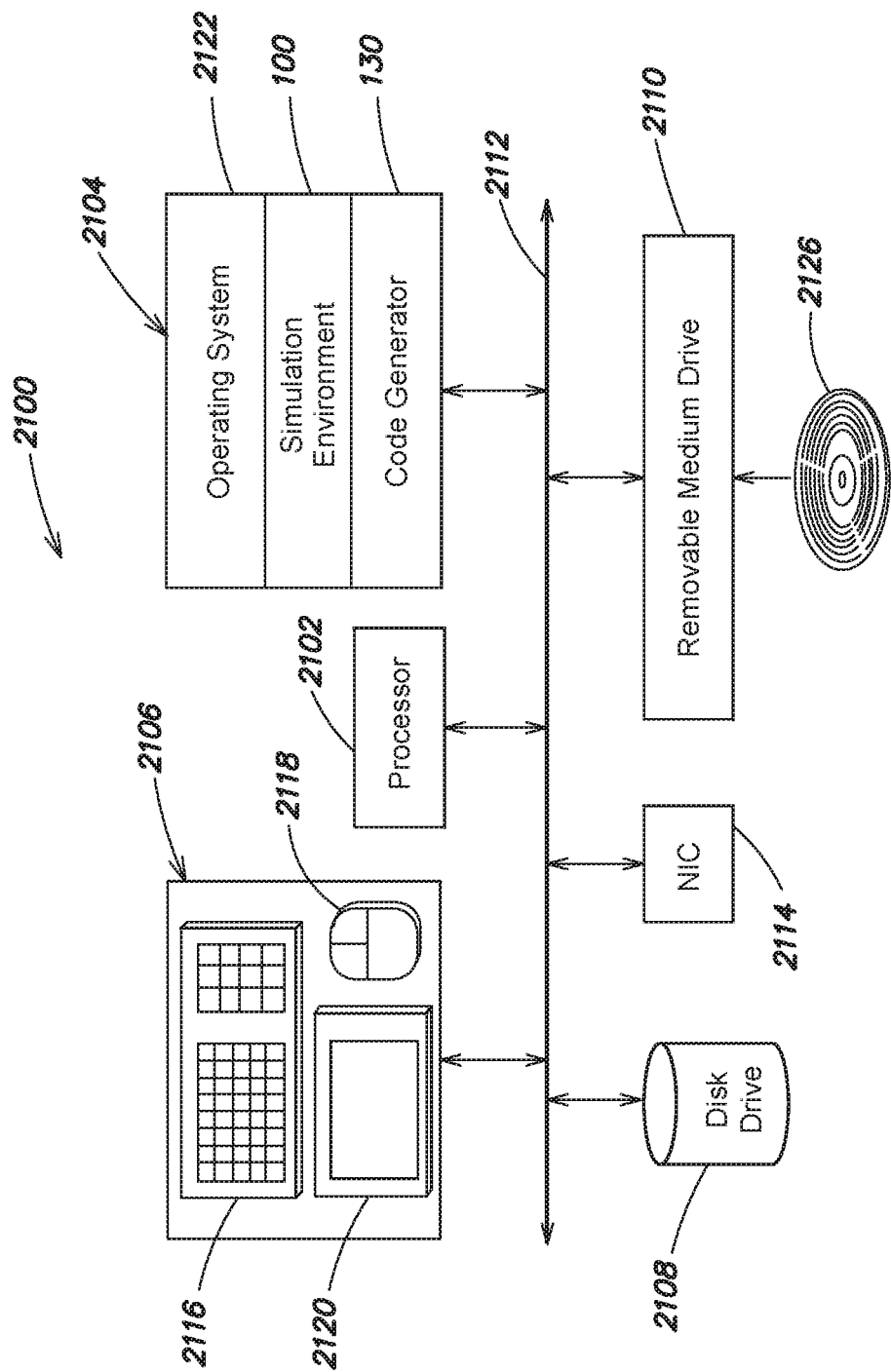
FIG. 21 is a schematic illustration of a computer or data processing system for implementing one or more embodiments of the present disclosure.

FIG. 21 is a schematic illustration of a computer or data processing system 2100 for implementing one or more embodiments of the present disclosure. The computer system 2100 may include one or more processing elements, such as a processor 2102, a main memory 2104, user input/output (I/O) 2106, a persistent data storage unit, such as a disk drive 2108, and a removable medium drive 2110 that are interconnected by a system bus 2112. The computer system 2100 may also include a communication unit, such as a network interface card (NIC) 2114. The user I/O 2106 may include a keyboard 2116, a pointing device, such as a mouse 2118, and a display 2120. Other user I/O 2106 components include voice or speech command systems, touchpads and touchscreens, printers, projectors, etc. Exemplary processors include single or multi-core Central Processing Units (CPUs), Graphics Processing Units (GPUs), Digital Signal Processors (DSPs), Field Programmable Gate Arrays (FPGAs), Application Specific Integrated Circuits (ASICs), microprocessors, microcontrollers, etc.

The main memory 2104, which may be a Random Access Memory (RAM), may store a plurality of program libraries or modules, such as an operating system 2122, and one or more application programs that interface to the operating system 2122, such as the simulation environment 100 and/or the code generator 130.

The removable medium drive 2110 may accept and read a computer readable medium 2126, such as a CD, DVD, floppy disk, solid state drive, tape, flash memory or other non-transitory medium. The removable medium drive 2110 may also write to the computer readable medium 2126.

Suitable computer systems include personal computers (PCs), workstations, servers, laptops, tablets, palm computers, smart phones, electronic readers, and other portable computing devices, etc. Nonetheless, those skilled in the art will understand that the computer system 2100 of FIG. 21 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the simulation environment 100 may be hosted on one or more cloud servers or devices, and accessed by remote clients through a web portal or an application hosting system.

Suitable operating systems 2122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2122 may provide services or functions for applications or modules, such as allocating memory, organizing data objects or files according to a file system, prioritizing requests, managing I/O, etc. The operating system 2122 may run on a virtual machine, which may be provided by the data processing system 2100.

As indicated above, a user, such as an engineer, scientist, programmer, developer, etc., may utilize one or more input devices, such as the keyboard 2116, the mouse 2118, and the display 2120 to operate the simulation environment 100 to, e.g., open, construct, and revise one or more acausal and/or causal simulation models, and may operate the code generator 130 to generate code, such as HDL code, for the simulation models. As discussed, the simulation models may be computational and may be executable, e.g., by the simulation environment 100. In particular, the models may be simulated or run. In particular, causal simulation models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

Distributed Environment

Figure 22:
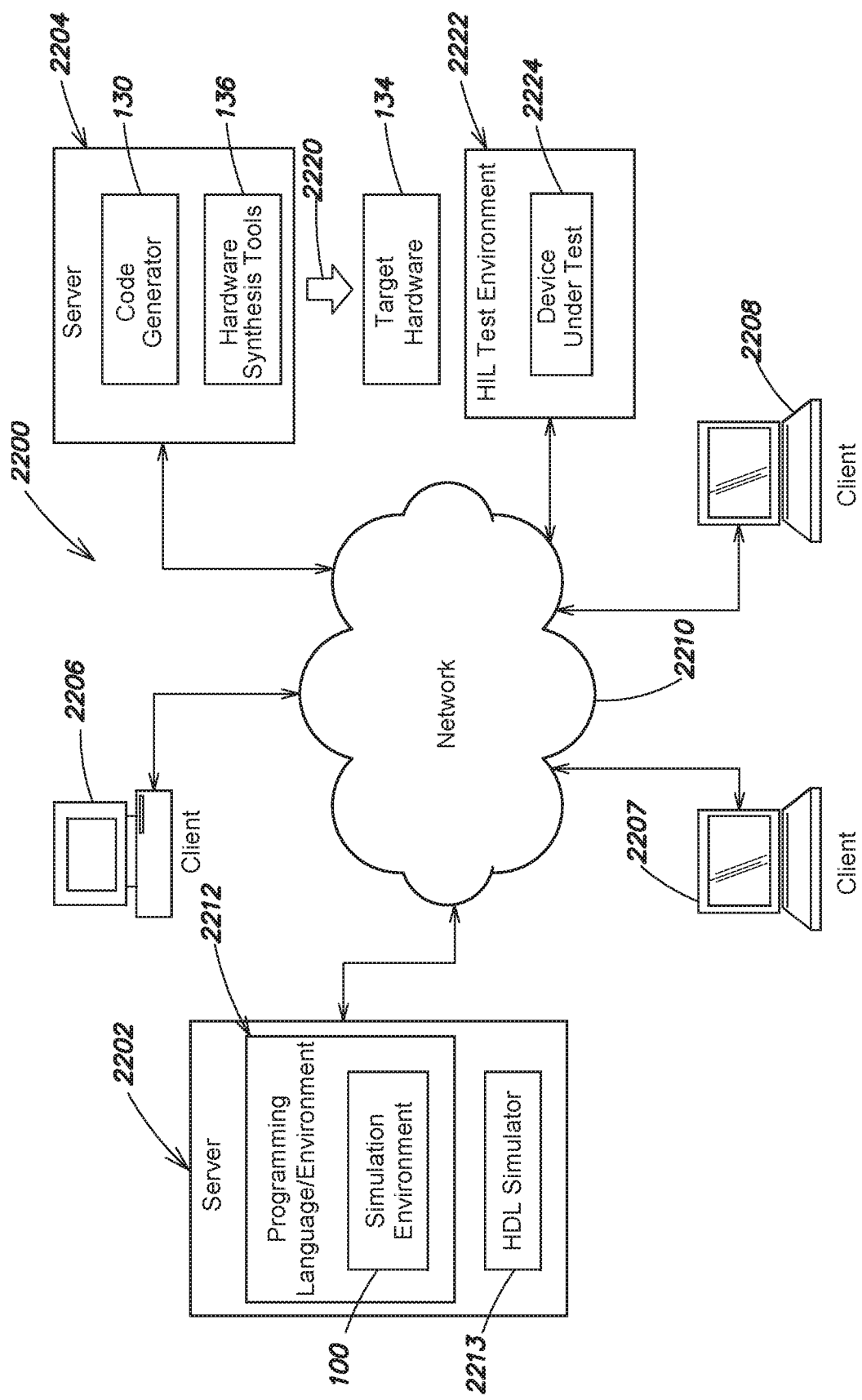
FIG. 22 is a schematic diagram of a distributed computing environment in which systems and methods described herein may be implemented.

FIG. 22 is a schematic diagram of a distributed computing environment 2200 in which systems and methods described herein may be implemented. The environment 2200 may include client and server devices, such as two servers 2202 and 2204, and three clients 2206-2208, interconnected by one or more networks, such as network 2210. The servers 2202 and 2204 may include applications or processes accessible by the clients 2206-2208. For example, the server 2202 may run a programming language/environment 2212 and an HDL simulator 2213. The simulation environment 100 may run within the programming language/environment 2212. The server 2204 may run the code generator 130 and the hardware synthesis tools 136. The environment 2200 may include the target hardware 134 and the hardware synthesis tools 136 may utilize code generated by the code generator 130 to deploy a causal simulation model at the target hardware 134 as illustrated by arrow 2220. The devices of the environment 2200 may interconnect via wired connections, wireless connections, or a combination of wired and wireless connections.

The distributed environment 2200 may include a Hardware-in-the-Loop (HIL) test environment 2222, which may include a device under test (DUT) 2224.

The servers 2202 and 2204 may include one or more devices capable of receiving, generating, storing, processing, executing, and/or providing information. For example, the servers 2202 and 2204 may include a computing device, such as a server, a desktop computer, a laptop computer, a tablet computer, a handheld computer, or a similar device.

The clients 2206-2208 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2206-2208 may download data and/or code from the servers 2202 and 2204 via the network 2210. In some implementations, the clients 2206-2208 may be desktop computers, workstations, laptop computers, tablet computers, handheld computers, mobile phones (e.g., smart phones, radiotelephones, etc.), electronic readers, or similar devices. In some implementations, the clients 2206-2208 may receive information from and/or transmit information to the servers 2202 and 2204.

The network 2210 may include one or more wired and/or wireless networks. For example, the network 2210 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 22 is provided as an example. In some embodiments, there may be additional devices and/or networks, fewer devices and/or networks, different devices and/or networks, or differently arranged devices and/or networks than those shown in FIG. 22. Furthermore, two or more devices shown in FIG. 22 may be implemented within a single device, or a single device shown in FIG. 22 may be implemented as multiple, distributed devices. Additionally, one or more of the devices of the distributed computing environment 2200 may perform one or more functions described as being performed by another one or more devices of the environment 2200.

For purposes of explanation, portions of the present disclosure makes reference to model elements, such as blocks, of the Simscape and Simulink modeling environments. This is not intended as limiting and it should be understood that the present disclosure may be used with other modeling environments supporting other elements.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2100. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A computer-implemented method comprising:
   for an acausal simulation model of a physical system, generating a set of equations for the acausal simulation model, the set of equations including differential equations, algebraic equations, differential variables, and algebraic variables;
   constructing an arrangement of the algebraic equations and the algebraic variables;
   decomposing the arrangement of the algebraic equations and the algebraic variables to produce a permuted version of the arrangement of the algebraic equations and the algebraic variables;
   partitioning, by one or more processors, the algebraic equations into a plurality of partitions based on the permuted version of the arrangement of the algebraic equations and the algebraic variables;
   determining, by the one or more processors, for the plurality of partitions, dependencies among the algebraic variables;
   generating, by the one or more processors, an in-memory intermediate representation of a causal simulation model for the acausal simulation model, wherein the causal simulation model includes model elements implementing functionality of the set of equations and connections among the model elements based on the dependencies among the algebraic variables, and the model elements include at least one of an integrator model element, an implicit equation model element, or an explicit function model element;
   discretizing the causal simulation model using one or more solvers; and
   either
      executing the causal simulation model; or
      generating code for the causal simulation model.

2. The computer-implemented method of claim 1 wherein the discretizing includes applying a local choice of the one or more solvers to a portion of the causal simulation model.

3. The computer-implemented method of claim 2 wherein the local choice is an explicit numerical approach so as to avoid an algebraic loop were an implicit numerical approach otherwise used at the portion of the causal simulation model.

4. The computer-implemented method of claim 1 wherein the algebraic equations include an implicit equation and an explicit equation, the method further comprising:
   utilizing the integrator model element to implement at least one of the differential equations;
   utilizing the implicit equation model element to implement the implicit equation; and
   utilizing the explicit function model element to implement the explicit equation.

5. The computer-implemented method of claim 1 wherein the arrangement of the algebraic equations and the algebraic variables is a matrix and the permuted version of the arrangement is a permuted matrix.

6. The computer-implemented method of claim 1 further comprising:
   presenting on a display a visual depiction of the causal simulation model.

7. The computer-implemented method of claim 1 wherein the plurality of partitions are executed in one or more of a cascading manner or a parallel manner.

8. The computer-implemented method of claim 1 further comprising:
   receiving a selection from a user of the one or more solvers used in the discretizing the causal simulation model.

9. The computer-implemented method of claim 8 wherein the one or more solvers includes an explicit solver, the method further comprising:
   estimating a stability associated with the explicit solver, and
   presenting the stability to the user.

10. The computer-implemented method of claim 1 wherein the acausal simulation model includes one or more custom-defined blocks, wherein the one or more custom-defined blocks are user authored with an acausal programming language.

11. The computer-implemented method of claim 5 wherein the decomposing utilizes the fine Dulmage-Mendelsohn decomposition and the permuted matrix is upper block-triangular.

12. The computer-implemented method of claim 1 wherein the discretizing introduces one or more algebraic loops in the causal simulation model, the method further comprising:
eliminating at least one of the one or more algebraic loops by at least one of:
introducing a non-direct-feedthrough block;
introducing a delay or a filter to break the at least one of the one or more algebraic loops;
merging one or more blocks included in the at least one of the one or more algebraic loops; or
utilizing an explicit solver for one or more blocks included in the at least one of the one or more algebraic loops.

13. The computer-implemented method of claim 5 further comprising:
computing a Jacobian of the matrix wherein the decomposing utilizes the Jacobian of the matrix.

14. The computer-implemented method of claim 1 further comprising:
optimizing the causal simulation model, wherein the optimizing includes one or more of:
merging two or more of the plurality of partitions;
adding one or more delays to the causal simulation model; or
using an implicit solver as the one or more solvers.

15. A computer-implemented method comprising:
for an acausal simulation model of a physical system, extracting a set of state-space equations for the acausal simulation model, the set of state-space equations including differential equations, algebraic equations, differential variables, and algebraic variables;
discretizing, by one or more processors, the set of state-space equations to produce discretized state-space parameters;
generating sparse versions of the discretized state-space parameters;
generating, by the one or more processors, an in-memory intermediate representation (IR) of a causal simulation model for the acausal simulation model based on the set of state-space equations following the discretizing, wherein the causal simulation model includes the sparse versions of the discretized state-space parameters; and
generating, by the one or more processors, code based on the in-memory IR of the causal simulation model, wherein the code is capable of deployment on a target hardware device, wherein the generating includes
accessing attributes of resources of a product family that includes the target hardware device, and
utilizing the attributes as one or more thresholds or one or more constraints on resource utilization of the code.

16. The computer-implemented method of claim 15 further comprising arranging the sparse versions of the discretized state-space parameters as sparse matrices.

17. The computer-implemented method of claim 15 wherein the attributes include at least one of:
a number of DSP slices,
a number of block memory,
a size of registers, or
a size of block memory.

18. The computer-implemented method of claim 15 wherein the acausal simulation model is switched-linear, the method further comprising:
determining a number of modes of the switched-linear acausal simulation model; and
including logic in the in-memory IR of the causal simulation model that selects the modes.

19. The computer-implemented method of claim 15 wherein the acausal simulation model is non-linear, the method further comprising:
analyzing the non-linear acausal simulation model; and
identifying, based on the analyzing, one or more changes that convert the non-linear acausal simulation to either a linear acausal simulation model or to a switched-linear acausal simulation model.

20. The computer-implemented method of claim 19 further comprising:
presenting the one or more changes to a user; and
receiving one or more edits to the non-linear acausal simulation model, wherein the one or more edits convert the non-linear acausal simulation to either the linear acausal simulation model or to the switched-linear acausal simulation model.

21. The computer-implemented method of claim 15 further comprising:
applying, by the one or more processors, one or more optimizations to the in-memory IR of the causal simulation model, wherein the one or more optimizations reduce an area consumption when the code is deployed on the target hardware device.

22. The computer-implemented method of claim 21 wherein the one or more optimizations are at least one of resource sharing or streaming.

23. The computer-implemented method of claim 15 wherein elements of the sparse versions of the discretized state-space parameters are in a first floating point data type and operations for the set of state-space equations following the discretizing utilize floating point computations different from the first floating point data type.

24. The computer-implemented method of claim 15 further comprising:
presenting on a display a visual depiction of the causal simulation model, wherein the visual depiction of the causal simulation model includes model elements and a plurality of the model elements perform operations utilizing a Native Floating Point implementation.

25. The computer-implemented method of claim 15 wherein the discretizing the set of state-space equations to produce the discretized state-space parameters uses a Backward Euler numerical approach.

26. One or more non-transitory computer-readable media comprising program instructions for execution by one or more processors, the program instructions instructing the one or more processors to:
for an acausal simulation model of a physical system, generate a set of equations for the acausal simulation model, the set of equations including differential equations, algebraic equations, differential variables, and algebraic variables;
construct an arrangement of the algebraic equations and the algebraic variables;

decompose the arrangement of the algebraic equations and the algebraic variables to produce a permuted version of the arrangement of the algebraic equations and the algebraic variables;

partition the algebraic equations into a plurality of partitions based on the permuted version of the arrangement of the algebraic equations and the algebraic variables;

determine for the plurality of partitions, dependencies among the algebraic variables;

generate an in-memory intermediate representation of a causal simulation model for the acausal simulation model, wherein the causal simulation model includes model elements implementing functionality of the set of equations and connections among the model elements based on the dependencies among the algebraic variables, and the model elements include at least one of an integrator model element, an implicit equation model element, or an explicit function model element;

discretize the causal simulation model using one or more solvers; and either
execute the causal simulation model; or
generate code for the causal simulation model.

27. The one or more non-transitory computer-readable media of claim 26 wherein the discretizing includes applying a local choice of the one or more solvers to a portion of the causal simulation model.

28. The one or more non-transitory computer-readable media of claim 26 wherein the algebraic equations include an implicit equation and an explicit equation, the media further comprising program instructions to:
utilize the integrator model element to implement at least one of the differential equations;
utilize the implicit equation model element to implement the implicit equation; and
utilize the explicit function model element to implement the explicit equation.

29. The one or more non-transitory computer-readable media of claim 26 further comprising program instructions to:
present on a display a visual depiction of the causal simulation model.

30. The one or more non-transitory computer-readable media of claim 26 wherein the discretizing introduces one or more algebraic loops in the causal simulation model, the media further comprising program instructions to:
eliminate at least one of the one or more algebraic loops by at least one of:
introducing a non-direct-feedthrough block;
introducing a delay or a filter to break the at least one of the one or more algebraic loops;
merging one or more blocks included in the at least one of the one or more algebraic loops; or
utilizing an explicit solver for one or more blocks included in the at least one of the one or more algebraic loops.

31. The one or more non-transitory computer-readable media of claim 26 wherein the arrangement of the algebraic equations and the algebraic variables is a matrix, the media further comprising program instructions to:
compute a Jacobian of the matrix wherein the decomposing utilizes the Jacobian of the matrix.

32. An apparatus comprising:
a memory storing an acausal simulation model of a physical system; and
one or more processors coupled to the memory, the one or more processors configured to:

generate a set of equations for the acausal simulation model, the set of equations including differential equations, algebraic equations, differential variables, and algebraic variables;

construct an arrangement of the algebraic equations and the algebraic variables;

decompose the arrangement of the algebraic equations and the algebraic variables to produce a permuted version of the arrangement of the algebraic equations and the algebraic variables;

partition the algebraic equations into a plurality of partitions based on the permuted version of the arrangement of the algebraic equations and the algebraic variables;

determine for the plurality of partitions, dependencies among the algebraic variables;

generate an in-memory intermediate representation of a causal simulation model for the acausal simulation model, wherein the causal simulation model includes model elements implementing functionality of the set of equations and connections among the model elements based on the dependencies among the algebraic variables, and the model elements include at least one of an integrator model element, an implicit equation model element, or an explicit function model element;

discretize the causal simulation model using one or more solvers; and either
execute the causal simulation model; or
generate code for the causal simulation model.

33. The apparatus of claim 32 wherein the algebraic equations include an implicit equation and an explicit equation, the one or more processors further configured to:
utilize the integrator model element to implement at least one of the differential equations;
utilize the implicit equation model element to implement the implicit equation; and
utilize the explicit function model element to implement the explicit equation.

34. The apparatus of claim 32 wherein the one or more processors are further configured to:
present on a display a visual depiction of the causal simulation model.

35. One or more non-transitory computer-readable media comprising program instructions for execution by one or more processors, the program instructions instructing the one or more processors to:
for an acausal simulation model of a physical system, extract a set of state-space equations for the acausal simulation model, the set of state-space equations including differential equations, algebraic equations, differential variables, and algebraic variables;
discretize the set of state-space equations to produce discretized state-space parameters;
generate sparse versions of the discretized state-space parameters;
generate an in-memory intermediate representation (IR) of a causal simulation model for the acausal simulation model based on the set of state-space equations following the discretizing, wherein the causal simulation model includes the sparse versions of the discretized state-space parameters; and
generate code based on the in-memory IR of the causal simulation model, wherein the code is capable of deployment on a target hardware device, wherein the generating includes
accessing attributes of resources of a product family that includes the target hardware device, and utilizing the attributes as one or more thresholds or one or more constraints on resource utilization of the code.

36. The one or more non-transitory computer-readable media of claim 35 further comprising program instructions to:
arrange the sparse versions of the discretized state-space parameters as sparse matrices.

37. The one or more non-transitory computer-readable media of claim 35 wherein the acausal simulation model is switched-linear, the media further comprising program instructions to:
determine a number of modes of the switched-linear acausal simulation model; and
include logic in the in-memory IR of the causal simulation model that selects the modes.

38. The one or more non-transitory computer-readable media of claim 35 wherein the acausal simulation model is non-linear, the media further comprising program instructions to:
analyze the non-linear acausal simulation model; and
identify, based on the analyzing, one or more changes that convert the non-linear acausal simulation to either a linear acausal simulation model or to a switched-linear acausal simulation model.

39. The one or more non-transitory computer-readable media of claim 35 further comprising program instructions to:
apply one or more optimizations to the in-memory IR of the causal simulation model, wherein the one or more optimizations reduce an area consumption when the code is deployed on the target hardware device.

40. The one or more non-transitory computer-readable media of claim 35 wherein elements of the sparse versions of the discretized state-space parameters are in a first floating point data type and operations for the set of state-space equations following the discretizing utilize floating point computations different from the first floating point data type.

41. An apparatus comprising:
a memory storing an acausal simulation model of a physical system; and
one or more processors configured to:
extract a set of state-space equations for the acausal simulation model, the set of state-space equations including differential equations, algebraic equations, differential variables, and algebraic variables;
discretize the set of state-space equations to produce discretized state-space parameters;
generate sparse versions of the discretized state-space parameters;
generate an in-memory intermediate representation (IR) of a causal simulation model for the acausal simulation model based on the set of state-space equations following the discretizing, wherein the causal simulation model includes the sparse versions of the discretized state-space parameters; and
generate code based on the in-memory IR of the causal simulation model, wherein the code is capable of deployment on a target hardware device, wherein the generating includes
accessing attributes of resources of a product family that includes the target hardware device, and
utilizing the attributes as one or more thresholds or one or more constraints on resource utilization of the code.

42. The apparatus of claim 41 wherein the one or more processors are further configured to:
arrange the sparse versions of the discretized state-space parameters as sparse matrices.

43. The apparatus of claim 41 wherein the acausal simulation model is switched-linear, the one or more processors further configured to:
determine a number of modes of the switched-linear acausal simulation model; and
include logic in the in-memory IR of the causal simulation model that selects the modes.

* * * * *